US011531465B2

(12) United States Patent
Akae et al.

(10) Patent No.: US 11,531,465 B2
(45) Date of Patent: Dec. 20, 2022

(54) DISPLAY CONTROL APPARATUS, NON-TRANSITORY RECORDING MEDIUM AND DISPLAY CONTROLLING METHOD FOR CREATING FIRST TAG, SECOND TAG NOT OVERLAPPING OTHER TAGS DISPLAYED, AND INDICATOR CORRELATING SECOND TAG WITH FIRST TAG

(71) Applicant: CASIO COMPUTER CO., LTD., Tokyo (JP)

(72) Inventors: Naoki Akae, Fussa (JP); Takayuki Inoue, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 64 days.

(21) Appl. No.: 16/386,889

(22) Filed: Apr. 17, 2019

(65) Prior Publication Data

US 2019/0317664 A1 Oct. 17, 2019

(30) Foreign Application Priority Data

Apr. 17, 2018 (JP) ............................. JP2018-079400
Apr. 17, 2018 (JP) ............................. JP2018-079417
Apr. 17, 2018 (JP) ............................. JP2018-079452

(51) Int. Cl.
*G06F 3/04886* (2022.01)
*G06F 3/04817* (2022.01)
(Continued)

(52) U.S. Cl.
CPC ........ *G06F 3/04886* (2013.01); *G06F 3/0482* (2013.01); *G06F 3/04817* (2013.01); *G06F 9/3004* (2013.01)

(58) Field of Classification Search
CPC ............. G06F 3/04886; G06F 3/04817; G06F 3/0482; G06F 9/3004; G06F 9/451; G06F 3/14
See application file for complete search history.

(56) References Cited

U.S. PATENT DOCUMENTS

2006/0041846 A1* 2/2006 Masselle ............... G06F 3/0481 715/793
2008/0313565 A1* 12/2008 Albertson ............ G06T 11/206 715/825
(Continued)

FOREIGN PATENT DOCUMENTS

JP H10-200855 A 7/1998
JP H11-085446 A 3/1999
(Continued)

OTHER PUBLICATIONS

Desmos, User Guide, translated by Horikawa; Apr. 16, 2018 (Year: 2016).*
(Continued)

*Primary Examiner* — Jennifer N Welch
*Assistant Examiner* — Amy P Hoang
(74) *Attorney, Agent, or Firm* — Scully Scott Murphy & Presser

(57) ABSTRACT

A display control apparatus, including a processor and a storage storing instructions that, when executed by the processor, controls the processor to determine whether input of one or more first operations which are correlated to any position within a screen of a display is accepted, in a case where it is determined that the input of one or more first operations is accepted, specify one first position corresponding to the any position within the screen of the display, newly create one first-kind display area according to the one or more first operations, and display the newly created one first-kind display area on the specified one first position
(Continued)

within the screen of the display, determine whether input of one or more second operations which are correlated to the displayed one first-kind display area is accepted, and in a case where it is determined that the input of the one or more second operations is accepted, specify one second position within the screen of the display, newly create one second-kind display area according to the one or more second operations, and display the newly created one second-kind display area on the specified one second position within the screen of the display so as to allow recognition of correlation of the one second-kind display area with the one first-kind display area.

11 Claims, 50 Drawing Sheets

(51) Int. Cl.

*G06F 3/0482* (2013.01)
*G06F 9/30* (2018.01)

(56) References Cited

U.S. PATENT DOCUMENTS

| | | | | |
|---|---|---|---|---|
| 2012/0284667 | A1 | 11/2012 | Willekes et al. | |
| 2015/0040008 | A1* | 2/2015 | Redenshek | G01R 33/4814 715/719 |
| 2015/0187106 | A1* | 7/2015 | Endo | G06T 11/206 345/440 |
| 2015/0310646 | A1* | 10/2015 | Karoji | G06T 11/206 345/440 |
| 2016/0117087 | A1* | 4/2016 | Couris | G06F 9/445 715/771 |

FOREIGN PATENT DOCUMENTS

| | | | |
|---|---|---|---|
| JP | 2010-015042 | A | 1/2010 |
| JP | 2016-045883 | A | 4/2016 |

OTHER PUBLICATIONS

"Desmos, desmos User Guide (translated by Yoshihito Horikawa [online] [searched on Apr. 16, 2018], the Internet <URL: https://desmos.s3.amazonaws.com/Desmos_User_Guide_JA.pdf>)".

Anonymous, "Desmos User Guide", URL:http://s3.amazonaws.com/desmos/Desmos_User_Guide.pdf, Jan. 29, 2016, pp. 1-13, retrieved on Sep. 4, 2019.

Anonymous, "English Desmos User Guide—Desmos", URL:https://web.archive.org/web/20170720032944/http://support.desmos.com/hc/en-us/articles/202529279-English-Desmos-User-Guide, Jul. 20, 2017, retrieved on Sep. 4, 2019.

Extended European Search Report dated Sep. 16, 2019 received in European Patent Application No. 19169484.3.

Anonymous, "Tiling window manager—Wikipedia", Sep. 28, 2012, XP055480874, Retrieved from the Internet: URL:https://en.wikipedia.org/w/index.php? title= Tiling_window_manager&oldid=515007862 [retrieved on Jun. 4, 2018].

Office Action dated Mar. 1, 2022 received in European Patent Application No. EP 19 169 484.3.

Notice of Reasons for Refusal dated Mar. 8, 2022 received in Japanese Patent Application No. JP 2018-079400 together with an English language translation.

On Jan. 19, 2007, [search on Feb. 25, 1. Demos User Guide, [online], 2016], Internet https://web.archive.org/web*/http://s3.amazonaws.com/desmos/Desmos * Reiwa 4 (2022), Sep. 1, 2020.

* cited by examiner

FIG. 19

| No. | TAGS TO BE CREATED | OPERATIONAL OBJECT | OPERATION | CONDITION | DISPLAY |
|---|---|---|---|---|---|
| 1 | GRAPH TAG | NUMERICAL FORMULA TAG | INPUT NUMERICAL FORMULA FROM INPUT BOARD AND EXECUTE IT | GRAPH TAG WHICH IS CORRELATED TO NUMERICAL FORMULA TAG IS PRESENT | DISPLAY GRAPH IN THAT GRAPH TAG |
| 2 | | | | OTHER THAN THE ABOVE | DISPLAY GRAPH IN NEW GRAPH TAG |
| 3 | | NUMERICAL TABLE (STATISTICS) TAG | INPUT NUMERICAL VALUE FROM INPUT BOARD AND DETERMINE STATISTICAL CALCULATION TYPE | GRAPH TAG WHICH IS CORRELATED TO NUMERICAL TABLE (STATISTICS) TAG IS PRESENT | DISPLAY GRAPH IN THAT GRAPH TAG |
| 4 | | | | OTHER THAN THE ABOVE | DISPLAY GRAPH IN NEW GRAPH TAG |
| 5 | COORDINATE VALUE TAG | GRAPH TAG | DESIGNATE POINT ON GRAPH AND SELECT DISPLAYED LABEL | COORDINATE VALUE TAG WHICH IS CORRELATED TO GRAPH TAG IS PRESENT | DISPLAY NEW COORDINATE VALUE TAG BY CONNECTING TO THE LOWER SIDE |
| 6 | | | | OTHER THAN THE ABOVE | DISPLAY NEW COORDINATE VALUE TAG |
| 7 | $\alpha+\beta$ TAG | GRAPH TAG | SELECT $\alpha+\beta$ ICON | $\alpha+\beta$ TAG WHICH IS CORRELATED TO GRAPH TAG IS PRESENT | DISPLAY NEW $\alpha+\beta$ TAG BY CONNECTING TO THE LOWER SIDE |
| 8 | | | | OTHER THAN THE ABOVE | DISPLAY NEW $\alpha+\beta$ TAG |
| 9 | NUMERICAL FORMULA TAG | GRAPH TAG | SELECT f(x) ICON FOR GRAPH TAG | NUMERICAL FORMULA TAG WHICH IS CORRELATED TO GRAPH TAG IS PRESENT | MOVE FOCUS TO NUMERICAL FORMULA TAG |
| 10 | | | | OTHER THAN THE ABOVE | DISPLAY NEW NUMERICAL FORMULA TAG |
| 11 | | NUMERICAL FORMULA TAG | SELECT NUMERICAL FORMULA TAG AND SELECT DISPLAYED f(x) ICON | NONE | DISPLAY NEW NUMERICAL FORMULA TAG BY CONNECTING TO THE LOWER SIDE |
| 12 | SLIDER TAG | NUMERICAL FORMULA TAG | INPUT NUMERICAL FORMULA WHICH INCLUDES LITERAL COEFFICIENTS FROM INPUT BOARD AND EXECUTE IT | THE SAME LITERAL COEFFICIENT IS PRESENT IN SLIDER TAG WHICH IS CORRELATED TO NUMERICAL FORMULA TAG | SHARE THAT SLIDER TAG |
| 13 | | | | THE SAME LITERAL COEFFICIENT IS NOT PRESENT IN SLIDER TAG WHICH IS CORRELATED TO NUMERICAL FORMULA TAG | DISPLAY NEW SLIDER TAG BY CONNECTING TO THE LOWER SIDE |
| 14 | | | | SLIDER TAG WHICH IS CORRELATED TO NUMERICAL FORMULA TAG IS NOT PRESENT | DISPLAY NEW SLIDER TAG |
| 15 | NUMERICAL TABLE (NUMERICAL FORMULA) TAG | NUMERICAL FORMULA TAG | SELECT ⊞ ICON FOR NUMERICAL FORMULA TAG | NUMERICAL TABLE (NUMERICAL FORMULA) TAG WHICH IS CORRELATED TO NUMERICAL FORMULA TAG IS PRESENT | DISPLAY NUMERICAL VALUES IN THAT NUMERICAL TABLE (NUMERICAL FORMULA) TAG ADDITIONALLY |
| 16 | | | | OTHER THAN THE ABOVE | DISPLAY NEW NUMERICAL TABLE (NUMERICAL FORMULA) TAG |
| 17 | NUMERICAL TABLE (STATISTICS) TAG | GRAPH TAG | SELECT ⊞ ICON FOR GRAPH TAG | NUMERICAL TABLE (STATISTICS) TAG WHICH IS CORRELATED TO GRAPH TAG IS PRESENT | MOVE FOCUS TO NUMERICAL TABLE (STATISTICS) TAG |
| 18 | | | | OTHER THAN THE ABOVE | DISPLAY NEW NUMERICAL TABLE (STATISTICS) TAG |
| 19 | STATISTICAL CALCULATION TAG | NUMERICAL TABLE (STATISTICS) TAG | INPUT NUMERICAL VALUE FROM INPUT BOARD AND DETERMINE STATISTICAL CALCULATION TYPE | STATISTICAL CALCULATION TAG WHICH IS CORRELATED TO NUMERICAL TABLE (STATISTICS) TAG IS PRESENT | DISPLAY NEW STATISTICAL CALCULATION TAG BY CONNECTING TO THE LOWER SIDE |
| 20 | | | | OTHER THAN THE ABOVE | DISPLAY NEW STATISTICAL CALCULATION TAG |
| | GEOMETRIC TAG | | | | |
| 21 | MEASURED VALUE TAG | GEOMETRIC TAG | MEASURE FIGURE | MEASURED VALUE TAG WHICH IS CORRELATED TO GEOMETRIC TAG IS PRESENT | DISPLAY NEW MEASURED VALUE TAG BY CONNECTING TO THE LOWER SIDE |
| 22 | | | | OTHER THAN THE ABOVE | DISPLAY NEW MEASURED VALUE TAG |
| 23 | $\alpha+\beta$ TAG | GEOMETRIC TAG | SELECT $\alpha+\beta$ ICON | $\alpha+\beta$ TAG WHICH IS CORRELATED TO GEOMETRIC TAG IS PRESENT | DISPLAY NEW $\alpha+\beta$ TAG BY CONNECTING TO THE LOWER SIDE |
| 24 | | | | OTHER THAN THE ABOVE | DISPLAY NEW $\alpha+\beta$ TAG |

FIG. 20A

| OPERATIONAL OBJECT | OPERATION | DISPLAY AFTER OPERATION | | |
|---|---|---|---|---|
| | | OPERATIONAL OBJECT TAG | REMAINING TAGS WHICH ARE GROUPED WITH THE OPERATIONAL OBJECT TAG | COORDINATE VALUE TAG AND $\alpha+\beta$ TAG |
| GRAPH TAG<br>NUMERICAL FORMULA TAG<br>NUMERICAL TABLE (STATISTICS) TAG<br>NUMERICAL TABLE (NUMERICAL FORMULA) TAG<br>STATISTICAL CALCULATION TAG | SELECT AND MOVE | COUPLING (INTEGRATION/ ALIGNMENT) | COUPLING (INTEGRATION/ ALIGNMENT) | ERASURE |

FIG. 20B

| OPERATIONAL OBJECT | OPERATION | DISPLAY AFTER OPERATION | | |
|---|---|---|---|---|
| | | OPERATIONAL OBJECT TAG | REMAINING TAGS WHICH ARE GROUPED WITH THE OPERATIONAL OBJECT TAG | COORDINATE VALUE TAG AND $\alpha+\beta$ TAG |
| GRAPH TAG<br>NUMERICAL FORMULA TAG<br>NUMERICAL TABLE (NUMERICAL FORMULA) TAG<br>STATISTICAL CALCULATION TAG | SELECT AND MOVE | SEPARATION | SEPARATION | ERASURE |

| | A | B | C | D |
|---|---|---|---|---|
| 1 | 9.7 | 22 | 9.3 | 23 |
| 2 | 8.9 | 33 | 8.4 | 33 |
| 3 | 10.3 | 17 | 9.6 | 20 |
| 4 | 11.4 | 14 | 10.6 | 20 |
| 5 | 10.4 | 29 | 9.5 | 30 |
| 6 | 10.8 | 22 | 9.7 | 24 |
| 7 | 9.8 | 24 | 8.7 | 24 |
| 8 | 8.9 | 29 | 8.1 | 31 |
| 9 | 10.1 | 28 | 8.9 | 31 |
| 10 | 9.9 | 23 | 9.2 | 31 |
| 11 | 11.3 | 18 | 10.5 | 21 |
| 12 | 10.9 | 19 | 10.1 | 27 |
| 13 | 11.3 | 21 | 10.1 | 24 |
| 14 | 10.4 | 25 | 9.4 | 30 |
| 15 | 10.9 | 22 | 9.8 | 23 |
| 16 | 12.5 | 14 | 12.2 | 16 |
| 17 | 9.9 | 22 | 8.7 | 27 |
| 18 | 10.9 | 17 | 9.8 | 18 |

| | A | B | C | D |
|---|---|---|---|---|
| 1 | 9.7 | 22 | 9.3 | 23 |
| 2 | 8.9 | 33 | 8.4 | 33 |
| 3 | 10.3 | 17 | 9.6 | 20 |
| 4 | 11.4 | 14 | 10.6 | 20 |
| 5 | 10.4 | 29 | 9.5 | 30 |
| 6 | 10.8 | 22 | 9.7 | 24 |
| 7 | 9.8 | 24 | 8.7 | 24 |
| 8 | 8.9 | 29 | 8.1 | 31 |
| 9 | 10.1 | 28 | 8.9 | 31 |
| 10 | 9.9 | 23 | 9.2 | 31 |
| 11 | 11.3 | 18 | 10.5 | 21 |
| 12 | 10.9 | 19 | 10.1 | 27 |
| 13 | 11.3 | 21 | 10.1 | 24 |
| 14 | 10.4 | 25 | 9.4 | 30 |
| 15 | 10.9 | 22 | 9.8 | 23 |
| 16 | 12.5 | 14 | 12.2 | 16 |
| 17 | 9.9 | 22 | 8.7 | 27 |
| 18 | 10.9 | 17 | 9.8 | 18 |

| | A | B | C | D |
|---|---|---|---|---|
| 1 | 9.7 | 22 | 9.3 | 23 |
| 2 | 8.9 | 33 | 8.4 | 33 |
| 3 | 10.3 | 17 | 9.6 | 20 |
| 4 | 11.4 | 14 | 10.6 | 20 |
| 5 | 10.4 | 29 | 9.5 | 30 |
| 6 | 10.8 | 22 | 9.7 | 24 |
| 7 | 9.8 | 24 | 8.7 | 24 |
| 8 | 8.9 | 29 | 8.1 | 31 |
| 9 | 10.1 | 28 | 8.9 | 31 |
| 10 | 9.9 | 23 | 9.2 | 31 |
| 11 | 11.3 | 18 | 10.5 | 21 |
| 12 | 10.9 | 19 | 10.1 | 27 |
| 13 | 11.3 | 21 | 10.1 | 24 |
| 14 | 10.4 | 25 | 9.4 | 30 |
| 15 | 10.9 | 22 | 9.8 | 23 |
| 16 | 12.5 | 14 | 12.2 | 16 |
| 17 | 9.9 | 22 | 8.7 | 27 |
| 18 | 10.9 | 17 | 9.8 | 18 |

| | A | B | C | D |
|---|---|---|---|---|
| 1 | 9.7 | 22 | 9.3 | 23 |
| 2 | 8.9 | 33 | 8.4 | 33 |
| 3 | 10.3 | 17 | 9.6 | 20 |
| 4 | 11.4 | 14 | 10.6 | 20 |
| 5 | 10.4 | 29 | 9.5 | 30 |
| 6 | 10.8 | 22 | 9.7 | 24 |
| 7 | 9.8 | 24 | 8.7 | 24 |
| 8 | 8.9 | 29 | 8.1 | 31 |
| 9 | 10.1 | 28 | 8.9 | 31 |
| 10 | 9.9 | 23 | 9.2 | 31 |
| 11 | 11.3 | 18 | 10.5 | 21 |
| 12 | 10.9 | 19 | 10.1 | 27 |
| 13 | 11.3 | 21 | 10.1 | 24 |
| 14 | 10.4 | 25 | 9.4 | 30 |
| 15 | 10.9 | 22 | 9.8 | 23 |
| 16 | 12.5 | 14 | 12.2 | 16 |
| 17 | 9.9 | 22 | 8.7 | 27 |
| 18 | 10.9 | 17 | 9.8 | 18 |

| | A | B | C | D |
|---|---|---|---|---|
| 1 | 9.7 | 22 | 9.3 | 23 |
| 2 | 8.9 | 33 | 8.4 | 33 |
| 3 | 10.3 | 17 | 9.6 | 20 |
| 4 | 11.4 | 14 | 10.6 | 20 |
| 5 | 10.4 | 29 | 9.5 | 30 |
| 6 | 10.8 | 22 | 9.7 | 24 |
| 7 | 9.8 | 24 | 8.7 | 24 |
| 8 | 8.9 | 29 | 8.1 | 31 |
| 9 | 10.1 | 28 | 8.9 | 31 |
| 10 | 9.9 | 23 | 9.2 | 31 |
| 11 | 11.3 | 18 | 10.5 | 21 |
| 12 | 10.9 | 19 | 10.1 | 27 |
| 13 | 11.3 | 21 | 10.1 | 24 |
| 14 | 10.4 | 25 | 9.4 | 30 |
| 15 | 10.9 | 22 | 9.8 | 23 |
| 16 | 12.5 | 14 | 12.2 | 16 |
| 17 | 9.9 | 22 | 8.7 | 27 |
| 18 | 10.9 | 17 | 9.8 | 18 |

| | A | B | C | D |
|---|---|---|---|---|
| 1 | 9.7 | 22 | 9.3 | 23 |
| 2 | 8.9 | 33 | 8.4 | 33 |
| 3 | 10.3 | 17 | 9.6 | 20 |
| 4 | 11.4 | 14 | 10.6 | 20 |
| 5 | 10.4 | 29 | 9.5 | 30 |
| 6 | 10.8 | 22 | 9.7 | 24 |
| 7 | 9.8 | 24 | 8.7 | 24 |
| 8 | 8.9 | 29 | 8.1 | 31 |
| 9 | 10.1 | 28 | 8.9 | 31 |
| 10 | 9.9 | 23 | 9.2 | 31 |
| 11 | 11.3 | 18 | 10.5 | 21 |
| 12 | 10.9 | 19 | 10.1 | 27 |
| 13 | 11.3 | 21 | 10.1 | 24 |
| 14 | 10.4 | 25 | 9.4 | 30 |
| 15 | 10.9 | 22 | 9.8 | 23 |
| 16 | 12.5 | 14 | 12.2 | 16 |
| 17 | 9.9 | 22 | 8.7 | 27 |
| 18 | 10.9 | 17 | 9.8 | 18 |

| | A | B | C | D |
|---|---|---|---|---|
| 1 | 9.7 | 22 | 9.3 | 23 |
| 2 | 8.9 | 33 | 8.4 | 33 |
| 3 | 10.3 | 17 | 9.6 | 20 |
| 4 | 11.4 | 14 | 10.6 | 20 |
| 5 | 10.4 | 29 | 9.5 | 30 |
| 6 | 10.8 | 22 | 9.7 | 24 |
| 7 | 9.8 | 24 | 8.7 | 24 |
| 8 | 8.9 | 29 | 8.1 | 31 |
| 9 | 10.1 | 28 | 8.9 | 31 |
| 10 | 9.9 | 23 | 9.2 | 31 |
| 11 | 11.3 | 18 | 10.5 | 21 |
| 12 | 10.9 | 19 | 10.1 | 27 |
| 13 | 11.3 | 21 | 10.1 | 24 |
| 14 | 10.4 | 25 | 9.4 | 30 |
| 15 | 10.9 | 22 | 9.8 | 23 |
| 16 | 12.5 | 14 | 12.2 | 16 |
| 17 | 9.9 | 22 | 8.7 | 27 |
| 18 | 10.9 | 17 | 9.8 | 18 |

DISPLAY CONTROL APPARATUS, NON-TRANSITORY RECORDING MEDIUM AND DISPLAY CONTROLLING METHOD FOR CREATING FIRST TAG, SECOND TAG NOT OVERLAPPING OTHER TAGS DISPLAYED, AND INDICATOR CORRELATING SECOND TAG WITH FIRST TAG

CROSS-REFERENCE TO RELATED APPLICATIONS

This application claims priority to Japanese Patent Application No. 2018-079400, filed on Apr. 17, 2018, Japanese Patent Application No. 2018-079417, filed on Apr. 17, 2018, and Japanese Patent Application No. JP 2018-079452, filed on Apr. 17, 2018. The entire disclosure of each of Japanese Patent Application No. 2018-079400, Japanese Patent Application No. 2018-079417, and Japanese Patent Application No. JP 2018-079452 is incorporated herein by reference.

BACKGROUND

1. Technical Field

The present invention relates to a display control apparatus, a non-transitory recording medium and a display controlling method.

2. Description of Related Art

A graph drawing application which is utilizable on a Web browser is known. For example, "Desmos, desmos User Guide (translated by Yoshihito Horikawa [online] [searched on Apr. 16, 2018], the Internet <URL: https://desmos.s3.amazonaws.com/Desmos_User_Guide_JA.pdf>)" discloses such an application which operates on the Web browser as follows. In this application, an arithmetic operation is executed on the basis of a numerical formula that a user inputs into a formula list and a graph which is based on a result of execution of the arithmetic operation is drawn on the Web browser.

In the above-mentioned application, one or more data input area(s) into which the user inputs input data (for example, a numerical formula, a numerical table and so forth) is/are displayed in one window of the Web browser. However, in the window of the Web browser, since the positions where these data input areas are displayed are fixed in the window, it is impossible to display input/display areas for the input data on positions which are determined in accordance with a user's operation within the window.

In addition, only one data output area is displayed when displaying output data (for example, a graph and so forth) which is based on the input data into the data input area. Therefore, in a case of trying to display a plurality of data output areas on one display, there is no other way than to open the plurality of windows of the Web browser and to display the data output areas on the respective windows one by one. In such a case, it is impossible to display the plurality of data output areas which are displayed on the plurality of different windows separately in a mutually coupled state and to display the data output areas in a mutually correlated state.

Further, since the position of each input/display area is fixed in the window, it is impossible to execute an operation of coupling together two or more mutually separated input/display areas and an operation of mutually separating two or more mutually coupled input/display areas. Consequently, a specific operating method which is adapted to mutually couple/separate the input/display areas and a specific displaying method which is used when displaying the input/display areas in the correlated state in execution of coupling/separating operations have not been clearly proposed so far.

There is room for improvement of operability and convenience when displaying and outputting the data input area and the data output area which is correlated to the data input area in the existing application in this way from at least any one of the plurality of viewpoints as mentioned above.

BRIEF SUMMARY

According to one aspect of the present invention, there is provided a display control apparatus, including a processor and a storage storing instructions that, when executed by the processor, controls the processor to determine whether input of one or more first operations which are correlated to any position within a screen of a display is accepted, in a case where it is determined that the input of the one or more first operations is accepted, specify one first position corresponding to the any position within the screen of the display, newly create one first-kind display area according to the one or more first operations, and display the newly created one first-kind display area on the specified one first position within the screen of the display, determine whether input of one or more second operations which are correlated to the displayed one first-kind display area is accepted, and in a case where it is determined that the input of the one or more second operations is accepted, specify one second position within the screen of the display, newly create one second-kind display area according to the one or more second operations, and display the newly created one second-kind display area on the specified one second position within the screen of the display so as to allow recognition of correlation of the one second-kind display area with the one first-kind display area.

According to one aspect of the present invention, there is also provided a non-transitory recording medium having a program code recorded thereon that is executable to control a computer of a display control apparatus, which includes a processor and a storage storing instructions executed by the processor, to determine whether input of one or more first operations which are correlated to any position within a screen of a display is accepted, in a case where it is determined that the input of the one or more first operations is accepted, specify one first position corresponding to the any position within the screen of the display, newly create one first-kind display area according to the one or more first operations, and display the newly created one first-kind display area on the specified one first position within the screen of the display, determine whether input of one or more second operations which are correlated to the displayed one first-kind display area is accepted, and in a case where it is determined that the input of the one or more second operations is accepted, specify one second position within the screen of the display, newly create one second-kind display area according to the one or more second operations, and display the newly created one second-kind display area on the specified one second position within the screen of the display so as to allow recognition of correlation of the one second-kind display area with the one first-kind display area.

According to one aspect of the present invention, there is further provided a method executed by a computer of a display control apparatus, the display control apparatus including a processor and a storage storing instructions executed by the processor, wherein the method including, determining whether input of one or more first operations which are correlated to any position within a screen of a display is accepted, in a case where it is determined that the input of one or more first operations is accepted, specifying one first position corresponding to the any position within the screen of the display, newly creating one first-kind display area according to the one or more first operations, and displaying the newly created one first-kind display area on the specified one first position within the screen of the display, determining whether input of one or more second operations which are correlated to the displayed one first-kind display area is accepted, and in a case where it is determined that the input of the one or more second operations is accepted, specifying one second position within the screen of the display, newly creating one second-kind display area according to the one or more second operations, and displaying the newly created one second-kind display area on the specified one second position within the screen of the display so as to allow recognition of correlation of the one second-kind display area with the one first-kind display area.

BRIEF DESCRIPTION OF THE DRAWINGS

The components in the drawings are not necessarily to scale relative to each other.

FIG. 19 is a table illustrating one example of operations and display in creation of the various tags.

FIG. 20A is a diagram illustrating one example of operational objects, operations and display after execution of the operations pertaining to coupling of tags.

FIG. 20B is a diagram illustrating one example of the operational objects, operations and display after execution of the operations pertaining to separation of tags.

DETAILED DESCRIPTION OF THE INVENTION

One embodiment of the present invention will be described with reference to the drawings.

Figure 1:
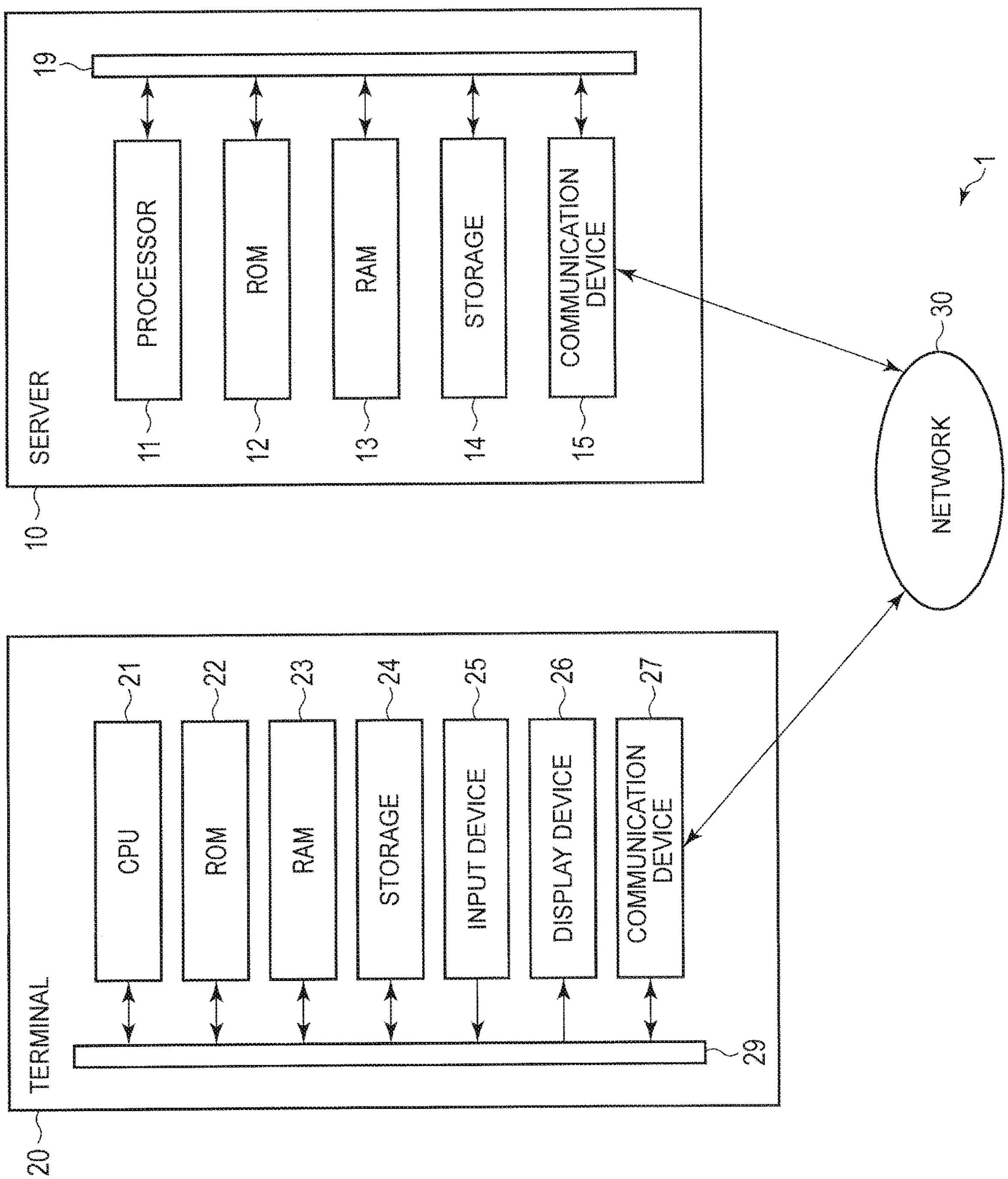
FIG. 1 is a diagram illustrating one example of a configuration of a system according to one embodiment of the present invention.

FIG. 1 is a diagram illustrating one example of a configuration of a system 1 according to one embodiment of the present invention. The system 1 includes a server 10, and a terminal 20. The server 10 and the terminal 20 are connected to each other to be communicable over a network 30. The network 30 is, for example, the Internet. Although only one terminal 20 is illustrated in FIG. 1, the number of the terminals 20 which is connectable to the server 10 over the network 30 is not limited to one. One or more terminals 20 may be connected to the server 20.

The system 1 is a system which displays a graph of functions in accordance with a result of execution of an arithmetic operation which is based on a numerical formula (a function) that a user inputs and displays a statistical graph and a statistical value in accordance with a result of execution of a statistical calculation which is based on numerical values. In the system 1, data and an arithmetic operation instruction which are input into the terminal 20 are transmitted from the terminal 20 to the server 10. The server 10 executes the arithmetic operation on the basis of the data and the arithmetic operation instruction and transmits a result of execution of the arithmetic operation to the terminal 20. The terminal 20 receives the result of execution of the arithmetic operation and performs display which is based on the result of execution of the arithmetic operation, for example, display of a graph and/or display of a result of execution of statistical calculations (character/letter information).

The server 10 has a processor 11, a ROM (Read Only Memory) 12, a RAM (Random Access Memory) 13, a storage 14, and a communication device 15. The above-mentioned constitutional elements are mutually connected via a system bus 19.

The processor 11 may be an integrated circuit such as a CPU (Central Processing Unit) and so forth. The ROM 12 stores therein information which is used for an operation of the processor 11. The RAM 13 functions as a main storage device of the processor 11. Various programs such as a server control program which is used in the processor 11, an arithmetic operation program which is used for execution of various arithmetic operations and so forth, parameters and so forth are stored in the storage 14. The processor 11 controls the operation of the server 10 in accordance with the program concerned which is stored in the storage 14. A processor other than the CPU such as, for example, an ASIC (Application Specific Integrated Circuit), an FPGA (Field Programmable Gate Array) and so forth may be used as the processor 11. The communication device 15 is able to communicate with an external communication network such as the network 30 and so forth.

The terminal 20 has a CPU 21, a ROM 22, a RAM 23, a storage 24, an input device 25, a display device 26, and a communication device 27. The above-mentioned constitutional elements are mutually connected via a system bus 29. The terminal 20 may be electronic equipment such as a personal computer (PC), a tablet terminal, a smartphone and so forth.

The CPU 21 is a processor which controls various operations of the terminal 20. The ROM 22 stores therein a startup program and so forth. The RAM 23 functions as a main storage device of the CPU 21. Various programs such as a terminal control programs and so forth, parameters and so forth which are used in the CPU 21 are stored in the storage 24. The CPU 21 controls the operations of the terminal 20 by executing various programs in accordance with an input signal which is sent from the input device 25 and a reception signal which is received via the communication device 27. The various programs may be downloaded from a Web server (not illustrated) into the storage 24 over the network 30 and the communication device 27. The communication device 27 is able to communicate with an external communication network such as the network 30 and so forth.

The input device 25 includes an external input devise such as a keyboard, a mouse and so forth or an input board which is displayed on the display device 26 of the terminal 20. An input signal is input into the CPU 21 from an input interface (I/F) via the system bus 29 in accordance with an operation of the input device 25.

The display device 26 includes an external display device such as a liquid crystal display and so forth or a display unit such as a liquid crystal display and so forth of the terminal 20. An output signal is transmitted from the CPU 21 to the display device 26 via the system bus 29 and an output interface (I/F).

In the present embodiment, a user designates an address of the server 10 in a Web browser which operates on the terminal 20. The Web browser of the terminal 20 issues a request to the server 10 in accordance with acceptance of input of a numerical formula, a numerical value and so forth and receives a result of an arithmetic operation that the server 10 executes in accordance with the arithmetic operation program as a response from the server 10. In other words, the server 10 executes the arithmetic operation by the processor 11 in accordance with the arithmetic operation program in response to a request for execution of the arithmetic operation from the terminal 20 and transmits the result of the arithmetic operation which is executed to the terminal 20 as a response. Further, the terminal 20 executes drawing of a function graph or a statistical graph, display of the result of execution of the arithmetic operation and so forth in accordance with a program which operates on the Web browser by using the received result of execution of the arithmetic operation.

In the system 1, a function which operates as a Web application for graph drawing, display of the result of execution of the arithmetic operation concerned and so forth is realized in accordance with the program which operates on the Web browser of the terminal 20 and the arithmetic operation program of the server 10 in this way.

Such a Web application as mentioned above is able to be utilized in, for example, teaching mathematics and so forth in school educational scenes where introduction of ICT (Information and Communication Technology) is promoted.

Figure 2:
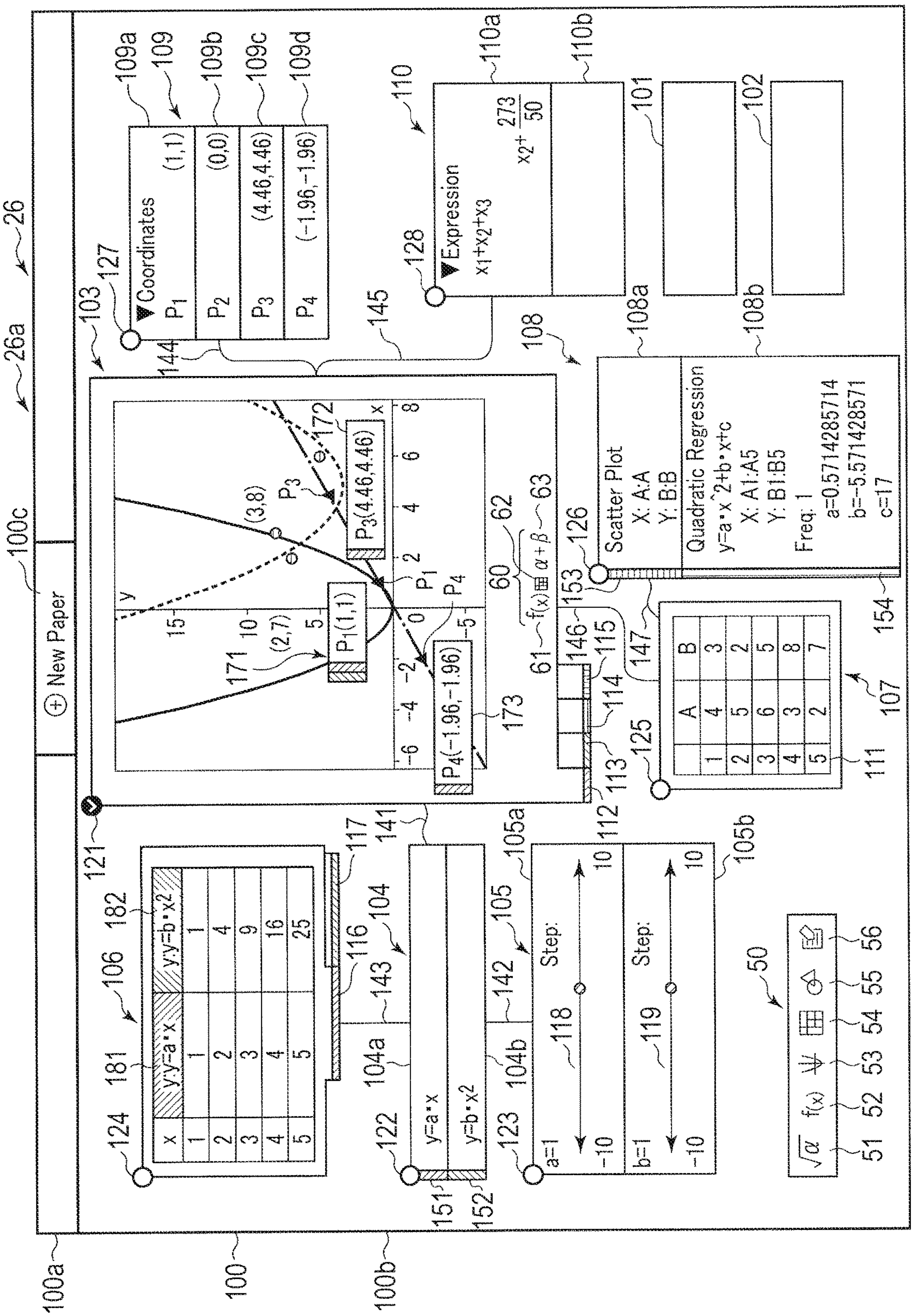
FIG. 2 is a diagram illustrating one example of screen display on a terminal in the system according to one embodiment of the present invention.

FIG. 2 is a diagram illustrating one example of screen display which is made in accordance with an application which operates on the Web browser of the terminal 20. That is, FIG. 2 illustrates one example of a screen which is displayed on the display device 26 of the terminal 20.

A screen 26*a* which is displayed on the display device 26 of the terminal 20 is configured by an upper-stage area 100*a* and a lower-stage area 100*b*. The upper-stage area 100*a* is an elongated area on which a new paper creation icon 100*c* is displayed. The lower-stage area 100*b* is an area which is located under the upper-stage area 100*a* in the screen 26*a* and is also called paper 100. Various floating objects are displayed on the paper 100. The floating object is an object (a display body) which is displayed on the screen 26*a* and is a display body at least the display position of which is able to be changed with one or more objects being set as a unit in accordance with a user's operation. In the following, the respective objects will be referred to as tags.

A memo tag 101, an arithmetic operation tag 102, a graph tag 103, a numerical formula tag 104, a slider tag 105, a numerical table (numerical formula) tag 106, a numerical table (statistics) tag 107, a statistical calculation tag 108, a coordinate value tag 109 and an arithmetic operation (α+β) tag 110 are displayed on the screen 26*a* in FIG. 2.

The memo tag 101 is a tag which is used to display text input information that the user inputs. The memo tag 101 is the tag which makes input from the input device 25 and display of the input possible.

The arithmetic operation tag 102 is a tag which is used to display an arithmetic expression that the user input and a result of execution of an arithmetic operation pertaining to the arithmetic expression concerned. The arithmetic operation tag 102 is the tag which makes input from the input device 25, display of the input and display of the result of execution of the arithmetic operation concerned possible.

The graph tag 103 is a tag which makes display of the function graph and the statistical graph possible.

The numerical formula tag 104 is a tag which is used to display a numerical formula (a function) that the user inputs. The numerical formula tag 104 is the tag which makes input from the input device 25 and display of the input concerned possible.

The slider tag 105 is a tag which is used to variably display a value of a literal coefficient in a case where the literal coefficient is included in the numerical formula which is input into the numerical formula tag 104.

The numerical table (numerical formula) tag 106 is a tag which is used to display a numerical value pertaining to the numerical formula which is input into the numerical formula tag 104 in the form of a numerical table. The numerical table (numerical formula) tag 106 is the tag which is displayed in accordance with selection of a numerical table (numerical formula) icon 72 (which will be described later with reference to FIG. 21B) which is displayed on the numerical formula tag 104. It is not possible to input a numerical value directly from the input device 25 into the numerical table which is displayed in the numerical table (numerical formula) tag 106.

The numerical table (statistics) tag 107 is a tag which is used to display a numerical value that the user inputs into a numerical table 111 in the numerical table (statistics) tag 107. The numerical table (statistics) tag 107 is the tag which makes input from the input device 25 and display of the input concerned possible.

The statistical calculation tag 108 is a tag which is used to display information pertaining to a statistical calculation.

The coordinate value tag 109 is a tag which is used to display coordinate values of a position that the user designates on a graph which is drawn in the graph tag 103.

The arithmetic operation (α+β) tag 110 is a tag which is used to display an arithmetic expression that the user inputs and a result of execution of an arithmetic operation pertaining to the arithmetic expression concerned. The arithmetic operation (α+β) tag 110 is the tag which makes input from the input device 25 and display of the input concerned and, display of the result of execution of the arithmetic operation possible.

Incidentally, the arithmetic operation tag 102 and the arithmetic operation (α+β) tag 110 are the tags which are used to display the arithmetic expression that the user inputs and the result of execution of the arithmetic operation pertaining to the input arithmetic expression. However, the arithmetic operation (α+β) tag 110 is different from the arithmetic operation tag 102 in the point that it is possible to use the coordinate values which are displayed in the coordinate value tag 109 as input into the arithmetic operation (α+β) tag 110.

As illustrated in FIG. 2, check columns 121, 122, 123, 124, 125, 126, 127 and 128 are displayed on left upper parts of the graph tag 103, the numerical formula tag 104, the slider tag 105, the numerical table (numerical formula) tag 106, the numerical table (statistics) tag 107, the statistical calculation tag 108, the coordinate value tag 109 and the arithmetic operation (α+β) tag 110 respectively. For example, when one tag is selected, a check is displayed on the check column of the tag concerned. The selected tag may be displayed to be visually distinguishable from remaining tags which are not selected while the tag concerned is being selected. As a method of visually distinguishing the selected tag from the remaining tags, only an outer frame of the selected tag may be displayed thicker than those of the remaining tags, may be made different from the remaining tags in line type and/or color and/or may be displayed flickeringly. In FIG. 2, the graph tag 103 is selected and the check is displayed on the check column 121 of the graph tag 103.

Display of each tag in FIG. 2 will be described.

[Numerical Formula Tag 104]

In FIG. 2, the numerical formula tag 104 that a first numerical formula tag 104*a* and a second numerical formula tag 104*b* are vertically connected together is displayed. In the example in FIG. 2, the numerical formula tag 104 is a numerical formula tag unit which is configured by the two numerical formula tags 104*a* and 104*b*. A numerical formula $y=a\cdot x$ is displayed in the first numerical formula tag 104*a*. A numerical formula $y=b\cdot x^2$ is displayed in the second numerical formula tag 104*b*. A tab 151 is displayed in the first numerical formula tag 104*a*. A tab 152 is displayed in the second numerical formula tag 104*b*.

[Numerical Table (Statistics) Tag 107]

In FIG. 2, optional numerical values that the user inputs are displayed on columns A and B of the numerical table 111 of the numerical table (statistics) tag 107.

[Graph Tag 103]

In FIG. 2, a graph (a first graph) of the numerical formula $y=a\cdot x$ which is input into the first numerical formula tag 104*a*, a graph (a second graph) of the numerical formula $y=b\cdot x^2$ which is input into the second numerical formula tag 104*b*, and a first statistical graph (Scatter Plot) and a second statistical graph (Quadratic Regression) which are based on the numerical values which are input into the numerical table (statistics) tag 107 are displayed in the graph tag 103. In the example in FIG. 2, a first tab 112, a second tab 113, a third tab 114 and a fourth tab 115 are displayed on a left lower part of the graph tag 103. The first tab 112 is correlated to the first graph. The second tab 113 is correlated to the second graph. The third tab 114 is correlated to the first statistical graph. The fourth tab 115 is correlated to the second statistical graph. The tabs 112, 113, 114 and 115 which are correlated to the respective graphs which are drawn in the graph tag 103 are displayed in this way.

Coordinate value labels 171, 172 and 173 are displayed in the graph tag 103. Coordinates (1,1) of a point $P_1$ which is one of intersection points of the first graph and the second graph which are drawn in the graph tag 103 are displayed on the coordinate value label 171. Coordinates (4.46, 4.46) of a point $P_3$ on the first graph which is drawn in the graph tag 103 are displayed on the coordinate value label 172. Coordinates (−1.96, −1.96) of a point $P_4$ on the first graph which is drawn in the graph tag 103 are displayed on the coordinate value label 173.

[Slider Tag 105]

In FIG. 2, the slider tag 105 that a first slider tag 105*a* which includes a first slider 118 which is used to change a value of a literal coefficient "a" which is included in the numerical formula displayed in the first numerical formula tag 104*a* in accordance with the user's operation and a second slider tag 105*b* which includes a second slider 119 which is used to change a value of a literal coefficient "b" which is included in the numerical formula displayed in the second numerical formula tag 104*b* in accordance with the user's operation are vertically connected together is displayed. In the example in FIG. 2, the slider tag 105 is a slider tag unit which is configured by the two slider tags 105*a* and 105*b*. When the first slider 118 is subjected to a sliding operation, display of the first graph is updated in response to this sliding operation. When the second slider 119 is subjected to the sliding operation, display of the second graph is updated in response to this sliding operation.

[Numerical Table (Numerical Formula) Tag 106]

In FIG. 2, values of "x" and "y" in the numerical formula (a function) which is displayed in the first numerical formula tag 104*a* and values of "x" and "y" in the numerical formula (a function) which is displayed in the second numerical formula tag 104*b* are displayed ("x" is shared between the numerical formulae) in the numerical table (numerical formula) tag 106. Tabs 116 and 117 are displayed on the lower side of the numerical table (numerical formula) tag 106. The tab 116 is correlated to values of "x" and "y" in the numerical formula which is displayed in the first numerical formula tag 104*a*. The tab 117 is correlated to values of "x" and "y" in the numerical formula which is displayed in the second numerical formula tag 104*b*.

Numerical formulae which correspond to values which are displayed on respective columns are displayed in a cell 181 and a cell 182 on the first row of the numerical table which is displayed in the numerical table (numerical formula) tag 106 as item names of respective columns. The numerical formulae which are displayed respectively in the first numerical formula tag 104*a* and the second numerical formula tag 104*b* are displayed in the cell 181 on the first column and the cell 182 on the second column of the first row. In addition, each of the colors of the cells 181 and 182 which are the respective item names is the same as the color of the tab of corresponding one of the first numerical formula tag 104*a* and the second numerical formula tag 104*b* and the color of corresponding one of the tab 116 and the tab 117 of the numerical table (numerical formula) tag 106. Accordingly, display is made in such a manner that it is easy for the user to grasp a correspondence relation between respective numerical values which are displayed in the numerical table (numerical formula) tag 106 and the numerical formula tag 106.

[Statistical Calculation Tag 108]

In FIG. 2, the statistical calculation tag 108 that a first statistical calculation tag 108*a* and a second statistical calculation tag 108*b* are vertically connected together is displayed. In the example in FIG. 2, the statistical calculation tag 108 is a statistical calculation tag unit which is configured by the two statistical calculation tags 108*a* and 108*b*. A tab 153 is displayed in the first statistical calculation tag 108*a*. A tab 154 is displayed in the second statistical calculation tag 108*b*.

Information pertaining to a scatter plot which is a first statistical graph which is drawn in the graph tag 103 is displayed in the first statistical calculation tag 108*a*. In the statistical calculation tag 108*a*, a letter string "Scatter Plot" on the first row indicates that the statistical calculation concerned is the one which relates to the scatter plot. A letter string "X:A:A" on the second row indicates that all the values on the column A of the numerical table (statistics) tag 107 are statistical calculation objects and a letter string "Y:B:B" on the third row indicates that all the values on the column B of the numerical table (statistics) tag 107 are statistical calculation objects.

Information pertaining to quadratic regression which is a second statistical graph which is drawn in the graph tag 103 is displayed in the second statistical calculation tag 108*b*. In the second statistical calculation 108*b*, a letter string "Quadratic Regression" on the first row indicates that the statistical calculation concerned is the one which relates to the quadratic regression. A letter string on the second row is a quadratic regression expression, a letter string "X:A1:A5" on the third row indicates that the respective values which are indicated on the first row to the fifth row on the column A of the numerical table (statistics) tag 107 are statistical calculation objects and a letter string "Y:B1:B5" on the fourth row indicates that the respective values which are indicated on the first row to the fifth row of the column B of the numerical table (statistics) tag 107 are statistical calculation objects. A letter string "Freq:1" on the fifth row indicates that the frequency of each of respective values which are indicated on the first row to the fifth row of the column A of the numerical table (statistics) tag 107 is "1" and each of expressions on the sixth row to the eighth row indicates a value of each coefficient of the quadratic regression formula which is obtained on the basis of the values of the statistical calculation objects of the first statistical calculation tag 108*b*.

[Coordinate Value Tag 109]

In FIG. 2, the coordinate value tag 109 that a first coordinate value tag 109*a*, a second coordinate value tag 109*b*, a third coordinate value tag 109*c* and a fourth coordinate value tag 109*d* are connected together in descending order is displayed. In the example in FIG. 2, the coordinate value tag 109 is a coordinate value tag unit which is configured by the four coordinate value tags 109*a*, 109*b*, 109*c* and 109*d*. The point $P_1$ which is a code which indicates one of intersection points of the first graph and the second graph which are drawn in the graph tag 103 and the coordinates (1, 1) of the point $P_1$ are displayed in the first coordinate value tag 109*a*. A point $P_2$ and coordinates (0,0) of the point $P_2$ are displayed in the second coordinate value tag 109*b*. The code $P_3$ which indicates the point on the second graph which is drawn in the graph tag 103 and the coordinates (4.46, 4.46) of $P_3$ are displayed in the third coordinate value tag 109*c*. The code $P_4$ which indicates the point on the second graph which is drawn in the graph tag 103 and the coordinates (−1.96, −1.96) of $P_4$ are displayed in the fourth coordinate value tag 109*d*.

[Arithmetic Operation (α+β) Tag 110]

In FIG. 2, the arithmetic operation (α+β) tag 110 that a first arithmetic operation tag 110*a* and a second arithmetic operation tag 110*b* are vertically connected together is displayed. In the example in FIG. 2, the arithmetic operation (α+β) tag 110 is an arithmetic operation tag unit which is configured by the two arithmetic operation tags 110*a* and 110*b*. An arithmetic expression $x_1+x_2+x_3$ and a solution $x_2+273/50$ of the arithmetic expression are displayed in the first arithmetic operation tag 110*a*. In the example in FIG. 2, "$x_1$" is an x coordinate of the point $P_1$ which is displayed in the first coordinate value tag 109*a*, "$x_2$" is a variable and "$x_3$" is an x coordinate of the point $P_3$ which is displayed in the third coordinate value tag 109*c*. The second arithmetic operation tag 110*b* is in a free state where nothing is input.

In the following, grouping (tying) of the various tags will be described.

[First Group]

It is possible to mutually tie the graph tag 103, the numerical formula tag 104, the slider tag 105 and the numerical table (numerical formula) tag 106 as a first group. In the present specification, there are cases where this state is described as a state where the graph tag 103, the numerical formula tag 104, the slider tag 105 and the numerical table (numerical formula) tag 106 are grouped together. In the system 1, a graph may be drawn in the graph tag 103, the slider tag 105 may be created and further the numerical table (numerical formula) tag 106 may be created on the basis of, for example, a numerical formula which is input into the numerical formula tag 104. In FIG. 2, strings 141, 142 and 143 which indicate that the numerical formula tag 104 is tied to the graph tag 103, the slider tag 105 and the numerical table (numerical formula) tag 106 respectively are illustrated. In addition, it is possible to create the coordinate value tag 109 and the arithmetic operation (α+β) tag 110 in a state of being tied to the graph tag 103 concerned. In FIG. 2, strings 144 and 145 which indicate that the graph tag 103 is tied to the coordinate value tag 109 and the arithmetic operation (α+β) tag 110 respectively are illustrated.

The tab 151 of the first numerical formula tag 104*a*, the first tab 112 of the graph tag 103 and the tab 116 of the numerical table (numerical formula) tag 106 may be displayed with the same color for single-glance recognition of mutual tying of the tags. The tab 152 of the second numerical formula tag 104*b*, the second tab 113 of the graph tag 103 and the tab 117 of the numerical table (numerical formula) tag 106 may be displayed with the same color. Also, colors of the lines and the points of the graphs which are displayed in the graph tag 103 may be set in correspondence with the color concerned.

Although not illustrated in FIG. 2, each of the strings 141, 142 and 143 may be configured by two strings which are parallel with each other, the color of one of the two strings may be made the same as the color of the tab 151 of the first numerical formula tag 104*a*, the first tab 112 of the graph tag 103 and the tab 116 of the numerical table (numerical formula) tag 106 and the color of the other of the two strings may be made the same as the color of the tab 152 of the second numerical formula tag 104*b*, the second tab 113 of the graph tag 103 and the tab 117 of the numerical table (numerical formula) tag 106. Thereby, it becomes possible to recognize that the numerical formula tag 104, the graph tag 103, the numerical table (numerical formula) tag 106 and the slider tag 105 belong to the first group at a glance.

In addition, although not illustrated in FIG. 2, also the first slider tag 105*a* and the second slider tag 105*b* may be equipped with tabs which are the same as the tab 151 of the first numerical formula tag 104*a* and the tab 152 of the second numerical formula tag 104*b*. In this case, the color of the tab of the first slider tag 105*a* may be made the same as the color of the tab 151 of the first numerical formula tag 104*a* and the color of the tab of the second slider tag 105*b* may be made the same as the color of the tab 152 of the second numerical formula tag 104*b*. Thereby, it becomes possible to display a correspondence relation between the respective numerical formulae which are displayed in the respective numerical formula tags 104*a* and 104*b* and the respective sliders 118 and 119 which are displayed in the respective slider tags 105*a* and 105*b* in such a manner that the user grasps the correspondence relation with ease.

[Second Group]

It is possible to mutually tie the graph tag 103, the numerical table (statistics) tag 107 and the statistical calculation tag 108 as a second group. In the present specification, there are cases where this state is described as a state where the graph tag 103, the numerical table (statistics) tag 107 and the statistical calculation tag 108 are mutually grouped. In the system 1, a graph of a result of execution of the statistical calculation is displayed in the graph tag 103 on the basis of, for example, numerical values which are input into the numerical table 111 of the numerical table (statistics) tag 107 and the statistical calculation tag 108 which displays information pertaining to the result of execution of the statistical calculation is created. In FIG. 2, strings 146 and 147 which indicate that the numerical table (statistics) tag 107 is tied to the graph tag 103 and the statistical calculation tag 108 respectively are illustrated.

The third tab 114 of the graph tag 103 and the tab 153 of the first statistical calculation tag 108*a* may be displayed with the same color for single-glance recognition of mutual tying of the tags. The fourth tab 115 of the graph tag 103 and the tab 154 of the second statistical calculation tag 108*b* may be displayed with the same color. Also, colors of the lines and the points of the graph which is displayed in the graph tag 103 may be set in correspondence with the color concerned. In addition, although not illustrated in FIG. 2, each of the strings 144, 145 and 143 may be configured by two strings which are parallel with each other similarly to the aforementioned strings 144 and 145. The color of one of the two strings may be made the same as the color of the third tab 114 of the graph tag 103 and the tab 153 of the first statistical calculation tag 108*a* and the color of the other of the two strings may be made the same as the color of the fourth tab 115 of the graph tag 103 and the tab 154 of the second statistical calculation tag 108*b*.

Incidentally, in the example in FIG. 2, one graph tag 103 belongs to both the first group and the second group. In the present embodiment, it is possible to draw both a function graph and a statistical graph in one graph tag 103.

In FIG. 2, a menu icon bar 50 is illustrated. The menu icon bar 50 is displayed on a position (a specified position or a vicinity position thereof) which is determined on the basis of a position which is specified by a user's operation in accordance with acceptance of the above-mentioned user's operation (for example, a right-click operation using a mouse, an operation of touching on a touch panel and so forth) of specifying an optional position in an area where no object is disposed in the paper 100. The menu icon bar 50 is a floating object similarly to the tags.

The menu icon bar 50 includes an arithmetic operation icon 51, a numerical formula icon 52, a graph icon 53, a numerical table (statistics) icon 54, a geometry icon 55 and a memo icon 56. The icons 51, 52, 53, 54, 55 and 56 which are included in the menu icon bar 50 are icons used to accept inputting operations which are executed in order to display the arithmetic operation tag 102, the numerical formula tag 104, the graph tag 103, the numerical table (statistics) tag 107, a geometric tag 203 (which will be described later with reference to FIG. 29) and the memo tag 101 which are newly created on the paper 100. The various tags which are created in response to input from the menu icon bar 50 are created and displayed in a state of not being tied to other tags. That is, the tags which are created in response to the input from the menu icon bar 50 are not grouped with other tags and are independent of other tags when created.

As described above, a state where the graph tag 103 is selected is illustrated in FIG. 2. In this state, an icon group 60 is displayed in the graph tag 103. The icon group 60 includes a numerical formula icon 61, a numerical table (statistics) icon 62 and an arithmetic operation icon 63. The numerical formula icon 61 is an icon which is used to accept an inputting operation for creating the numerical formula tag 104 which is tied to the graph tag 103 concerned or moving a focus to the existing numerical formula tag 104 which is tied to the graph tag 103 concerned. The numerical table (statistics) icon 62 is an icon which is used to accept an inputting operation for displaying the numerical table (statistics) tag 107 which is tied to the graph tag 103 concerned. The arithmetic operation icon 63 is an icon which is used to accept an inputting operation for displaying the arithmetic operation ($\alpha+\beta$) tag 110 which is tied to the graph tag 103 concerned.

In the present embodiment, the system 1 is able to create the various icons so as to draw a desirable function graph or statistical graph in the graph tag 103, to display coordinate values of an optional point on the drawn graph and to display a result of an arithmetic operation which is executed in accordance with the arithmetic operation program using the coordinate values on the graph, starting from the paper 100 which is in a blank state. In addition, in the system 1, coupling (integration or alignment)/separation (alienation) of the various tags are possible. In the following, a flow of a series of processes in the system 1 will be described.

Figure 3:
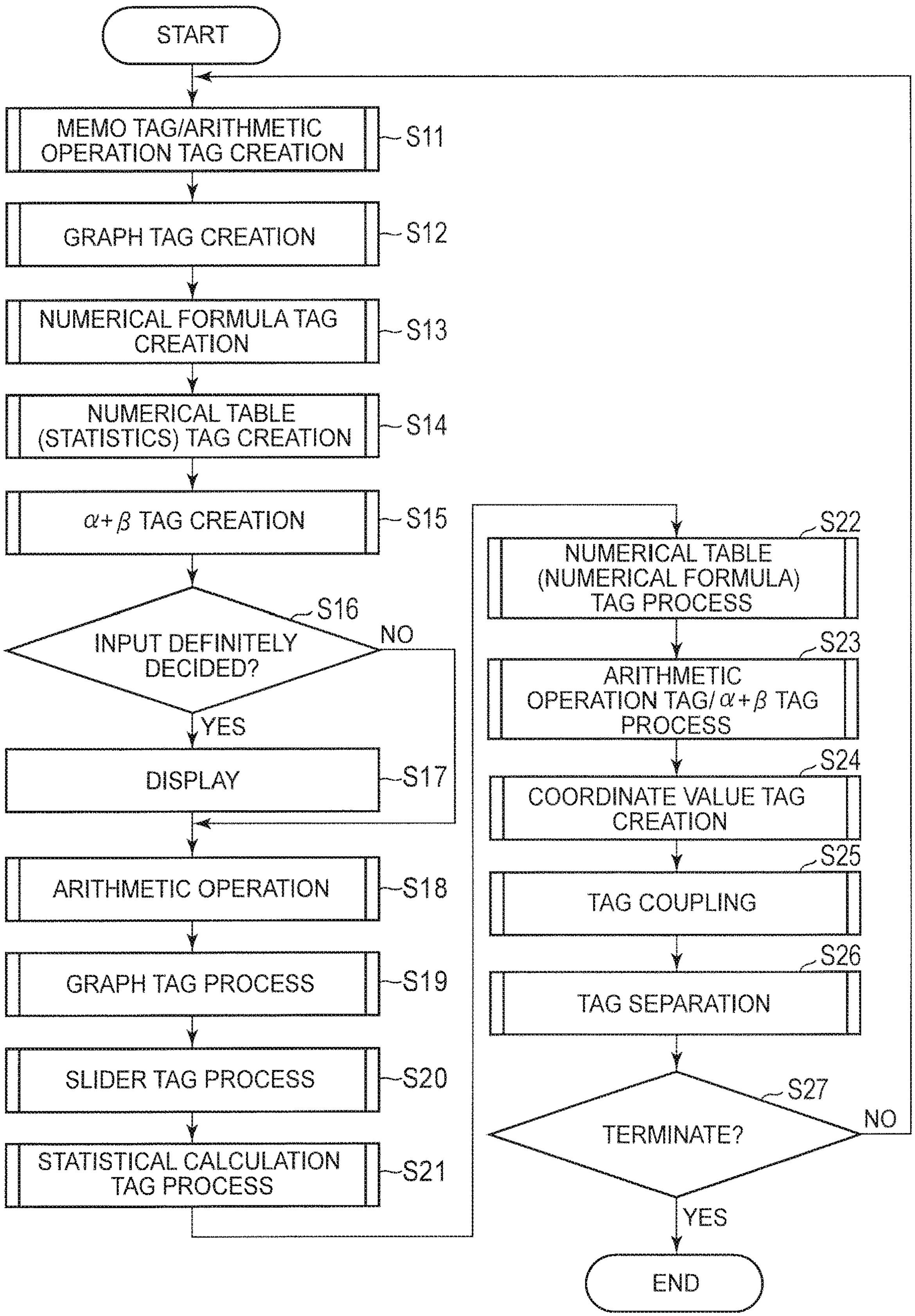
FIG. 3 is a flowchart illustrating one example of an operation of the system according to one embodiment of the present invention.

FIG. 3 is a flowchart illustrating one example of a flow of processes in the system 1.

In step S11, the terminal 20 executes a memo tag/arithmetic operation tag creating process. In step S12, the terminal 20 executes a graph tag creating process. In step S13, the terminal 20 executes a numerical formula tag creating process. In step S14, the terminal 20 executes a numerical table (statistics) tag creating process. In step S15, the terminal 20 executes an arithmetic operation ($\alpha+\beta$) tag creating process.

In step S16, the terminal 20 decides whether an inputting operation of inputting contents into the various tags which are created in the above-mentioned respective tag creation processes (step S11, step S12, step S13, step S14 and step S15) and a definite decision operation of definitely deciding the contents which are input by executing the inputting operation are accepted. In a case where it is decided that the above-mentioned operations are accepted (Yes), the process proceeds to step S17. In step S17, the terminal 20 performs display which is based on accepted display input on the display device 26. In a case where it is decided that the above-mentioned operations are not accepted (No) or after execution of the process in step S17, the process proceeds to step S18. Incidentally, in a case where it is decided that the above-mentioned operations are not accepted, the process may directly transition to step S24 without executing the processes in step S18 to step S23.

In step S18, an arithmetic operation process is executed. In step S18, the server 10 executes the arithmetic operation process on the basis of instructions for execution of the arithmetic operation and necessary information which are received from the terminal 20 and the terminal 20 receives a result of execution of the arithmetic operation.

In step S19, the terminal 20 executes a graph tag process which is based on the result of execution of the arithmetic operation. In step S20, the terminal 20 executes a slider tag process. In step S21, the terminal 20 executes a statistical calculation tag process which is based the result of execution of the arithmetic operation. In step S22, the terminal 20 executes a numerical table (numerical formula) tag process. In step S23, the terminal 20 executes an arithmetic operation tag/arithmetic operation ($\alpha+\beta$) tag process. In step S24, the terminal 20 executes a coordinate values tag process.

In step S25, the terminal 20 executes a tag coupling process. In step S26, the terminal 20 executes a tag separating process.

In step S27, the terminal 20 decides whether execution of the processes is to be terminated. In a case of deciding not to terminate execution of the processes (No), the process returns to step S11. That is, execution of the processes in step S11 and succeeding steps is repeated until termination of execution of the processes is decided, and in a case of deciding to terminate execution of the processes (Yes), the terminal 20 terminates execution of the processes.

Figure 4:
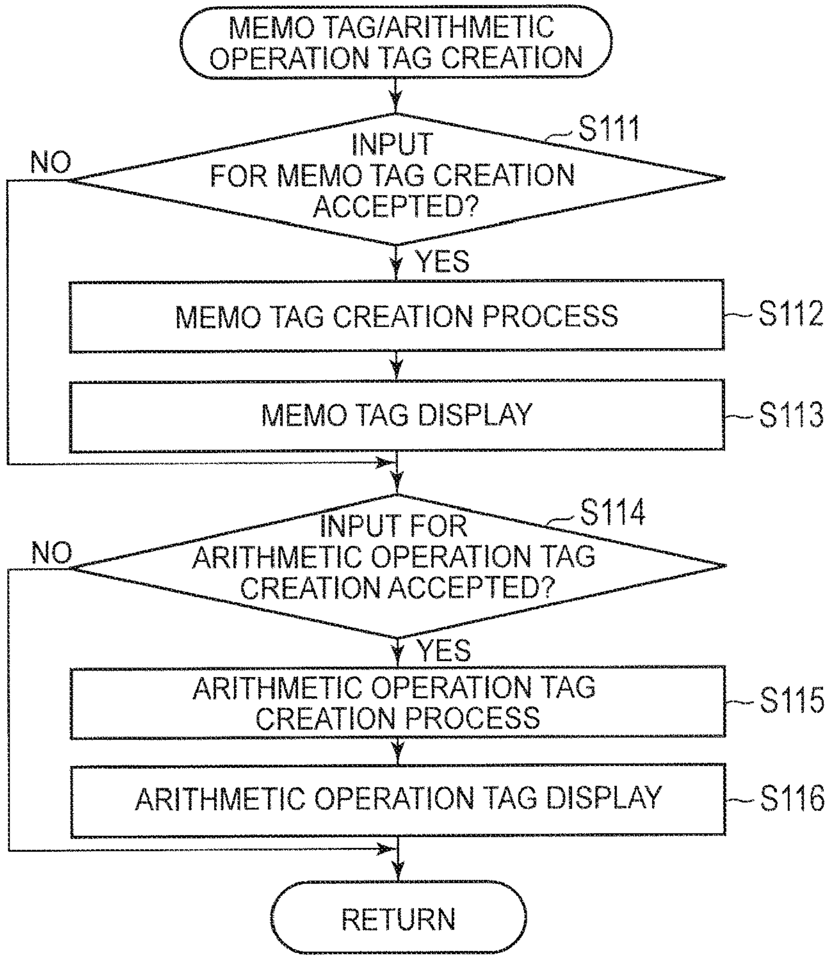
FIG. 4 is a flowchart illustrating one example of memo tag/arithmetic operation tag creation process.

In the following, the above-described respective processes in step S11 to step S15 and step S18 to step S26 will be described with reference to FIG. 4 to FIG. 17. FIG. 4 is a flowchart illustrating one example of the memo tag/arithmetic operation tag creation process (step S11 in FIG. 3).

In step S111, the CPU 21 decides whether input for memo tag creation that the user executes by selecting the memo icon 56 is accepted. In a case where it is decided that the input is accepted (Yes), the process proceeds to step S112. In a case where it is decided that the input is not accepted (No), the process proceeds to step S114.

In step S112, the CPU 21 executes the memo tag creation process. The memo tag creation process is an internal process and includes a process of internally generating the memo tag 101 to be displayed and determining a display position of the memo tag 101. The display position of the memo tag 101 may be, for example, a position which is specified by a user's operation which is executed in order to display the menu icon bar 50 and may be a position which is determined on the basis of the position which is specified by the user's operation when selecting the memo icon 56 of the menu icon bar 50 concerned. Incidentally, it is supposed that also the "creation process" or the "creating process" of each tag in the following description includes the process of internally generating one tag to be displayed and determining the display position of the tag.

In step S113, the CPU 21 operates to additionally display one new memo tag 101 on a position which is determined in step S112 within the paper 100. In this case, a display area of the memo tag 101 is in a free state where nothing is displayed.

In step S114, the CPU 21 decides whether input for arithmetic operation tag creation that the user executes by selecting the arithmetic operation icon 51 is accepted. In a case where it is decided that the input is accepted (Yes), the process proceeds to step S115. In a case where it is decided that the input is not accepted (No), the process returns to previous step.

In step S115, the CPU 21 executes the arithmetic operation tag creation process. A display position of the arithmetic operation tag may be determined similarly to determination of the display position of the memo tag 101. Then, in step S116, the CPU 21 operates to additionally display one new arithmetic operation tag 102 on a position which is determined in step S115 within the paper 100. In this case, a display area of the arithmetic operation tag 102 is in a free state where nothing is displayed. After execution of the process in step S116, the process returns to previous step.

Figure 5:
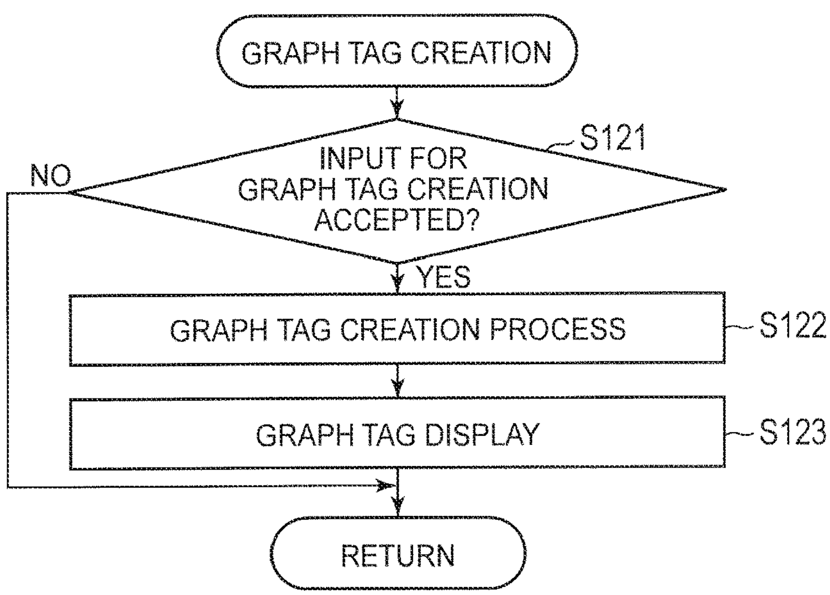
FIG. 5 is a flowchart illustrating one example of graph tag creation process.

FIG. 5 is a flowchart illustrating one example of the graph tag creating process (step S12 in FIG. 3).

In step S121, the CPU 21 decides whether input for graph tag creation that the user executes by selecting the graph icon 53 is accepted. In a case where it is decided that the input is accepted (Yes), the process proceeds to step S122. In a case where it is decided that the input is not accepted (No), the process returns to previous step.

In step S122, the CPU 21 executes the graph tag creation process. Then, in step S123, the CPU 21 operates to additionally display one new graph tag 103 on the paper 100. In this case, although coordinate axes in a coordinate range, a grid, a scale and so forth which are previously determined or are set in accordance with a user's operation are displayed in a display area of the graph tag 103 in accordance with display setting, the graph tag is a free graph tag that the graph is not drawn. In addition, the coordinate axes, the grid, the scale and so forth may not be displayed by display setting. After execution of the process in step S123, the process returns to previous step.

Figure 6:
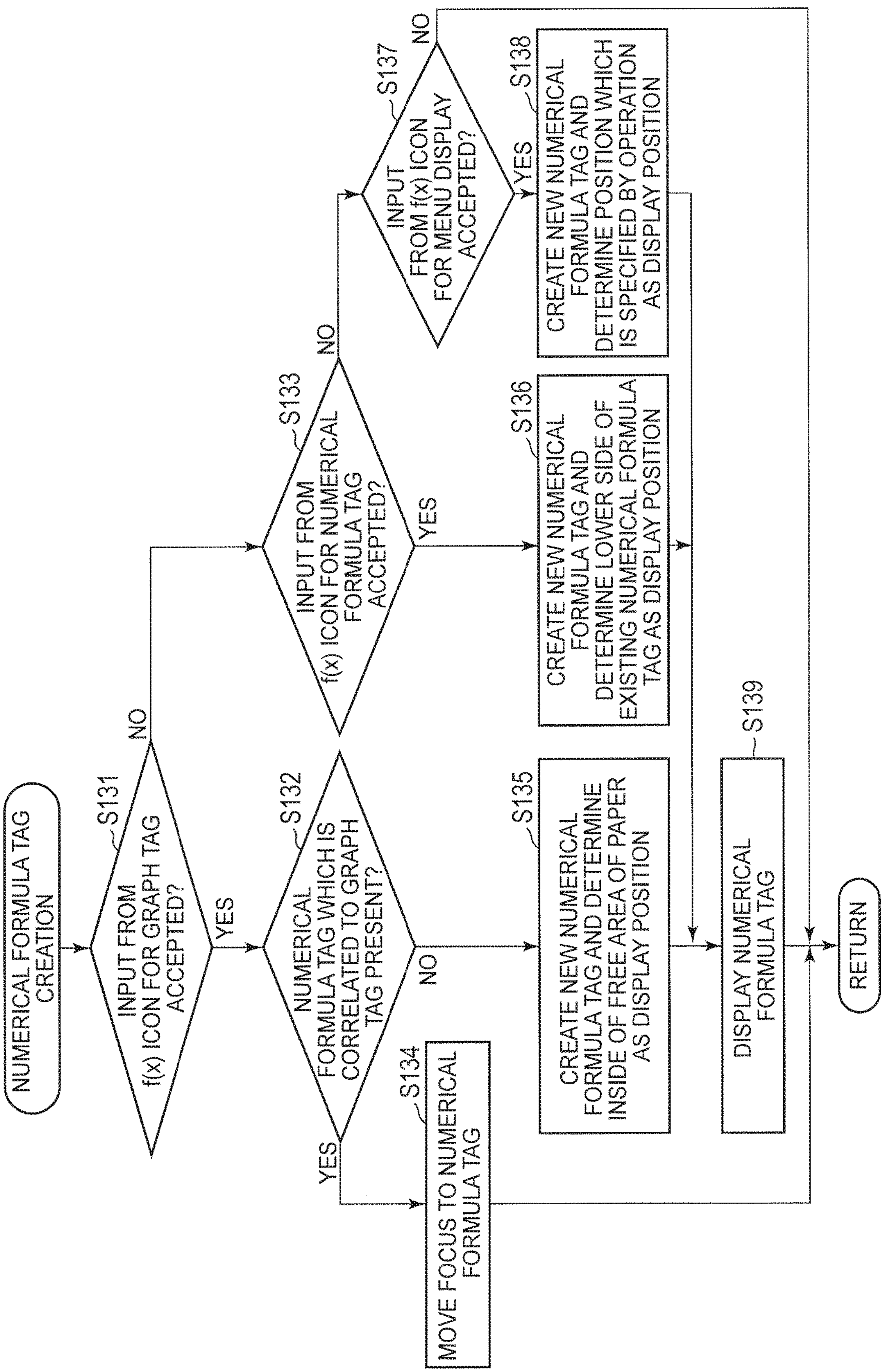
FIG. 6 is a flowchart illustrating one example of numerical formula tag creation process.

FIG. 6 is a flowchart illustrating one example of the process (step S13 in FIG. 3) for numerical formula tag creation.

In step S131, the CPU 21 decides whether input by an inputting operation to the numerical formula icon 61 of the graph tag 103 is accepted. In a case where it is decided that the input is accepted (Yes), the process proceeds to step S132. In a case where it is decided the input is not accepted (No), the process proceeds to step S133.

In step S132, the CPU 21 decides presence/absence of the numerical formula tag 104 which is correlated to the graph tag 103. The numerical formula tag 104 which is correlated to the graph tag 103 is the numerical formula tag 104 which is tied to the graph tag 103, that is, the numerical formula tag 104 which is grouped with the graph tag 103. In a case where presence of the numerical formula tag 104 concerned is decided (Yes), the process proceeds to step S134. In a case where absence of the numerical formula tag 104 is decided (No), the process proceeds to step S135.

In step S134, the CPU 21 operates to move a focus to the existing numerical formula tag 104 which is correlated to the graph tag 103. After execution of the process in step S134, the process returns to previous step.

On the other hand, in step S135, the CPU 21 executes a process of creating one new numerical formula tag 104 which is correlated to the graph tag 103 as the numerical formula tag creation process. The CPU 21 automatically selects a position where the newly created numerical formula tag 104 does not overlap other tags and determines the selected position as a display position of the numerical formula tag 104.

In step S133, the CPU 21 decides whether input which is made by an inputting operation to a numerical formula icon 71 (see FIG. 23A) which is associated with the numerical formula tag 104 is accepted. In a case where it is decided that the input is accepted (Yes), the process proceeds to step S136. In a case where it is decided that the input is not accepted (No), the process proceeds to step S137.

In step S136, the CPU 21 executes a process of creating one new numerical formula tag 104 in a state of being connected to the lower side of the existing numerical formula tag 104 as the numerical formula tag creation process. A display position of the new numerical formula tag 104 is a position where the new numerical formula tag 104 and the existing numerical formula tag 104 are displayed in a state of being vertically aligned with each other with the new numerical formulas tag 104 being adjacent to the lower side of the existing numerical formula tag 104.

In step S137, the CPU 21 decides whether input which is made by an inputting operation to the numerical formula icon 52 of the menu icon bar 50 is accepted. In a case where it is decided that the input is accepted (Yes), the process proceeds to step S138. In a case where it is decided that the input is not accepted (No), the process returns to previous step.

In step S138, the CPU 21 executes a process of creating one new numerical formula tag 104. A display position of the new numerical formula tag 104 may be determined similarly to determination of the display position of the memo tag 101.

After execution of the process in step S135, step S136 or step S138, the process proceeds to step S139. In step S139, the CPU 21 additionally displays one new numerical formula tag 104 on the position which is determined in step S135, step S136 or step S138 within the paper 100. After execution of the process in step S139, the process returns to previous step.

Figure 7:
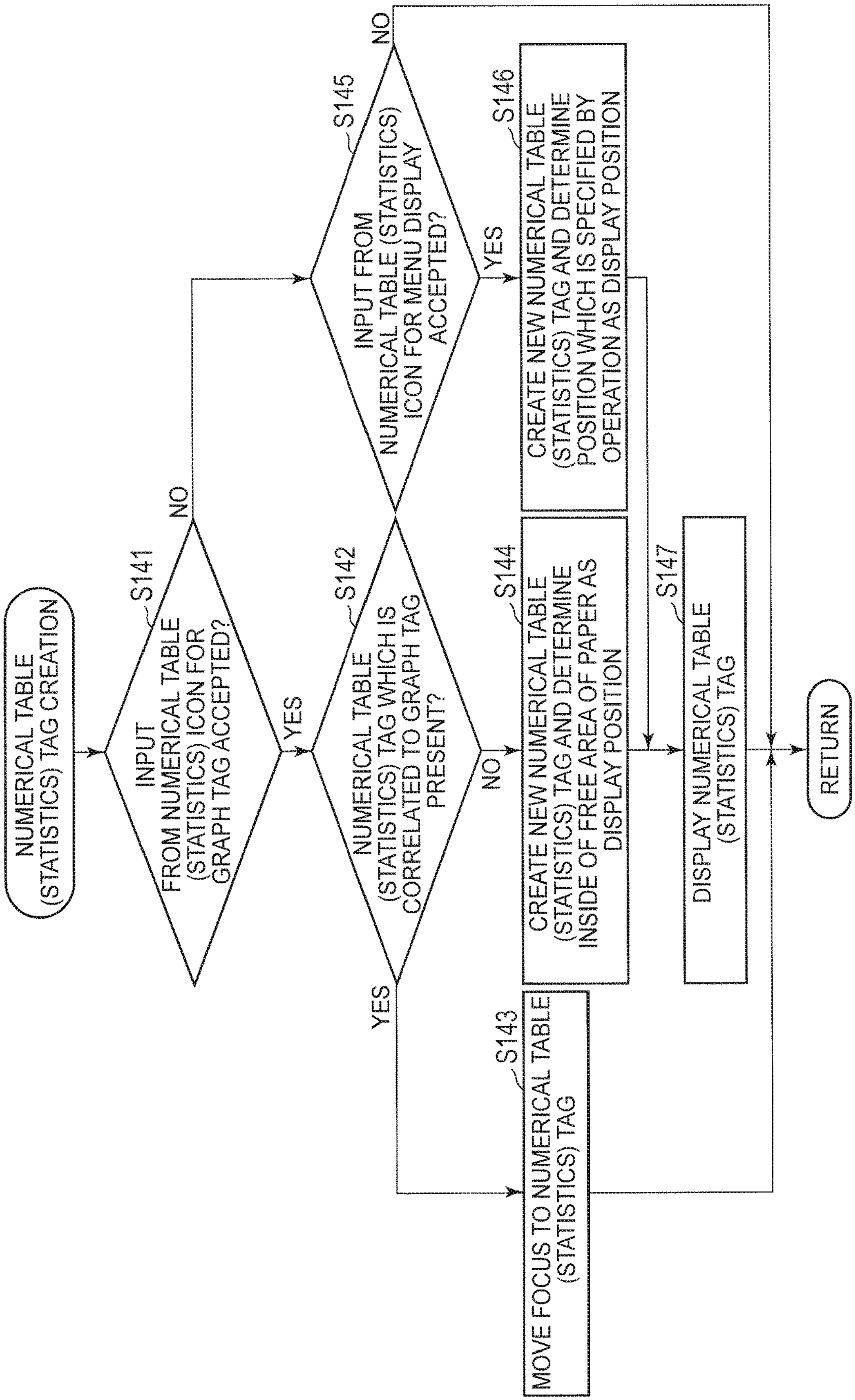
FIG. 7 is a flowchart illustrating one example of numerical table (statistics) tag creation process.

FIG. 7 is a flowchart illustrating one example of the numerical table (statistics) tag creation process (step S14 in FIG. 3).

In step S141, the CPU 21 decides whether input which is made by an inputting operation to the numerical table (statistics) icon 62 of the graph tag 103 is accepted. In a case where it is decided that the input is accepted (Yes), the process proceeds to step S142. In a case where it is decided that the input is not accepted (No), the process proceeds to step S145.

In step S142, the CPU 21 decides presence/absence of the numerical table (statistics) tag 107 which is correlated to the graph tag 103. The numerical table (statistics) tag 107 which is correlated to the graph tag 103 is a numerical table (statistics) tag which is tied to the graph tag 103, that is, the numerical table (statistics) tag 107 which is grouped with the graph tag 103. In a case where the presence of the numerical table (statistics) tag 107 concerned is decided (Yes), the process proceeds to step S143. In a case where the absence of the numerical table (statistics) tag 107 is decided, the process proceeds to step S144.

In step S143, the CPU 21 moves the focus to the existing numerical table (statistics) tag 107 which is correlated to the graph tag 103. After execution of the process in step S143, the process returns to previous step.

On the other hand, in step S144, the CPU 21 executes a process of creating one new numerical table (statistics) tag 107 which is correlated to the graph tag 103 as the graph tag creation process. The CPU 21 automatically selects a position where the new numerical table (statistics) tag 107 does not overlap other tags and determines the selected position as a display position of the new numerical table (statistics) tag 107.

In step S145, the CPU 21 decides whether input which is made by an inputting operation to the numerical table (statistics) icon 54 of the menu icon bar 50 is accepted. In a case where it is decided that the input is accepted (Yes), the process proceeds to step S146. In a case where it is decided that the input is not accepted (No), the process returns to previous step.

In step S146, the CPU 21 executes a process of creating one new numerical table (statistics) tag 107. The display position of the numerical table (statistics) tag 107 may be determined similarly to determination of the display position of the memo tag 101.

After execution of the process in step S144 or step S146, the process proceeds to step S147. In step S147, the CPU 21 additionally displays one new numerical table (statistics) tag 107 on the position which is determined in step S144 or step S146 within the paper 100. After execution of the process in step S147, the process returns to previous step.

Figure 8:
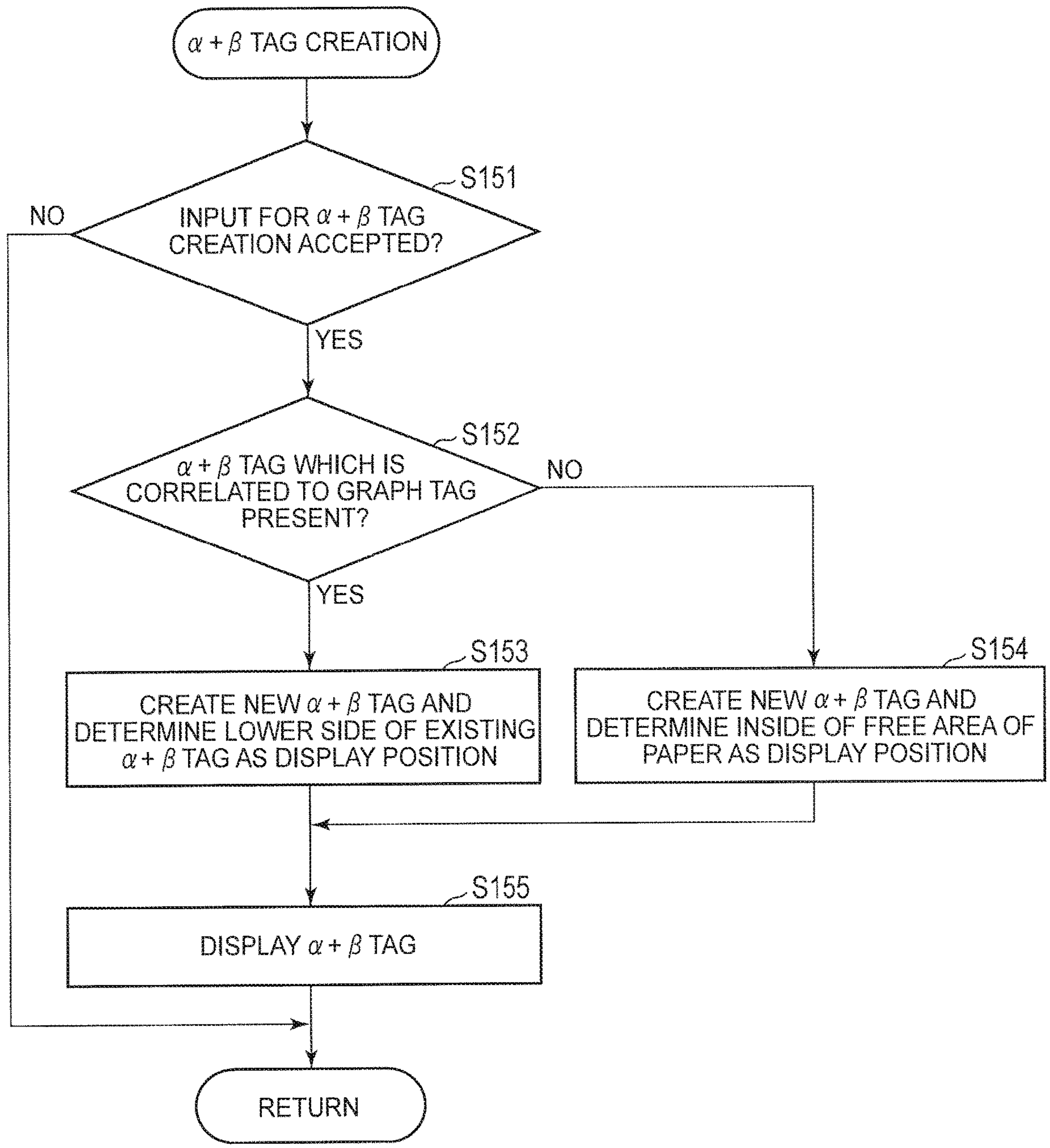
FIG. 8 is a flowchart illustrating one example of arithmetic operation ($\alpha+\beta$) tag creation process.

FIG. 8 is a diagram illustrating one example of the arithmetic operation (α+β) tag creation process (step S15 in FIG. 3).

In step S151, the CPU 21 decides whether input for creation of the arithmetic operation (α+β) tag 110 by selection of the arithmetic operation icon 63 of the graph tag 103 which is made by the user is accepted. In a case where it is decided that the input is accepted (Yes), the process proceeds to step S152. In a case where it is decided that the input is not accepted (No), the process returns to previous step.

In step S152, the CPU 21 decides presence/absence of the arithmetic operation (α+β) tag 110 which is correlated to the graph tag 103. The arithmetic operation (α+β) tag 110 which is correlated to the graph tag 103 is the arithmetic operation (α+β) tag 110 which is tied to the graph tag 103, that is, the arithmetic operation (α+β) tag 110 which is grouped with the graph tag 103. In a case where the presence of the arithmetic operation (α+β) tag 110 is decided (Yes), the process proceeds to step S153. In a case where the absence of the arithmetic operation (α+β) tag 110 is decided (No), the process proceeds to step S154.

In step S153, the CPU 21 executes a process of creating one new arithmetic operation (α+β) tag 110 in a state of being connected to the lower side of the existing arithmetic operation (α+β) tag 110. A display position of the arithmetic operation (α+β) tags 110 is a position where the new the arithmetic operation (α+β) tag 110 and the existing arithmetic operation (α+β) tag 110 are displayed in a state of being vertically aligned with each other with the new arithmetic operation (α+β) tag 110 being adjacent to the lower side of the existing arithmetic operation (α+β) tag 110.

On the other hand, in step S154, the CPU 21 executes a process of creating one new arithmetic operation (α+β) tag 110. The CPU 21 automatically selects a position where the new arithmetic operation (α+β) tag 110 does not overlap other tags and determines the selected position as a display position of the new arithmetic operation (α+β) tag 110.

After execution of the process in step S153 or step S154, in step S155, the CPU 21 operates to display the arithmetic operation (α+β) tag 110. After execution of the process in step S155, the process returns to previous step.

Figure 9:
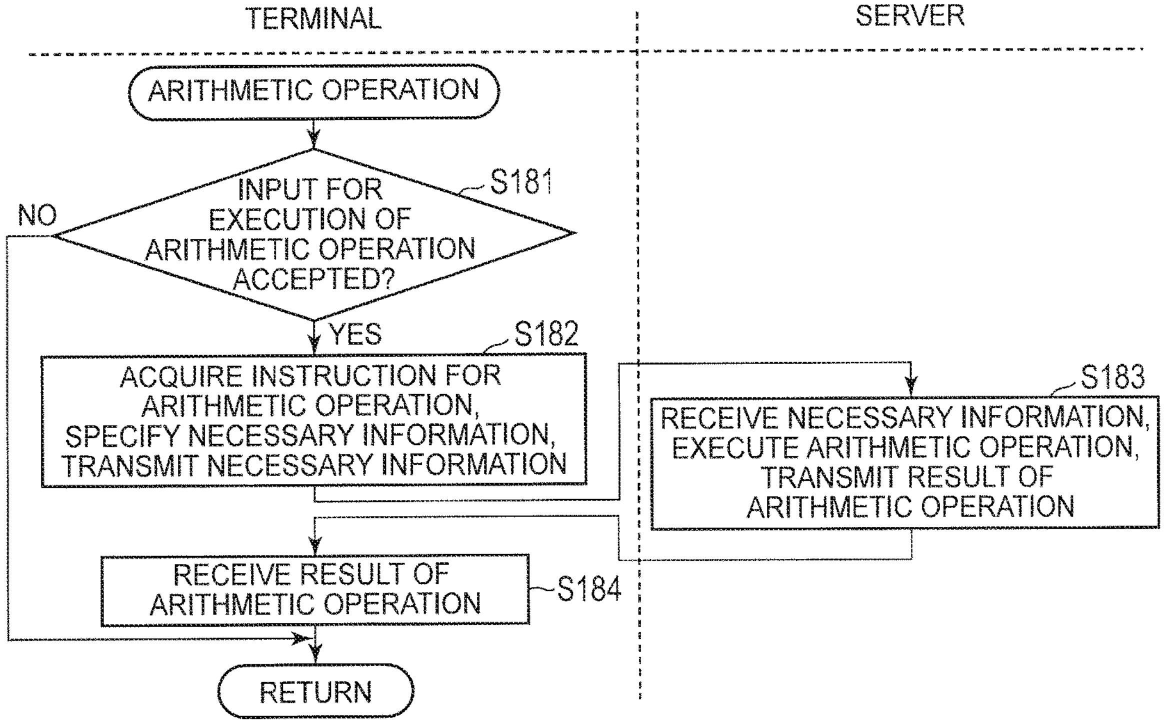
FIG. 9 is a flowchart illustrating one example of an arithmetic operation process.

FIG. 9 is a flowchart illustrating one example of the arithmetic operation process (step S18 in FIG. 3). In the present embodiment, the arithmetic operation is executed by the server 10. The server 10 executes the arithmetic operation in accordance with the arithmetic operation program of the server 10 on the basis of an instruction for execution of the arithmetic operation and information which is necessary for execution of the arithmetic operation which are acquired from the terminal 20 and returns a result of execution of the arithmetic operation to the terminal 20.

In step S181, the CPU 21 decides whether an input for execution of the arithmetic operation is accepted. In a case where an inputting operation and a definite decision operation (hereinafter, referred to as an "input/definite decision operation" all in one piece) for each of the various tags are accepted in the aforementioned step S16, the CPU 21 decides that the input for execution of the arithmetic operation is accepted. In a case where the input/definite decision operation is not accepted in step S16, the CPU 21 decides that the input for execution of the arithmetic operation is not accepted. In a case where it is decided that the input for execution of the arithmetic operation is accepted (Yes), the process proceeds to step S182. In a case where it is decided that the input for execution of the arithmetic operation is not accepted (No), the process returns to previous step.

In step S182, the CPU 21 acquires arithmetic operation instruction information in accordance with the input/definite decision operation for each of the various tags, specifies necessary information and transmits the necessary information to the server 10.

Specifically, when input of a numerical formula into the numerical formula tag 104 is definitely decided, information which includes the numerical formula whose input is definitely decided and the coordinate range of the graph display area is specified as the necessary information and is transmitted to the server 10 (the information which is necessary for execution of the processes in step S19 and step S20 in FIG. 3). When one statistical calculation type is selected after inputting numerical values into the numerical table (statistics) tag 107, information which includes the numerical values whose input is definitely decided and the selected statistical calculation type is specified as the necessary information and is transmitted to the server 10 (the information which is necessary for execution of the process in step S21 in FIG. 3). When the numerical table (numerical formula) icon 72 for the numerical formula tag 104 is selected, information which includes the numerical formula whose input into the numerical formula tag 104 concerned is definitely decided is specified as the necessary information and is transmitted to the server 10 (the information which is necessary for execution of the process in step S22 in FIG. 3). When input of an arithmetic operation expression into the arithmetic operation tag 102 or the arithmetic operation ($\alpha+\beta$) tag 110 is definitely decided, information which includes the arithmetic operation expression whose input is definitely decided, values of variables in the arithmetic operation expression when necessary and so forth is specified as the necessary information and is transmitted to the server 10 (the information which is necessary for execution of the process in step S23 in FIG. 3).

In step S183, the server 10 receives the necessary information and executes arithmetic operations for graph drawing, arithmetic operations such as statistical calculations and so forth, four arithmetic operations and so forth in accordance with the arithmetic operation program and on the basis of the necessary information.

Specifically, the server 10 arithmetically obtains data which is necessary for drawing into the graph tag 103 such as coordinates of respective points and so forth which configure a graph on the basis of the necessary information which includes the numerical formula whose input into the numerical formula tag 104 is definitely decided and the coordinate range of the graph display area (the process in step S19 in FIG. 3). In addition, the server 10 arithmetically obtains data which is necessary for drawing into the graph tag 103 such as the coordinates of the respective points and so forth which configure a graph which indicates a result of execution of the statistical calculations on the basis of the necessary information which includes the numerical values whose input into the numerical table (statistics) tag 107 is definitely decided and the selected statistical calculation type (the process in step S19 in FIG. 3). Further, the server 10 arithmetically obtains data which is necessary for drawing into the slider tag 105 such as a variable (character/letter) and a numerical value range, a default value and so forth of a slider when necessary on the basis of the necessary information which includes the numerical formula whose input into the numerical formula tag 104 is definitely decided (the process in step S20 in FIG. 3).

The server 10 arithmetically obtains data which is necessary for drawing into the statistical calculation tag 108 such as the result of execution of the statistical calculations and so forth on the basis of necessary information which includes the numerical values whose input into the numerical table (statistics) tag 107 is definitely decided and the selected statistical calculation type (the process in step S21 in FIG. 3). The server 10 arithmetically obtains data which is necessary for drawing into the numerical table (statistics) tag 106 such as a predefined independent variable value, a dependent variable value which depends on the independent variable value and so forth on the basis of the necessary information which includes the numerical formula whose input into the numerical formula tag 104 is definitely decided (the process in step S22 in FIG. 3). The server 10 arithmetically obtains data which is necessary for drawing into the arithmetic operation tag 102 or the arithmetic operation ($\alpha+\beta$) tag 110 such as the numerical values and so forth of a result of execution of the arithmetic operation on the basis of the necessary information which includes the arithmetic operation expression whose input into the arithmetic operation tag 102 or the arithmetic operation ($\alpha+\beta$) tag 110 is definitely decided, values of variables in the arithmetic operation expression when necessary and so forth (the process in step S23 in FIG. 3).

In addition, in step S183, the server 10 transmits data which is necessary for drawing of the respective tags and is obtained in this way to the terminal 20 as the result of execution of the arithmetic operation.

In step S184, the terminal 20 receives the result of execution of the arithmetic operation. The terminal 20 stores the received result of execution of the arithmetic operation into the storage 24. After execution of the process in step S184, the process returns to previous step.

It is possible to hide a complicated arithmetic operation algorithm without disclosing the algorithm by executing the various arithmetic operation processes not by the terminal 20 but by the server 10 in this way. In addition, thereby, it becomes possible to provide a result of execution of a complicated arithmetic operation even with the use of the terminal 20 which is comparatively low in processing ability and a general-purpose application such as the Web browser and so forth.

Figure 10:
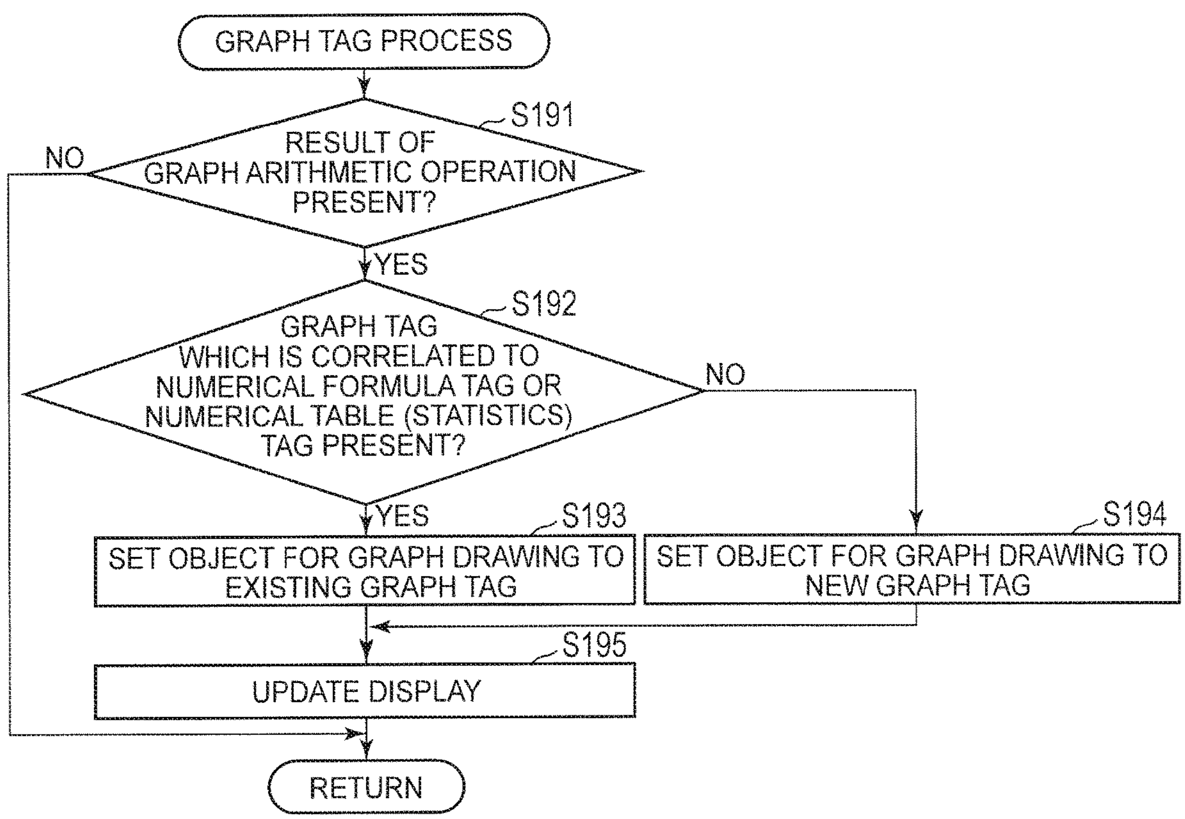
FIG. 10 is a flowchart illustrating one example of a graph tag process.

FIG. 10 is a flowchart illustrating one example of the graph tag process (step S19 in FIG. 3).

In step S191, the CPU 21 decides whether the aforementioned data which is necessary for drawing into the graph tag 103 is received from the server 10 as the result of execution of the arithmetic operation for the graph in the aforementioned step S18 (step S184). In a case where it is decided that the result of execution of the arithmetic operation for the graph is received (Yes), the process proceeds to step S192. In a case where it is decided that the result of execution of the arithmetic operation for the graph is not received (No), the process returns to previous step.

In step S192, the CPU 21 decides presence/absence of the graph tag 103 which is correlated to the numerical formula tag 104 or the numerical table (statistics) tag 107 which accepts input for making the server 10 execute the arithmetic operation for obtaining the result of execution of the arithmetic operation for graph (the data which is necessary for drawing into the graph tag 103). In a case where it is decided that the graph tag 103 which is correlated to the numerical formula tag 104 concerned or the numerical table (statistics) tag 107 concerned is present (Yes), the process proceeds to step S193. In a case where it is decided that the graph tag 103 is not present (No), the process proceeds to step S194.

In step S193, the CPU 21 sets the existing graph tag 103 as an object for graph drawing on the basis of the result of execution of the arithmetic operation for the graph.

On the other hand, in step S194, the CPU 21 sets the new graph tag 103 as the object for graph drawing on the basis of the result of execution of the arithmetic operation for the graph.

After execution of the process in step S193 or step S194, in step S195, the CPU 21 operates to update the display. After execution of the process in step S195, the process returns to previous step.

Figure 11:
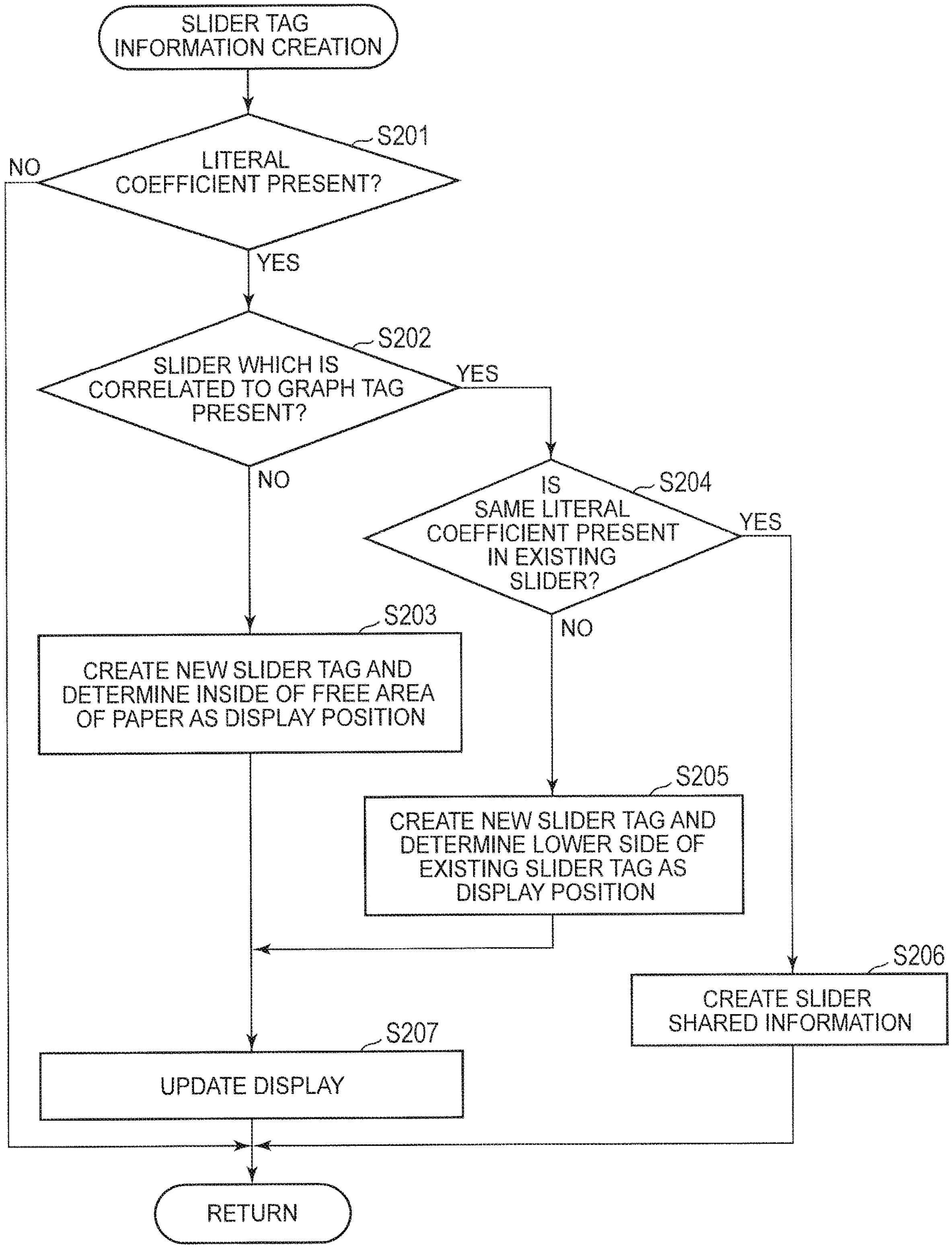
FIG. 11 is a flowchart illustrating one example of a slider tag process.

FIG. 11 is a flowchart illustrating one example of the slider tag process (step S20 in FIG. 3).

In step S201, the CPU 21 decides presence/absence of a variable (which corresponds to a literal coefficient in the numerical formula tag 104 which accepts the input for making the server 10 execute the arithmetic operation for obtaining the data which is necessary for drawing into the graph tag 103) of the slider as the result of execution of the arithmetic operation in the aforementioned step S18 (step S184). In a case where it is decided that the variable concerned is present (Yes), the process proceeds to step S202. In a case where it is decided that the variable concerned is not present (No), the process proceeds to step S204.

In step S203, the CPU 21 executes a process of creating one new slider tag 105 as the slider tag creation process. The CPU 21 automatically selects a position where the new slider tag 105 does not overlap other tags and determines the position so selected as a display position of the new slider tag 105.

On the other hand, in step S204, the CPU 21 decides presence/absence of the variable which is the same as the variable in the existing slider tag 105. In a case where it is decided that the same variable is not present (No), the process proceeds to step S205. In a case where it is decided that the same variable is present (Yes), the process proceeds to step S206.

In step S205, the CPU 21 executes a process of creating one new slider tag 105 in a state of being connected to the lower side of the existing slider tag 105 as the slider tag creation process. A display position of the slider tags 105 is a position where the new slider tag 105 and the existing slider tag 105 are displayed in a state of being vertically aligned with each other with the new slider tag 105 being adjacent to the lower side of the existing slider tag 105.

In step S206, the CPU 21 executes a process of generating slider shared information. After execution of the process in step S206, the process returns to previous step.

After execution of the process in step S203 or step S205, in step S207, the CPU 21 operates to update the display. After execution of the process in step S207, the process returns to previous step.

Figure 12:
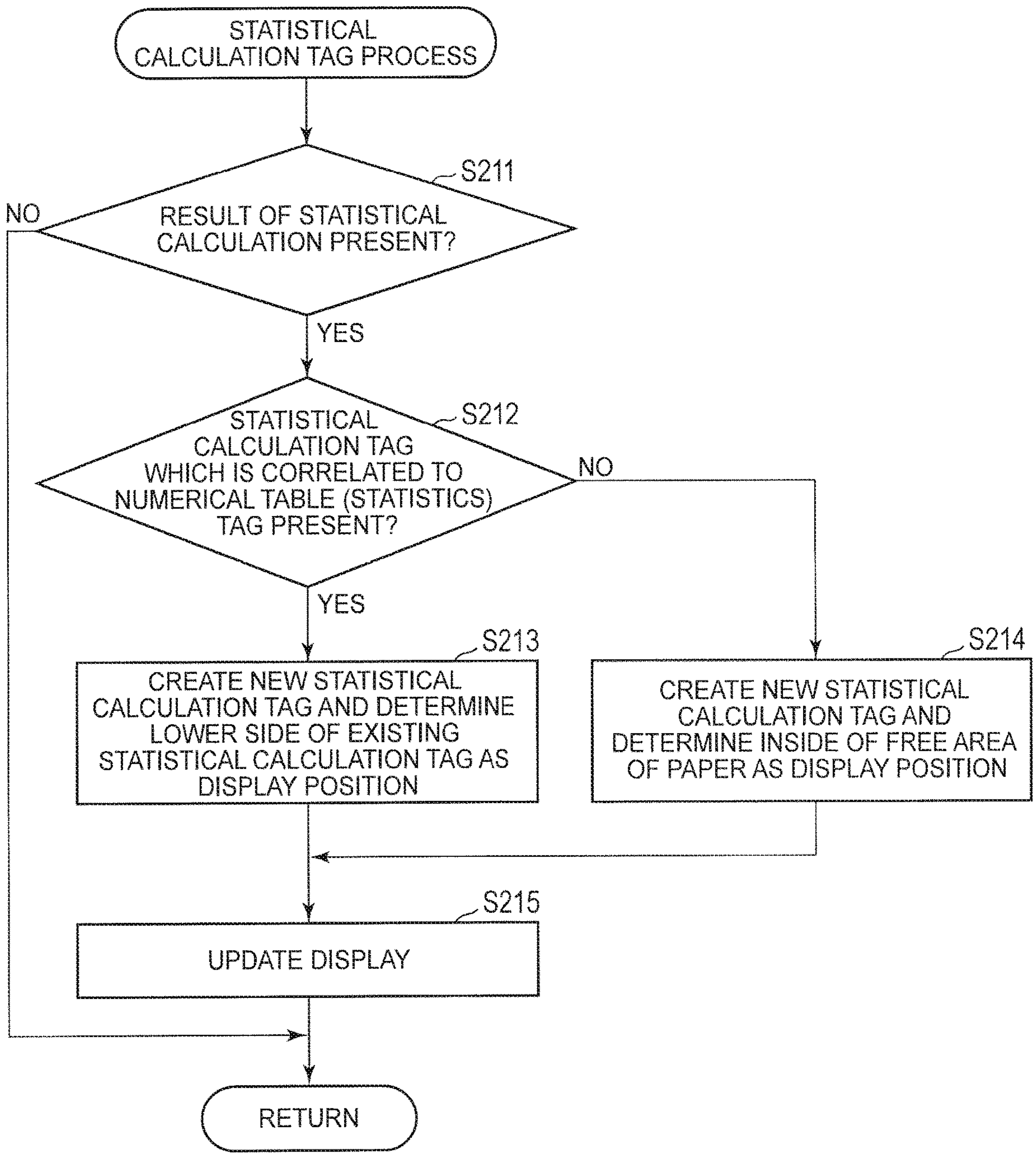
FIG. 12 is a flowchart illustrating one example of a statistical calculation tag process.

FIG. 12 is a flowchart illustrating one example of the statistical calculation tag process (step S21 in FIG. 3).

In step S211, the CPU 21 decides whether data which is displayed in the statistical calculation tag 108 is received from the server 10 as the result of the statistical calculation which is executed in the aforementioned step S18 (step S184). In a case where it is decided that the result of execution of the statistical calculation is received (Yes), the process proceeds to step S212. In a case where it is decided that the result of execution of the statistical calculation is not received (No), the process returns to previous step.

In step S212, the CPU 21 decides presence/absence of the statistical calculation tag 108 which is correlated to the numerical table (statistics) tag 107 which accepts the input for making the server 10 execute arithmetic operation for obtaining a result of execution of the statistical calculation (data which is displayed in the statistical calculation tag 108). In a case where it is decided that the statistical calculation tag 108 concerned is present (Yes), the process proceeds to step S213. In a case where it is decided that the statistical calculation tag 108 concerned is not present (No), the process proceeds to step S214.

In step S213, the CPU 21 executes a process of creating one new statistical calculation tag 108 in a state of being connected to the lower side of the existing statistical calculation tag 108. A display position of the statistical calculation tags 108 is a position where the new statistical calculation tag 108 and the existing statistical calculation tag 108 are displayed in a state of being vertically aligned with each other with the new statistical calculation tag 108 being adjacent to the lower side of the existing statistical calculation tag 108.

On the other hand, in step S214, the CPU 21 executes the process of creating one new statistical calculation tag 108. The CPU 21 automatically selects a position where the new statistical calculation tag 108 does not overlap other tags and determines the selected position as the display position of the new statistical calculation tag 108.

After execution of the process in step S213 or step S214, in step S215, the CPU 21 operates to update the display. After execution of the process in step S215, the process returns to previous step.

Figure 13:
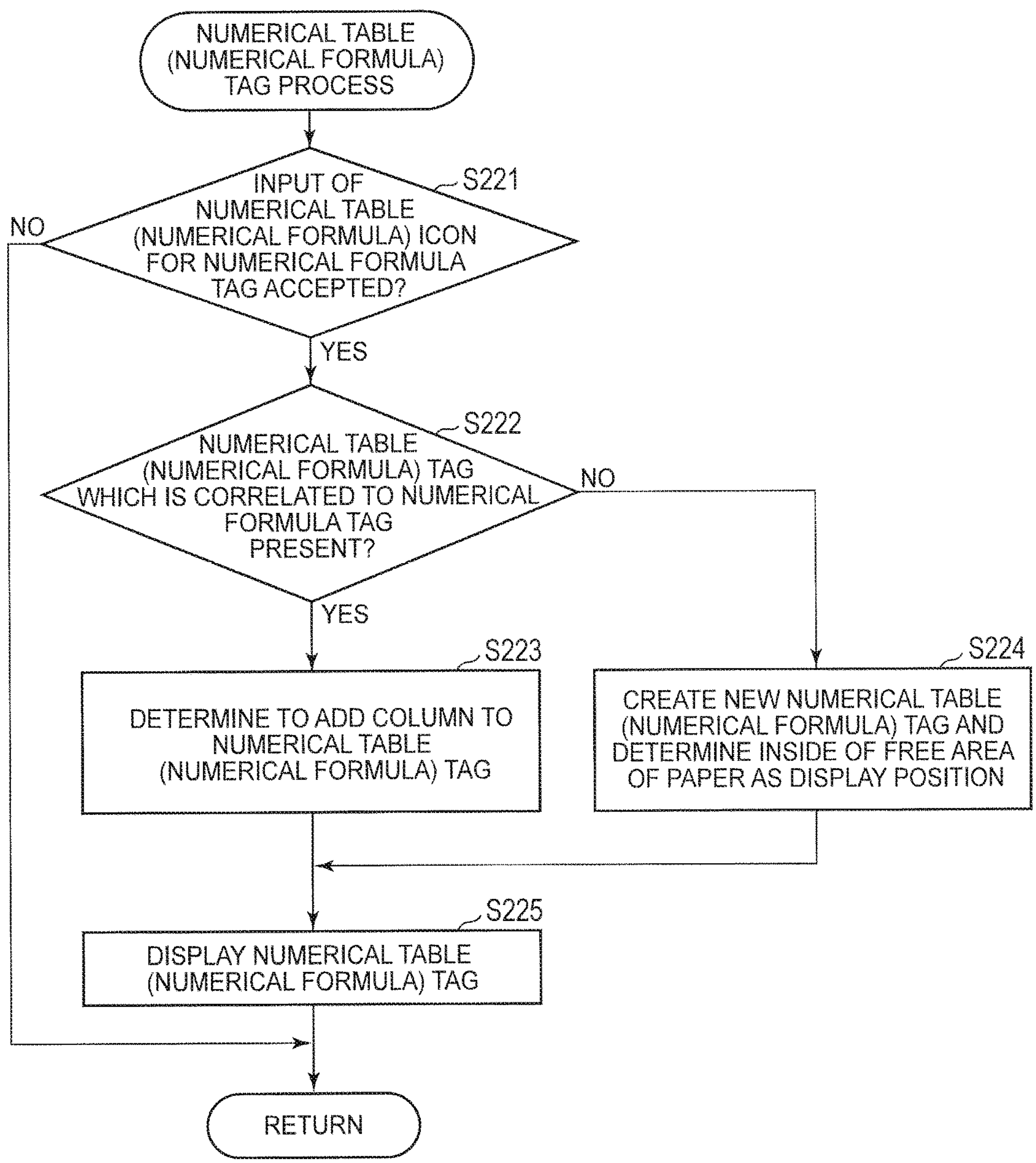
FIG. 13 is a flowchart illustrating one example of a numerical table (numerical formula) tag process.

FIG. 13 is a flowchart illustrating one example of the numerical table (numerical formula) tag process (step S22 in FIG. 3).

In step S221, the CPU 21 decides whether input which is made by an inputting operation to the numerical table (numerical formula) icon 72 for the numerical formula tag 104 is accepted as the input/definite decision operation for the numerical formula tag 104 in the aforementioned step S16. In a case where it is decided that the input is accepted (Yes), the process proceeds to step S222. In a case where it is decided that the input is not accepted (No), the process returns to previous step.

In step S222, the CPU 21 decides presence/absence of the numerical table (numerical formula) tag 106 which is correlated to the numerical formula tag 104 which accepts the input in step S221. In a case where it is decided that the numerical table (numerical formula) tag 106 concerned is present (Yes), the process proceeds to step S223. In a case where it is decided that the numerical table (numerical formula) tag 106 concerned is not present (No), the process proceeds to step S224.

In step S223, the CPU 21 executes a process of adding a column which relates to numerical values of the numerical formula of the numerical formula tag 104 to the numerical table (numerical formula) tag 106.

On the other hand, in step S224, the CPU 21 executes a process of creating one new numerical table (numerical formula) tag 106. The CPU 21 automatically selects a position where the new numerical table (numerical formula) tag 106 does not overlap other tags and determines the selected position as the display position of the new numerical table (numerical formula) tag 106.

After execution of the process in step S223 or step S224, in step S225, the CPU 21 operates to display the numerical table (numerical formula) tag 106. After execution of the process in step S225, the process returns to previous step.

Figure 14:
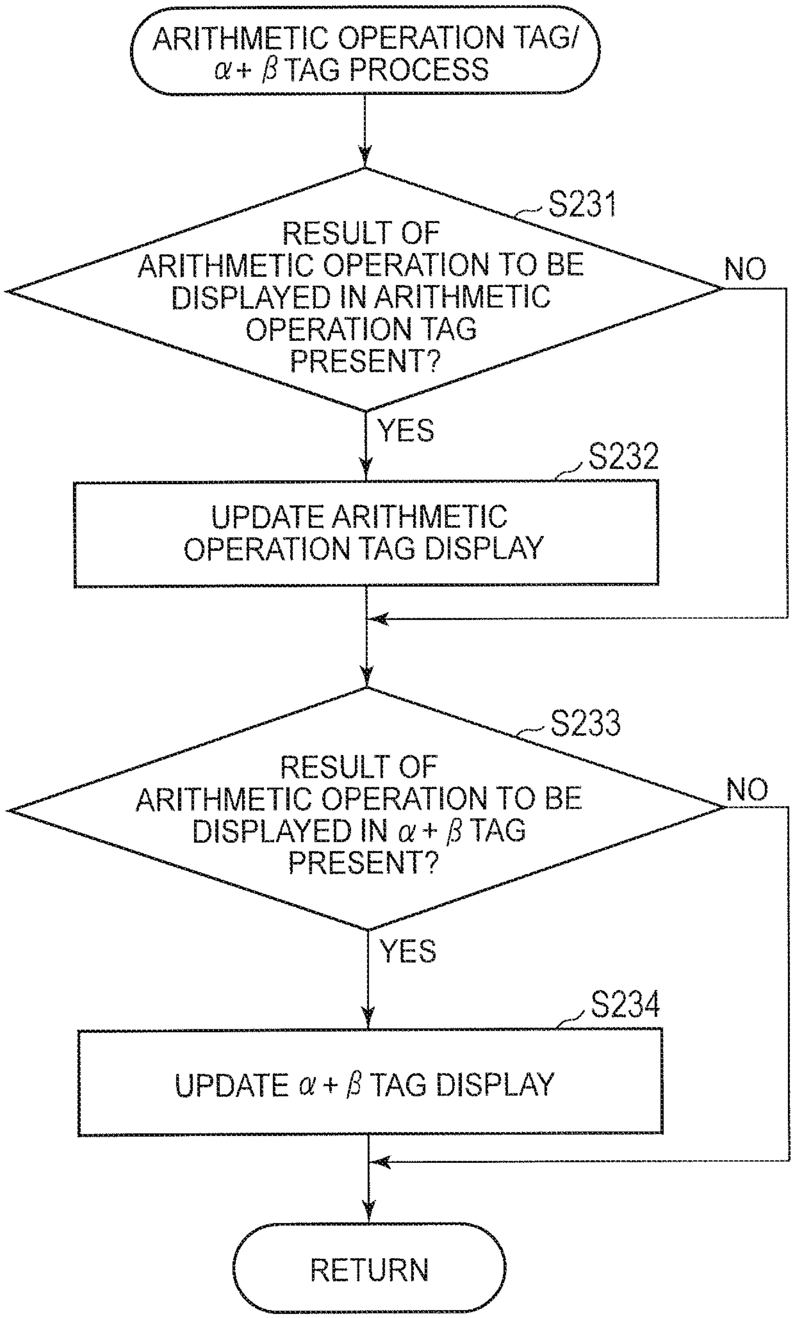
FIG. 14 is a flowchart illustrating one example of an arithmetic operation tag/arithmetic operation ($\alpha+\beta$) tag process.

FIG. 14 is a flowchart illustrating one example of the arithmetic operation tag/arithmetic operation ($\alpha+\beta$) tag process (step S23 in FIG. 3).

In step S231, the CPU 21 decides whether the data which is displayed in the aforementioned arithmetic operation tag 102 or arithmetic operation ($\alpha+\beta$) tag 110 is received from the server 10 as the result of execution of the arithmetic operation in the aforementioned step S18 (step S184). In a case where it is decided that the result of execution of the arithmetic operation concerned is received (Yes), the process proceeds to step S232. In step S232, the CPU 21 operates to display the result of execution of the arithmetic operation concerned in the arithmetic operation tag 102. On the other hand, in a case where it is decided that the result of execution of the arithmetic operation is not received (No) or after execution of the process in step S232, the process proceeds to step S233.

In step S233, the CPU 21 decides whether data which is displayed in the arithmetic operation (α+β) tag 110 is received from the server 10 as a result of execution of the arithmetic operation in the aforementioned step S18 (step S184). In a case where it is decided that the result of execution of the arithmetic operation concerned is received (Yes), the process proceeds to step S234. In step S234, the CPU 21 operates to display the result of execution of the arithmetic operation concerned in the arithmetic operation (α+β) tag 110. On the other hand, in a case where it is decided that the result of execution of the arithmetic operation is not received (No) or after execution of the process in step S234, the process returns to previous step.

Figure 15:
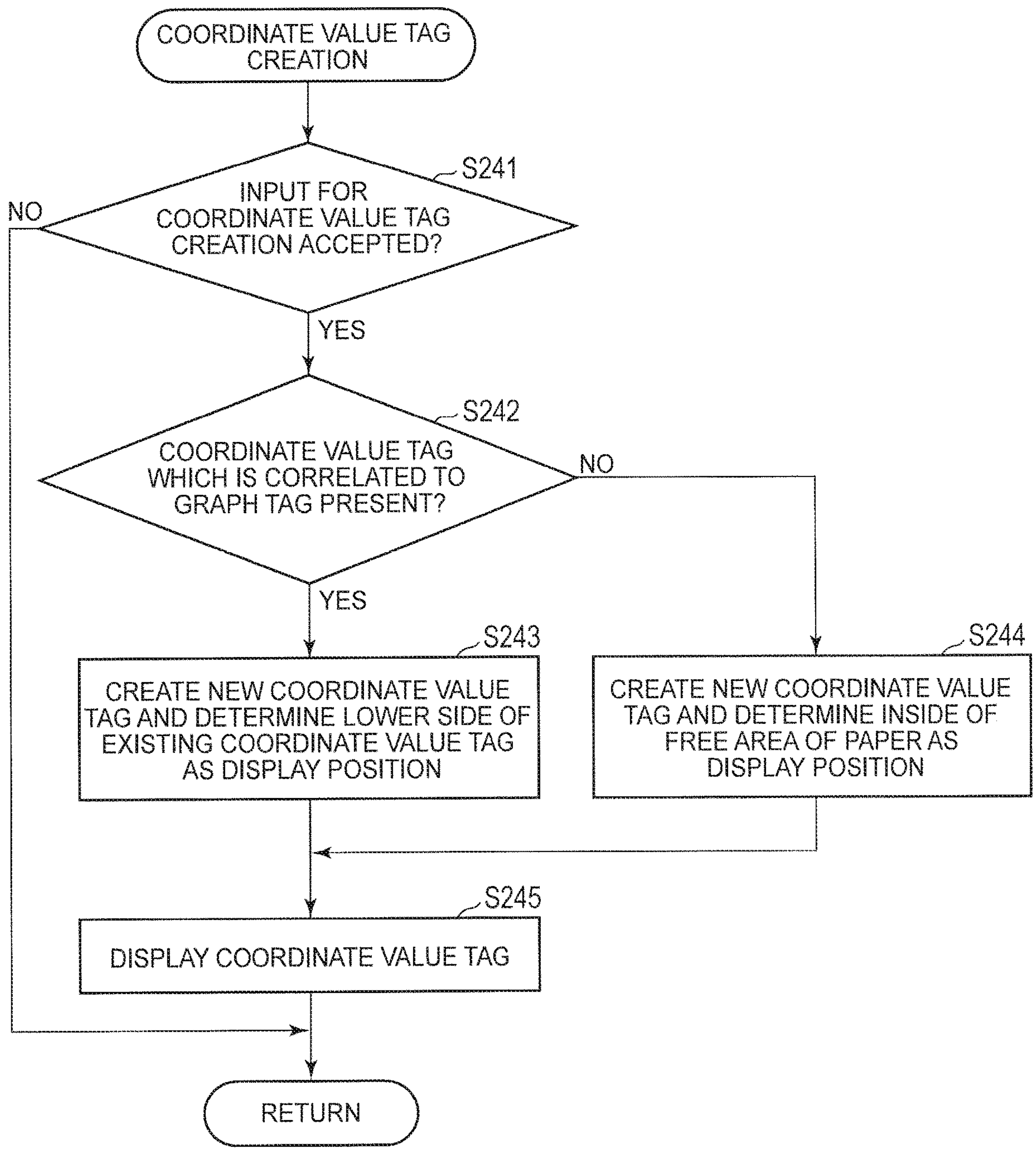
FIG. 15 is a flowchart illustrating one example of coordinate value tag creation process.

FIG. 15 is a flowchart illustrating one example of the coordinate value tag creation process (step S24 in FIG. 3).

In step S241, the CPU 21 decides whether input for creation of the coordinate value tag 109 which is made by user's selection of an optional point on the graph which is drawn in the graph tag 103 is accepted. In a case where it is decided that the input is accepted (Yes), the process proceeds to step S242. In a case where it is decided that the input is not accepted (No), the process returns to previous step.

In step S242, the CPU 21 decides presence/absence of the coordinate value tag 109 which is correlated to the graph tag 103 the optional point on which is selected when accepting the input for creation of the coordinate value tag 109 in step S241. In a case where it is decided that the coordinate value tag 109 concerned is present (Yes), the process proceeds to step S243. In a case where it is decided that the coordinate value tag 109 is not present (No), the process proceeds to step S244.

In step S243, the CPU 21 executes a process of creating one new coordinate value tag 109 in a state of being connected to the lower side of the existing coordinate value tag 109 as the coordinate value tag creation process. A display position of the coordinate value tags 109 is a position where the new coordinate value tag 109 and the existing coordinate value tag 109 are displayed in a state of being vertically aligned with each other with the new coordinate value tag 109 being adjacent to the lower side of the existing coordinate value tag 109.

On the other hand, in step S244, the CPU 21 executes the process of creating one new coordinate value tag 109 which is correlated to the graph tag 103 as the coordinate value tag creation process. The CPU 21 automatically selects the position where the new coordinate value tag 109 does not overlap other tags and determines the selected position as the display position of the coordinate value tag 109.

After execution of the process in step S243 or step S244, in step S245, the CPU 21 operates to display the coordinate value tag 109. After execution of the process in step S245, the process returns to previous step.

Figure 16:
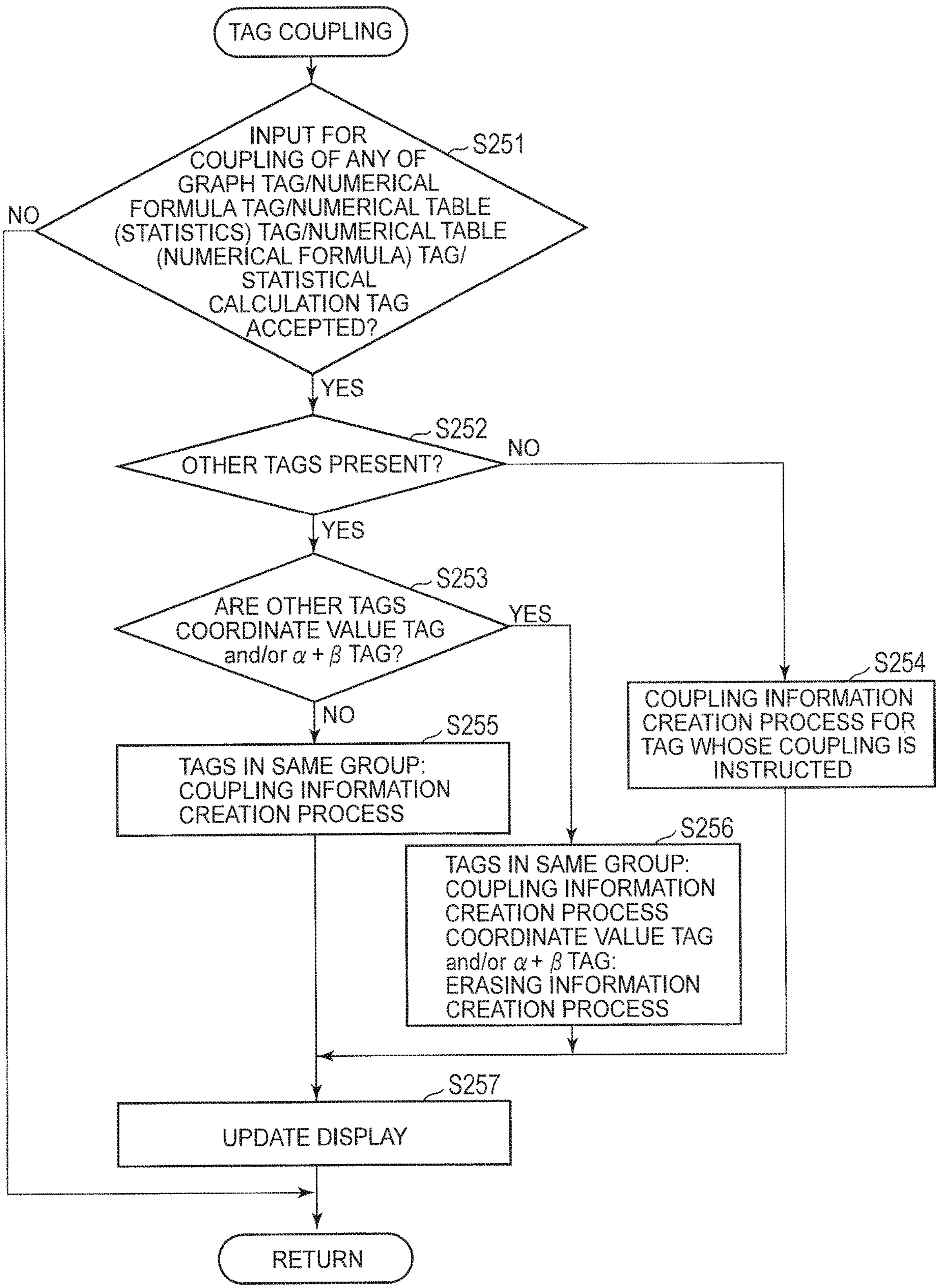
FIG. 16 is a flowchart illustrating one example of tag coupling process.

FIG. 16 is a flowchart illustrating one example of the tag coupling process (step S25 in FIG. 3). Specific operations which are executed in respective blocks in FIG. 16 will be described in detail later by using a display example of a screen.

In step S251, the CPU 21 decides whether input for coupling of any one of the graph tag 103, the numerical formula tag 104, the numerical table (statistics) tag 107, the numerical table (numerical formula) tag 106 and the statistical calculation tag 108 is accepted. In a case where it is decided that the input is accepted (Yes), the process proceeds to step S252. In a case where it is decided that the input is not accepted (No), the process returns to previous step.

In step S252, the CPU 21 decides presence/absence of other tags which are tied to the tag for which a coupling instruction is accepted. In a case where it is decided that other tags are present (Yes), the process proceeds to step S253. In a case where it is decided that other tags are not present (No), the process proceeds to step S254.

In step S253, the CPU 21 decides whether other tags include the coordinate value tag 109 or the arithmetic operation (α+β) tag 110. In a case where it is decided that the coordinate value tag 109 or the arithmetic operation (α+β) tag 110 is not included (No), the process proceeds to step S255. In a case where it is decided that the coordinate value tag 109 or the arithmetic operation (α+β) tag 110 is included (Yes), the process proceed to step S256.

In step S254, the CPU 21 executes a process of generating coupling information on the tag for which the coupling instruction is accepted.

In step S255, the CPU 21 executes the process of generating the coupling information on the tags in the same group. Here, the tags in the same group are the tags (including the tag for which the coupling instruction is accepted) which belong to the group to which the tag for which the coupling instruction is accepted belongs. As described above, the graph tag 103, the numerical formula tag 104, the slider tag 105 and the numerical table (numerical formula) tag 106 belong to the same group (a first group). In addition, the graph tag 103, the numerical table (statistics) tag 107 and the statistical calculation tag 108 belong to the same group (a second group).

In step S256, the CPU 21 executes the process of generating coupling information on the tags in the same group and executes a process of generating erasing information which is used for erasing a tag concerned on the coordinate value tag 109 and the arithmetic operation (α+β) tag 110.

After execution of the process in step S254, step S255 or step S256, in step S257, the CPU 21 operates to update the display on the basis of various kinds of information. After execution of the process in step S257, the process returns to previous step.

Figure 17:
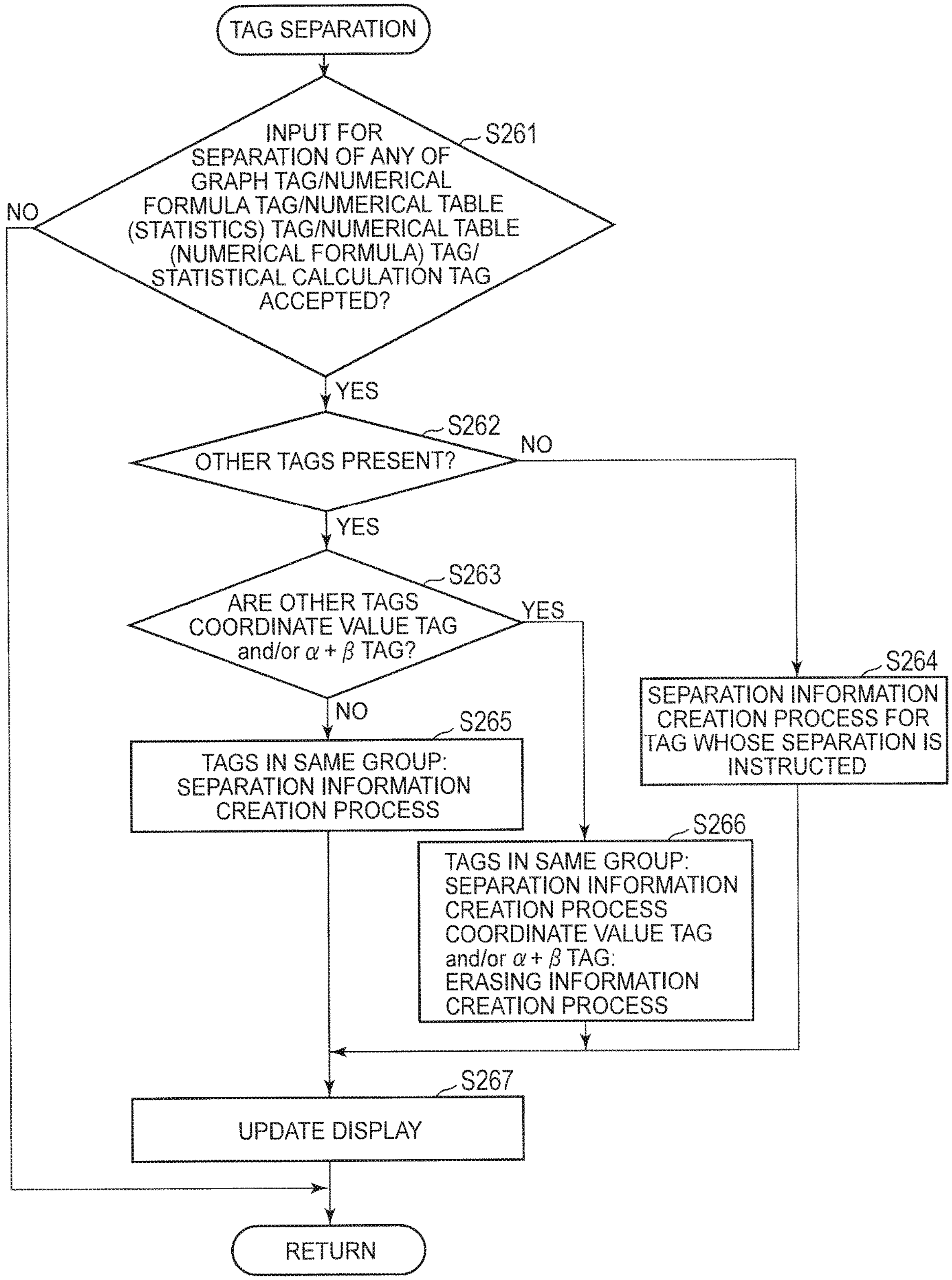
FIG. 17 is a flowchart illustrating one example of tag separation process.

FIG. 17 is a flowchart illustrating one example of the tag separating process (step S26 in FIG. 3). Specific operations executed in the respective blocks in FIG. 17 will be described in detail later by using a display example of the screen.

In step S261, the CPU 21 decides whether input for separation of any one of the graph tag 103, the numerical formula tag 104, the numerical table (statistics) tag 107, the numerical table (numerical formula) tag 106 and the statistical calculation tag 108 is accepted. In a case where it is decided that the input is accepted (Yes), the process proceeds to step S262. In a case where it is decided that the input is not accepted (No), the process returns to the previous step.

In step S262, the CPU 21 reads out tying information which is stored in the storage 24 and decides presence/absence of other tags which are tied to the tag for which a separation instruction is accepted. In a case where it is decided that other tags which are tied to the tag concerned are present (Yes), the process proceeds to step S263. In a case where it is decided that other tags which are tied to the tag concerned are not present (No), the process proceeds to step S264.

In step S263, the CPU 21 decides whether other tags include the coordinate value tag 109 or the arithmetic operation (α+β) tag 110. In a case where it is decided that other tags do not include the coordinate value tag 109 or the arithmetic operation (α+β) tag 110 (No), the process proceeds to step S265. In a case where it is decided that other tags include the coordinate value tag 109 or the arithmetic operation tag (α+β) 110 (Yes), the process proceeds to step S266.

In step S264, the CPU 21 executes a process of generating separation information of the tag to which the separation instruction is issued.

In step S265, the CPU 21 executes the process of generating the separation information on the tags in the same group.

In step S266, the CPU 21 executes the process of generating the separation information on the tags in the same group and executes the process of generating the erasing information which is used for erasing the tag concerned on the coordinate value tag 109 and the arithmetic operation (α+β) tag 110.

After execution of the process in step S264, step S265 or step S266, in step S267, the CPU 21 operates to update the display on the basis of various kinds of information. After execution of the process in step S267, the process returns to previous step.

Figure 18:
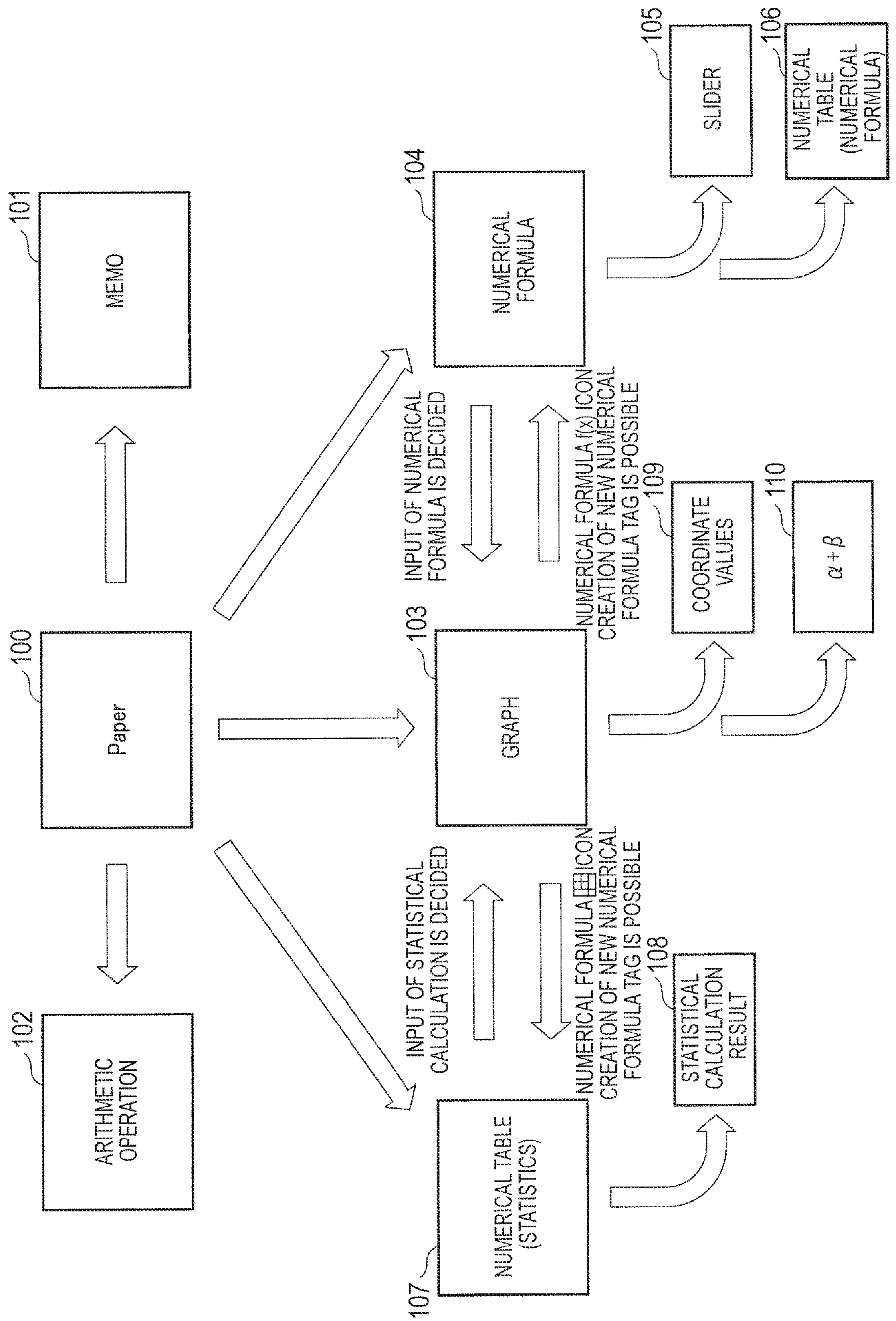
FIG. 18 is a diagram illustrating one example of a relation in creation of various tags.

FIG. 18 is a diagram schematically illustrating one example of a flow of creating the respective tags 101 to 110 from the paper 100. Each arrow in FIG. 18 indicates that it is possible to create tags of different kinds in accordance with an operation which is executed on the paper 100 or a certain kind of tag.

The memo tag 101 and the arithmetic operation tag 102 are independent tags. It is possible to create the memo tag 101 and the arithmetic operation tag 102 from the memo icon 56 and the arithmetic operation icon 51 of the menu icon bar 50 in accordance with the operation which is executed on the paper 100 or the certain kind of tag respectively.

It is also possible to create the graph tag 103, the numerical formula tag 104 and the numerical table (statistics) tag 107 using the memo icon 56 and the arithmetic operation icon 51 of the menu icon bar 50 in accordance with the operation which is executed on the paper 100 or the certain kind of tag respectively. In addition, after creation of each tag in accordance with the operation which is executed on the paper 100, it is also possible to create one tag of other kind from the graph tag 103, the numerical formula tag 104 or the numerical table (statistics) tag 107 in accordance with the operation which is executed on one of the tags 103, 104 and 107.

Specifically, as indicated by arrows, it is possible to create the graph tag 103 in accordance with the operation which is executed on the numerical formula tag 104 or the numerical table (statistics) tag 107. In addition, it is possible to create the numerical formula tag 104 or the numerical table (statistics) tag 107 in accordance with the operation which is executed on the graph tag 103.

Further, it is possible to create the coordinate value tag 109 or the arithmetic operation (α+β) tag 110 in accordance with the operation which is executed on the graph tag 103. It is possible to create the slider tag 105 or the numerical table (numerical formula) tag 106 in accordance with the operation which is executed on the numerical formula tag 104. It is possible to create the statistical calculation tag 108 in accordance with the operation which is executed on the numerical table (statistics) tag 107.

FIG. 19 is a table illustrating one example of operations and display in creation of various tags. In the following, the operations and the display will be described in order of Nos. 1 to 20 in the table illustrated in FIG. 19. In FIG. 19, the second column indicates kinds of tags which are created. The third and fourth columns indicate kinds and operation contents of tags which become operational objects in creation of each tag which is indicated on the second column. The fifth and sixth columns indicate processing contents according to conditions when executing the operations which are indicated on the second to fourth columns.

In a case where the graph tag 103 is created from the numerical formula tag 104, the user inputs a numerical formula into the numerical formula tag 104 from an input board 140 (described later with reference to FIG. 21C) and selects (executes) an EXE key 132. In a case where there exists the graph tag 103 which is correlated to the numerical formula tag 104 concerned when executing the operation for selection, a graph pertaining to the numerical formula concerned is displayed on that graph tag 103 (No. 1). In other cases, the graph is displayed on one new graph tag 103 which is correlated to the numerical formula tag 104 concerned (No. 2).

The graph tag 103 may be created from the numerical table (statistics) tag 107. In a case where when the user inputs a numerical value from the input board 140 and selects (determines) one type of statistical calculation, the selected type of statistical calculation is the one for creating the graph as a result of execution of the statistical calculation, the graph tag 103 is created. In a case where when the operation for graph creation is executed, there exists the graph tag 103 which is correlated to the numerical table (statistics) tag 107 concerned, a graph pertaining to the statistical calculation concerned is displayed in that graph tag 103 (No. 3). In other cases, the graph is displayed in one new graph tag 103 which is correlated to the numerical table (statistics) tag 107 concerned (No. 4).

After drawing the graph in the graph tag 103, creation of the coordinate value tag 109 becomes possible. In a case of creating the coordinate value tag 109, the user designates a point on the graph and selects a displayed coordinate value label. In a case where when the operation for label selection is executed, there exists the coordinate value tag 109 which is correlated to the graph tag 103, one new coordinate value tag 109 is displayed in a state of being connected to the lower side of the existing coordinate value tag 109 (No. 5). In other cases, one new coordinate value tag 109 which is correlated to the graph tag 103 concerned is displayed (No. 6).

After drawing the graph in the graph tag 103, creation of the arithmetic operation (α+β) tag 110 becomes possible. In a case of creating the arithmetic operation (α+β) tag 110, the user selects the graph tag 103 and then selects the arithmetic operation icon 63 which is displayed. In a case where when the operation for icon selection is executed, there exists the arithmetic operation (α+β) tag 110 which is correlated to the graph tag 103, one new arithmetic operation (α+β) tag 110 is displayed in a state of being connected to the lower side of the existing arithmetic operation (α+β) tag 110 (No. 7). In other cases, one new arithmetic operation (α+β) tag 110 which is correlated to the graph tag 103 concerned is displayed (No. 8).

In a case of creating the numerical formula tag 104 from the graph tag 103, the user selects the arithmetic operation icon 63 of the graph tag 103. In a case where when the operation for icon selection is executed, there exists the numerical formula tag 104 which is correlated to the graph tag 103, the focus is moved to and displayed on the existing numerical formula tag 104 (No. 9). Incidentally, in this case, the numerical formula tag 104 is not created and only the focus is moved to the existing numerical formula tag 104. In other cases, one new numerical formula tag 104 which is correlated to the graph tag 103 is displayed (No. 10).

It is possible to create one new numerical formula tag 104 from the existing numerical formula tag 104. When the user selects the existing numerical formula tag 104 and then selects the numerical icon 71 which is displayed, one new numerical formula tag 104 is displayed in a state of being connected to the lower side of the existing numerical formula tag 104 (No. 11).

The slider tag 105 may be created together with graph drawing from the numerical formula tag 104 into the graph tag 103. When the user inputs a numerical formula which includes the literal coefficient into the numerical formula tag 104 from the input board 140 and selects the EXE key 132, the slider tag 105 is created in association with graph drawing. In a case where there exists the existing slider tag 105 which is correlated to the numerical formula tag 104 and there exists the same literal coefficient in the existing slider tag 105, the slider tag 105 is shared between the tags concerned (No. 12). That is, another slider tag is not created. In a case where when an operation for slider tag creation is executed, there exists the existing slider tag 105 which is correlated to the numerical formula tag 104 and the same literal coefficient is not present in the existing slider tag 105, one new slider tag 105 is displayed in a state of being connected to the lower side of the existing slider tag 105 (No. 13). In other cases, one new slider tag 105 which is correlated to the numerical formula tag 104 is displayed (No. 14).

After execution of an arithmetic operation which is based on input into the numerical formula tag 104, creation of the numerical table (numerical formula) tag 106 becomes possible. In a case of creating the numerical table (numerical formula) tag 106, the user selects the numerical table (numerical formula) icon 72 (described later with reference to FIG. 21E) of the numerical formula tag 104. In a case where when the operation for icon selection is executed, there exists the numerical table (numerical formula) tag 106 which is correlated to the numerical formula tag 104, numerical values are additionally displayed in the existing numerical table (numerical formula) tag 106 (No. 15). In other cases, one new numerical table (numerical formula) tag 106 which is correlated to the numerical formula tag 104 is displayed.

In a case of creating the numerical table (statistics) tag 107 from the graph tag 103, the user selects the numerical table (statistics) icon 62 of the graph tag 103. In a case where when the operation for icon selection is executed, there exists the numerical table (statistics) tag 107 which is correlated to the graph tag 103, the focus is moved to and displayed in the numerical table (statistics) tag 107 (No. 17). Incidentally, in this case, the numerical table (statistics) tag 107 is not created and only the focus is moved. In other cases, one new numerical table (statistics) tag 107 which is correlated to the graph tag 103 is displayed (No. 18).

The statistical calculation tag 108 may be created together with graph drawing from the numerical table (statistics) tag 107 to the graph tag 103. Alternatively, the statistical calculation tag 108 may be created from the numerical table (statistics) tag 107 independently. When the user inputs the numerical values into the numerical table (statistics) tag 107 from the input board 140 and selects one type of statistical calculation, the statistical calculation tag 108 is created as a result of execution of the statistical calculation regardless of the type of statistical calculation which is selected. In a case where when an operation for tag creation is executed, there exists the statistical calculation tag 108 which is correlated to the numerical table (statistics) tag 107, one new statistical calculation tag 108 is displayed in a state of being connected to the lower side of the existing statistical calculation tag 108 (No. 19). In other cases, one new statistical calculation tag 108 which is correlated to the numerical table (statistics) tag 107 is displayed (No. 20).

In the present embodiment, the terminal 20 makes the display device 26 display the numerical formula tag 104 or the numerical table (statistics) tag 107 which serves as an input/display area that a function or a numerical value is input and displayed, the graph tag 103 which serves as a graph display area which is tied to the input display area and that a graph which is based on the function or the numerical value which is input into the input display area is displayed, the slider tag 105, each column of the numerical table (numerical formula) tag 106 or the statistical calculation tag 108 which serves as a first sub display area which is tied to the input display area and that first sub information which is based on the function or the numerical value which is input into the input display area is displayed, and the coordinate value tag 109 or the arithmetic operation ($\alpha+\beta$) tag 110 which serves as a second sub display area which is tied to the graph display area and which enables display of second sub information pertaining to the graph which is displayed in the graph display area in accordance with an instruction which is accepted from the input device 25 in this way. When accepting an instruction to make the display device 26 display any of the input display area, the graph display area, the first sub display area and the second sub display area, in a case where the area for which the instruction is accepted is displayed on the display device 26, the terminal 20 makes the display device 26 display the area concerned and the existing area concerned all in one piece (No. 1, No. 3, No. 5, No. 7, No. 11, No. 12, No. 13, No. 15, No. 19 in the table which is illustrated in FIG. 19) and in a case where the area for which the instruction is accepted is not displayed on the display device 26, the terminal 20 makes the display device 26 newly display the area concerned (No. 2, No. 4, No. 6, No. 8, No. 10, No. 14, No. 16, No. 18, No. 20 in the table which is illustrated in FIG. 19).

In FIG. 19, also examples of operations and display in creation of a geometric tag are indicated on the columns Nos. 21 to 24. Details thereof will be described later.

FIG. 20A is a table illustrating one example of operations and display relating to a coupling process. The terminal 20 accepts an instruction to execute a coupling operation and generates coupling information which will be described in the following.

Tags which are set as operational objects of the coupling process are the graph tag 103, the numerical formula tag 104, the numerical table (statistics) tag 107, the numerical table (numerical formula) tag 106 and the statistical calculation tag 108. The operational object tag and the tag which belongs to the same group as the operational object tag are coupled with the tags of the same kinds respectively.

As a coupling operation, the user executes an operation (for example, a drag-and-drop operation) of selecting one of the tags and moving the selected one tag toward the other tag so that the one tag overlaps the other tag. In a case where a position which is specified by the input device 25 when starting execution of the coupling operation is defined as a "coupling operation start position" and a position which is specified by the input device 25 when terminating execution of the coupling operation is defined as a "coupling operation termination position", for example, when the coupling operation termination position is located within a range that the other tag is displayed, execution of the coupling operation may be instructed.

Here, the two tags are tags of the same kind. The terminal 20 accepts the instruction to execute the coupling operation and operates to couple one tag with the other tag. Here, coupling includes to integrate contents which are displayed in the two tags to display the contents in one tag all in one piece and then to hide (erase) one of the tags (in the following, expressed as "the tags are integrated together" in some case), and to display the two tags as one tag unit by aligning the two tags with each other and connecting the two tags together (making the two tags adjacent to each other) (in the following, expressed as "the tags are aligned with each other" in some cases). In this case, not only the operational object tags are coupled together, but also other tags which are tied to the respective operational object tags are integrated together in the tags of the same kind or are displayed in a state where the tags of the same kind are aligned with each other. In addition, the coordinate value tag 109 and the arithmetic operation tag 102 which are tied to the operational object tag or tied to the graph tag 103 which is tied to the operational object tag are erased (hidden behind the screen) in accordance with the coupling operation.

In the present embodiment, the terminal 20 makes the display device 26 display the numerical formula tag 104 or the numerical table (statistics) tag 107 which serves as a first input display area that the function or the numerical value is input and displayed, the graph tag 103 or the statistical calculation tag 108 which serves as a first arithmetic operation result display area which is tied to the first input display area and that main information pertaining to a result of execution of the arithmetic operation which is based on the function or the numerical value which is input into the first input display area is displayed, the numerical formula tag 104 or the numerical table (statistics) tag 107 which serves as a second input display area that the function or the numerical value is input and displayed, and the graph tag 103 or the statistical calculation tag 108 which serves as a second arithmetic operation result display area which is tied to the second input display area and that main information pertaining to a result of execution of the arithmetic operation which is based on the function or numerical value which is input into the second input display area is displayed in accordance with an instruction. When accepting an instruction to couple together the first input display area and the second input display area or the first arithmetic operation result display area and the second arithmetic operation result display area, the terminal 20 makes the display device 26 display first coupled display that the input display areas are coupled together and second coupled display that the arithmetic operation result display areas are coupled together.

FIG. 20B is a table illustrating one example of operations and display which relate to the separation process. The terminal 20 accepts an instruction to execute a separating operation and generates such separation information as that which will be described in the following.

Tags which are set as operational objects of the separation process are the graph tag 103, the numerical formula tag 104, the numerical table (numerical formula) tag 106 and the statistical calculation tag 108. In order to separate a tag unit which is configured by two or more tags or a tag which includes two or more separable contents into two tags, the user executes an operation (for example, the drag-and-drop operation) of selecting and moving one operational object as a separating operation. In a case where a position which is specified by the input device 25 when starting execution of the separating operation is defined as a "separating operation start position" and a position which is specified by the input device 25 when terminating execution of the separating operation is defined as a "separating operation termination position", for example, when the separating operation termination position is located out of a range that the tag which is set as the operational object of the separation process is displayed when starting execution of the separating operation, execution of the separating operation may be instructed.

For example, in order to separate a tag unit that two tags are connected together in a state of being aligned with each other into two tags, the user executes an operation (for example, the drag-and-drop operation) of selecting and moving a tab of one of the tags (the respective tabs 151 to 154 of the numerical formula tag 104 and the statistical calculation tag 108) as the separating operation. For example, in order to separate one integrated tag which includes two or more separable display areas into two tags, the user executes an operation (for example, the drag-and-drop operation) of selecting and moving a tab of one of the tags (the respective tabs 112 to 117 of the graph tag 103 and the numerical table (numerical formula) tag 106) as the separating operation.

The terminal 20 accepts an instruction to execute the separating operation and separately displays the two tags which are displayed in a state of being connected and aligned with each other (a first separation process). Alternatively, the terminal 20 accepts the instruction to execute the separating operation, newly creates one tag on the basis of one integrated-state tag, makes the newly created one tag display contents which are correlated to the operational object tab (generates a copy of display contents to be separated), hides the contents behind one tag which is displayed before execution of the separating operation and makes the one tag which is displayed before execution of the separating operation display only the contents which are correlated to the tab other than the operational object tab (a second separation process). Alternatively, the terminal 20 accepts the instruction to execute the separating operation, newly creates one tag on the basis of one integrated-state tag, makes the newly created one tag display the contents which are correlated to the operational object tab (generates a copy of the display contents to be separated), hides the contents behind one tag which is displayed before execution of the separating operation and makes the one tag which is displayed before execution of the separating operation display contents which are the same as the contents which are displayed in the one tag before execution of the separating operation (a third separation process). Here, all the above-mentioned three separation processes are called "separation". Other tags which are tied to the operational object tag are also mutually separated. The coordinate value tag 109 and the arithmetic operation tag 102 which are tied to the operational object tag or tied to other tags which are tied to the operational object tag are erased.

Incidentally, objects of the first separation process are the numerical formula tag 104, the slider tag 105, the numerical table (numerical formula) tag 106 and the statistical calculation tag 108. FIG. 23A to FIG. 23C and FIG. 28A to FIG.

Figure 34A:
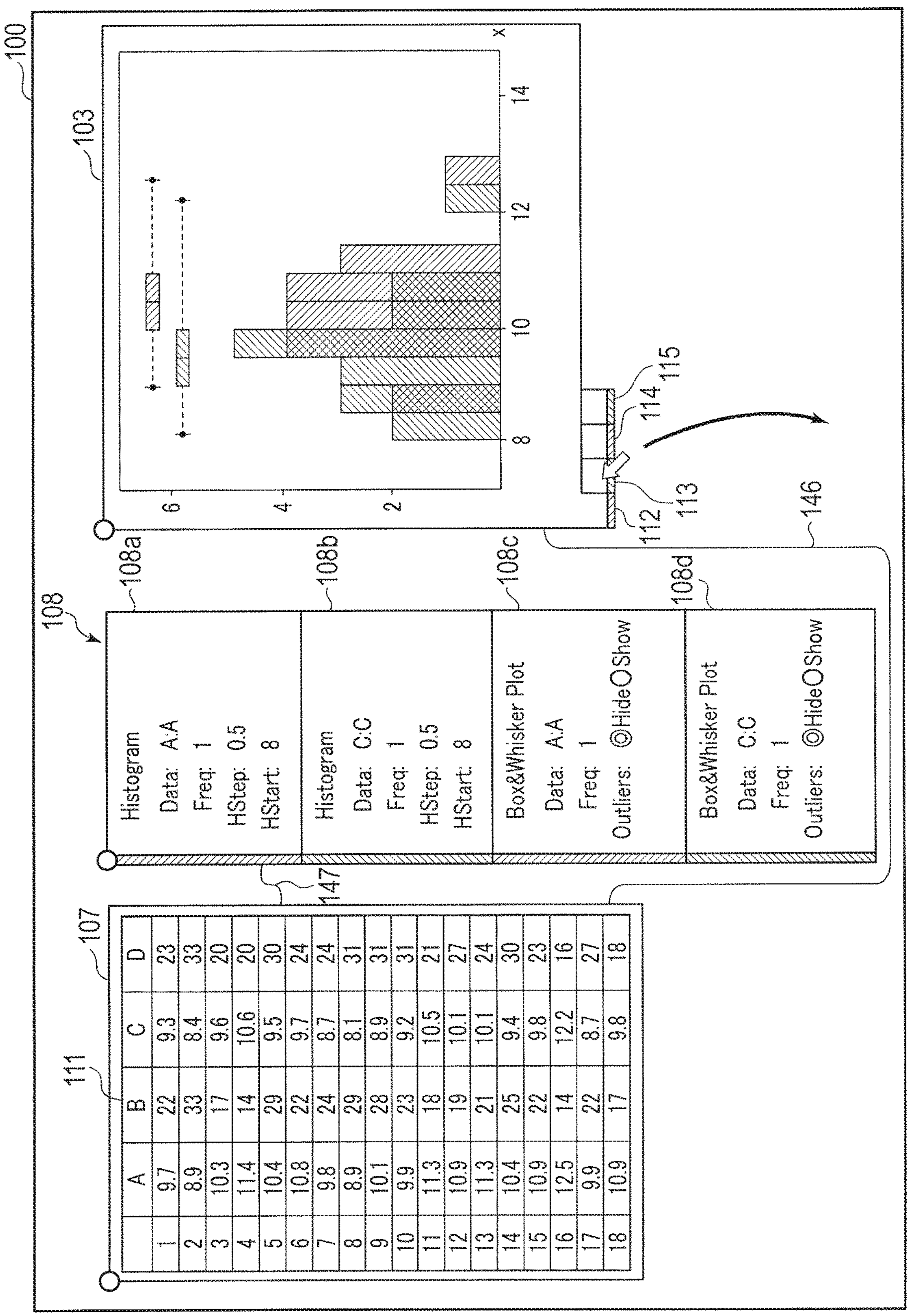
FIG. 34A is a diagram illustrating one example of display which relates to statistical calculations.
Figure 34B:
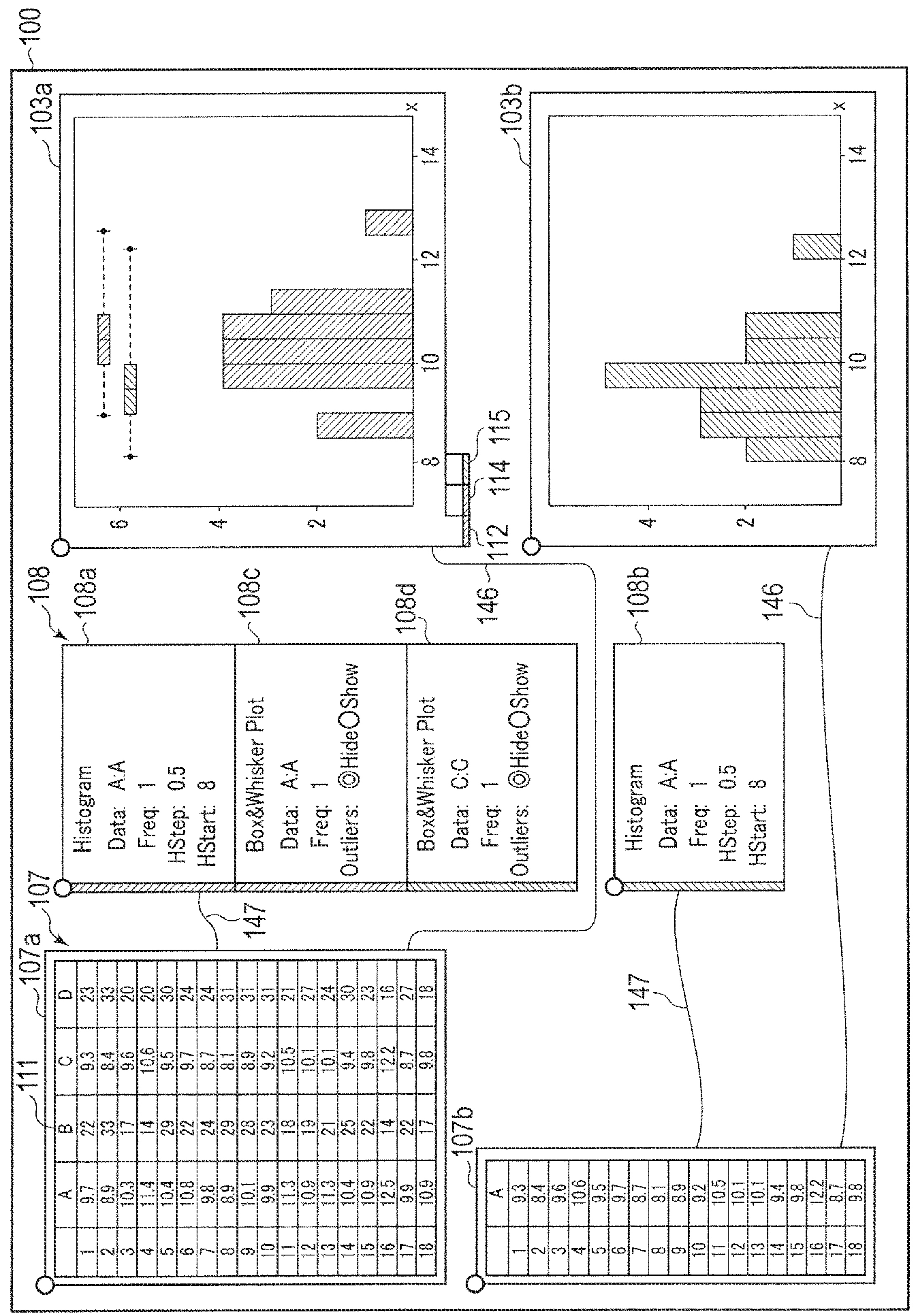
FIG. 34B is a diagram illustrating one example of display which relates to statistical calculations.
Figure 34C:
FIG. 34C is a diagram illustrating one example of display which relates to statistical calculations.

28C which will be described later illustrate display examples of the numerical formula tag 104 and the slider tag 106 which are subjected to the first separation process. In addition, FIG. 34A to FIG. 34C which will be described later illustrate display examples of the statistical calculation tag 108 which is subjected to the second separation process. An object of the second separation process is the graph tag 103. FIG. 23A to FIG. 23C and FIG. 28A to FIG. 28C which will be described later also illustrate display examples of the graph tag 103 which is subjected to the second separation process. An object of the third separation process is the numerical table (statistics) tag 107. FIG. 34A to FIG. 34C which will be described later also illustrate display examples of the numerical table (statistics) tag 107 which is subjected to the third separation process.

In the present embodiment, the terminal 20 makes the display device 26 display the first input display area and the second input display area (the numerical formula tag 104) that the function is input and displayed and which are displayed all in one piece and the arithmetic operation result display area (the graph tag 103) that first main display (a first graph) which is tied to the first input display area and relates to a result of execution of the arithmetic operation which is based on the function which is input into the first input display area and second main display (a second graph) which is tied to the second input display area and relates to a result of execution of the arithmetic operation which is based on the function which is input into the second input display area are displayed all in one piece in accordance with instructions. When an instruction to separate the first input display area and the second input display area from each other or an instruction to separate the first main display and the second main display from each other is accepted, the terminal 20 operates to separately display the first input display area and the second input display area, to display the first main display in the first arithmetic operation result display area and to display the second main display in the second arithmetic operation result display area.

[One Example of Screen Display in Tag Creation]

Examples of user's operations and display in creation of various tags will be described with reference to FIG. 21A to FIG. 21F. Here, the examples that the numerical formula tag 104, the graph tag 103 and the slider tag 105, the numerical table (numerical formula) tag 106, the numerical table (statistics) tag 107 and the statistical calculation tag 108 are created in this order will be described. Incidentally, screen display examples which are illustrated in FIG. 21A to FIG. 21F are the ones which are obtained by slightly simplifying the screen display which is illustrated in FIG. 2.

The user right-clicks, for example, a mouse which is the input device 25 in a state where a pointer 131 is being displayed on the paper 100. Thereby, as illustrated in FIG. 2, the menu icon bar 50 is displayed. The user positions the pointer 131 over a numerical formula icon 52 and selects the numerical formula icon 52 from the menu icon bar 50. Here, the terminal 20 executes the numerical formula tag creation process in step S13 in FIG. 3. The free numerical formula tag 104 is displayed on a position (that position or the vicinity of that position) which corresponds to the position where the pointer 131 is displayed when right-clicking the mouse by selecting the numerical formula icon 52. Thereby, it becomes possible to display the numerical formula tag 104 on the position which is determined in accordance with the user's operation within the paper 100. Incidentally, although the free numerical formula tag 104 is the numerical formula tag 104 which is in a state where no letters (characters), numerals, numerical formulae and so forth are displayed, a cursor may be displayed in the numerical formula tag 104 depending on a situation.

Figure 21A:
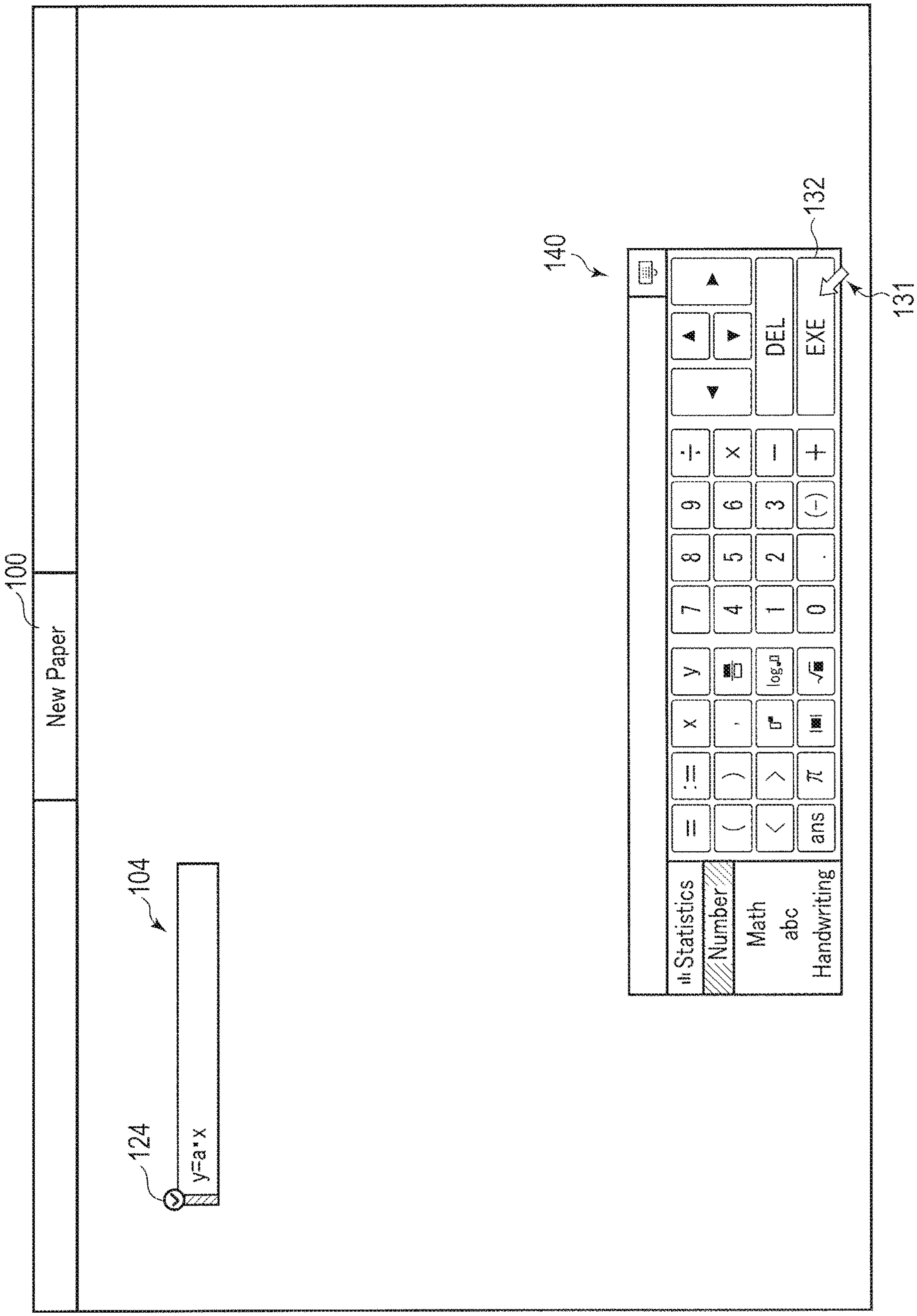
FIG. 21A is a diagram illustrating one example of display in creation of the various tags.

When the user selects the displayed numerical formula tag 104, the check column 124 of the numerical formula tag 104 is checked and the input board 140 which is a software keyboard is displayed. The user inputs, for example, a numerical formula y=a·x into the numerical formula tag 104 by using the input board 140. "a" is a literal coefficient. In this situation, the terminal 20 executes the processes in step S16 and step S17 in FIG. 3. The user positions the pointer 131 over the EXE key 132 of the input board 140 and selects the EXE key 132 (FIG. 21A).

Figure 21B:
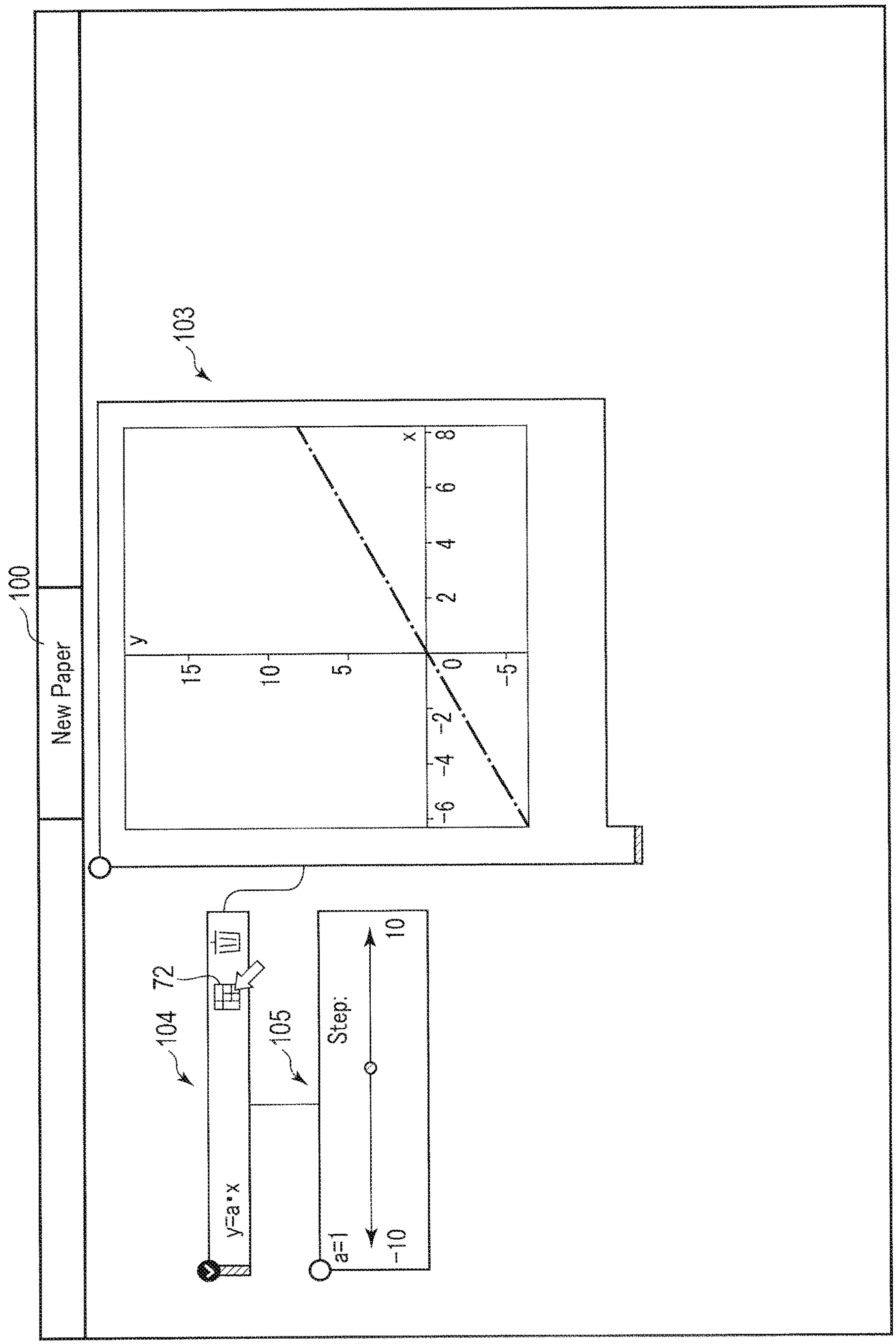
FIG. 21B is a diagram illustrating one example of display in creation of the various tags.

By the selection of the EXE key 132, the terminal 20 accepts input for execution of the arithmetic operation. That is, various kinds of information (for example, information on the numerical formula which is input into the numerical formula tag 104, x display range and y display range of the graph tag 103 and so forth) are transmitted from the terminal 20 to the server 10 and the arithmetic operation which is necessary for graph drawing is executed by the server 10. The terminal 20 receives a result of execution of the arithmetic operation which is sent back from the server 10. That is, the arithmetic operation process in step S18 in FIG. 3 is executed. The graph tag 103 that the graph of the numerical formula y=a·x is drawn and the slider tag 105 which relates to the literal coefficient "a" which is included in the numerical formula concerned are displayed on the paper 100 in a state of being tied to the numerical formula tag 104 with the strings 141 and 142 respectively so as not to overlap the numerical formula tag 104 by using the received result of execution of the arithmetic operation (FIG. 21B). Thereby, it becomes possible to display the graph tag 103 on the position which is determined in accordance with the user's operation within the paper 100. The numerical table (numerical formula) icon 72 is displayed in the numerical formula tag 104 simultaneously with graph tag display. The numerical table (numerical formula) icon 72 may be displayed in the numerical formula tag 104 in accordance with selection of the numerical formula tag 104 by the user. In this situation, the terminal 20 executes the graph tag process in step S19 and the slider tag process in step S20 in FIG. 3. In addition, transition from the display in FIG. 21A to the display in FIG. 21B corresponds to No. 2 and No. 14 in the table which is illustrated in FIG. 19.

Figure 21C:
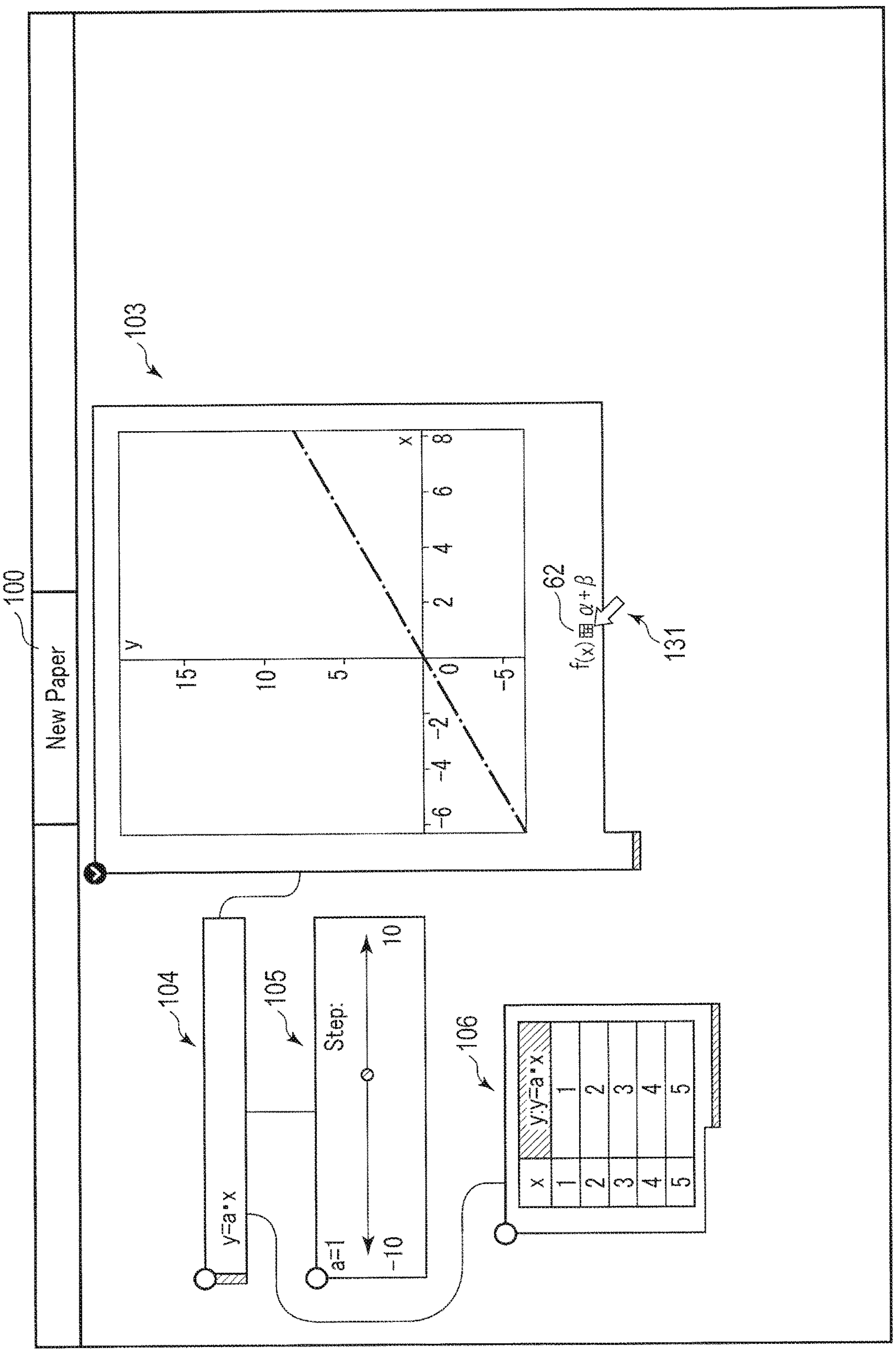
FIG. 21C is a diagram illustrating one example of display in creation of the various tags.

The user positions the pointer 131 over the numerical table (numerical formula) icon 72 and selects the icon 72. By the selection of the numerical table (numerical formula) icon 72, the numerical table (numerical formula) tag 106 which relates to the numerical formula y=a x is displayed on the paper 100 in a state of being tied to the numerical formula tag 104 with the string 143 so as not to overlap the numerical formula tag 104 (FIG. 21C). Thereby, it becomes possible to display the numerical table (numerical formula) tag 106 on the position which is determined in accordance with the user's operation within the paper 100. When the user selects the graph tag 103, the numerical table (statistics) icon 62 is displayed in the graph tag 103 simultaneously with display of the numerical table (numerical formula) tag 106. The numerical table (statistics) icon 62 may be displayed in the graph tag 103 in accordance with selection of the graph tag 103 by the user. In this situation, the terminal 20 executes the numerical table (numerical formula) tag process in step S22 in FIG. 3. In addition, transition from the display in FIG. 21B to the display in FIG. 21C corresponds to No. 16 in the table which is illustrated in FIG. 19.

Figure 21D:
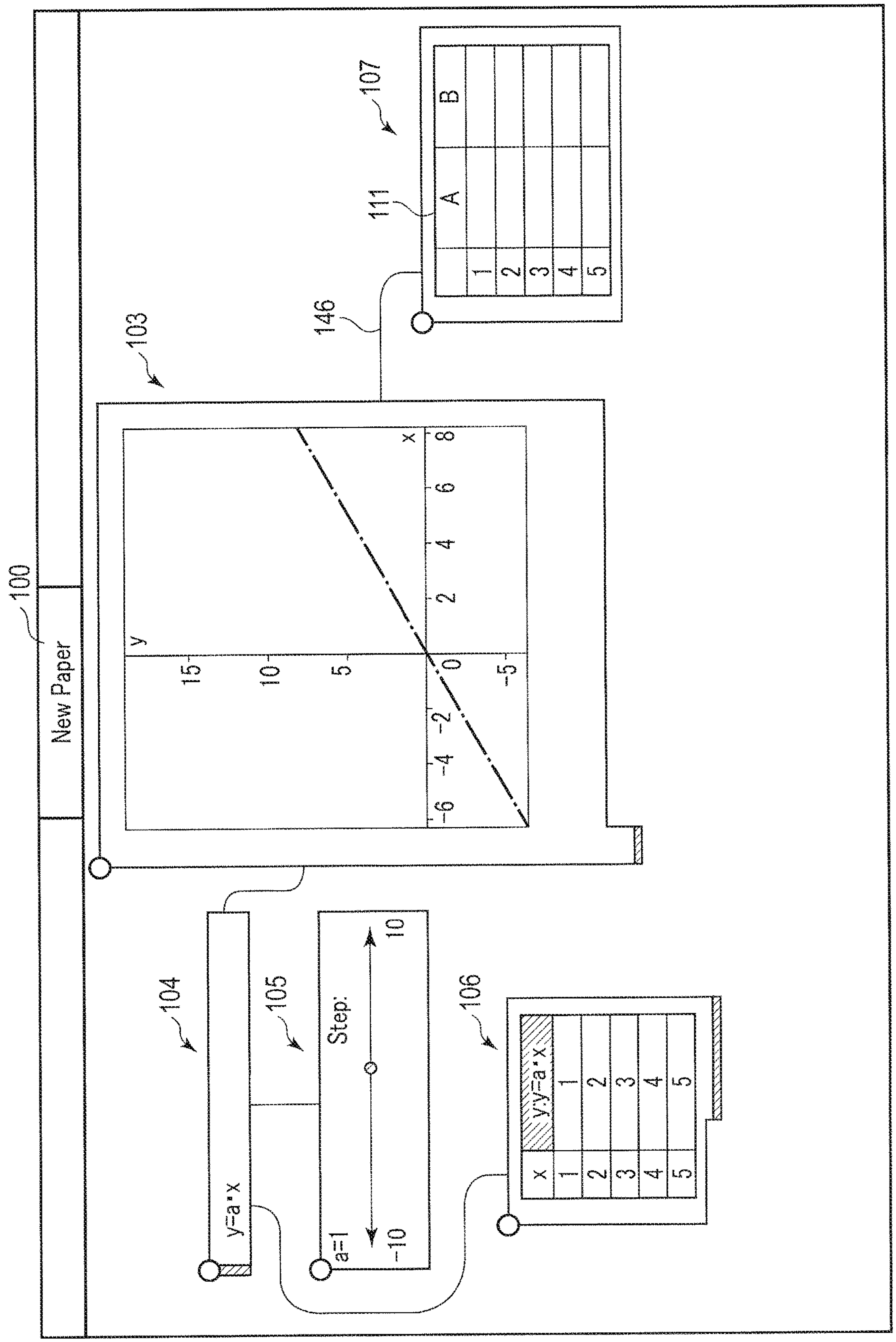
FIG. 21D is a diagram illustrating one example of display in creation of the various tags.

The user positions the pointer 131 over the numerical table (statistics) icon 62 and selects the icon 62. By the selection of the numerical table (statistics) icon 62, the numerical table (statistics) tag 107 which is tied to the graph tag 103 with the string 146 is displayed on the paper 100 so as not to overlap the graph tag 103 (FIG. 21D). Thereby, it becomes possible to display the numerical table (statistics) tag 107 on the position which is determined in accordance with the user's operation within the paper 100. The numerical table (statistics) tag 107 includes the free numerical table 111. In this situation, the terminal 20 executes the numerical table (statistics) tag creation process in step S14 in FIG. 3. In addition, transition from the display in FIG. 21C to the display in FIG. 21D corresponds to No. 18 in the table which is illustrated in FIG. 19.

Figure 21E:
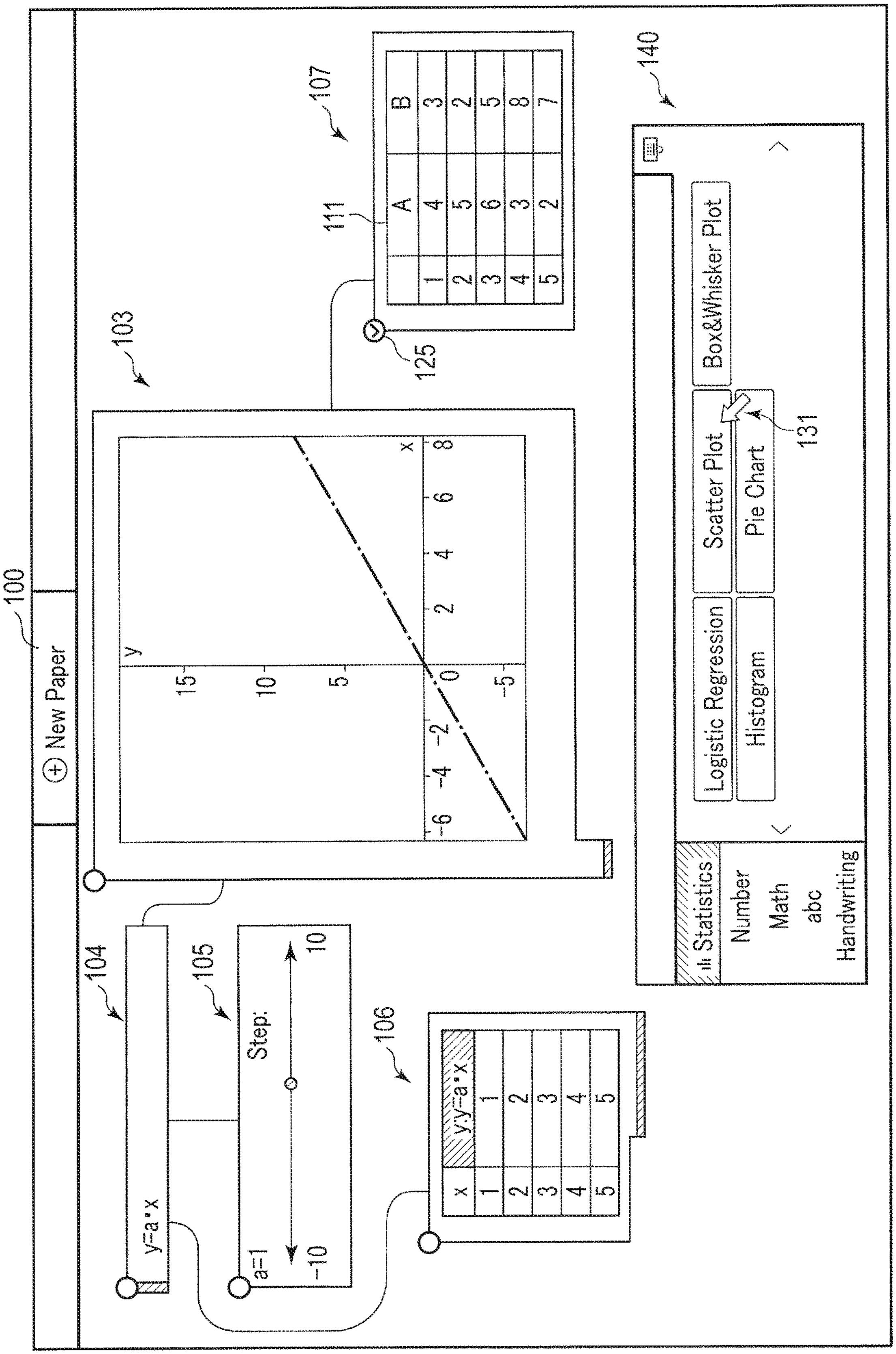
FIG. 21E is a diagram illustrating one example of display in creation of the various tags.

When the user selects the displayed numerical table (statistics) tag 107, the check column 125 of the numerical table (statistics) tag 107 is checked and the input board 140 is displayed. The user inputs an optional numerical value into the numerical table 111 in the numerical table (statistics) tag 107 by using the input board 140. In this situation, the terminal 20 executes the processes in step S16 and step S17 in FIG. 3. The user selects, for example, the column A in the numerical table (statistics) tag 107 and then positions the pointer 131 over "Scatter Plot" of the input board 140 and selects "Scatter Plot" (FIG. 21E).

By the selection of "Scatter Plot", various kinds of information (for example, the information on the numerical value which is input into the numerical table (statistics) tag 107, the x display range and the y display range of the graph tag 103 and so forth) are transmitted from the terminal 20 to the server 10 and the arithmetic operation which is necessary for statistical graph drawing is executed by the server 10. The terminal 20 receives a result of execution of the arithmetic operation which is sent back from the server 10. That is, the arithmetic operation process in step S18 in FIG. 3 is executed. Incidentally, since graph drawing is possible with no communication with the server 10 in the statistical calculation which is selected here, communication with the server 10 may be omitted.

Figure 21F:
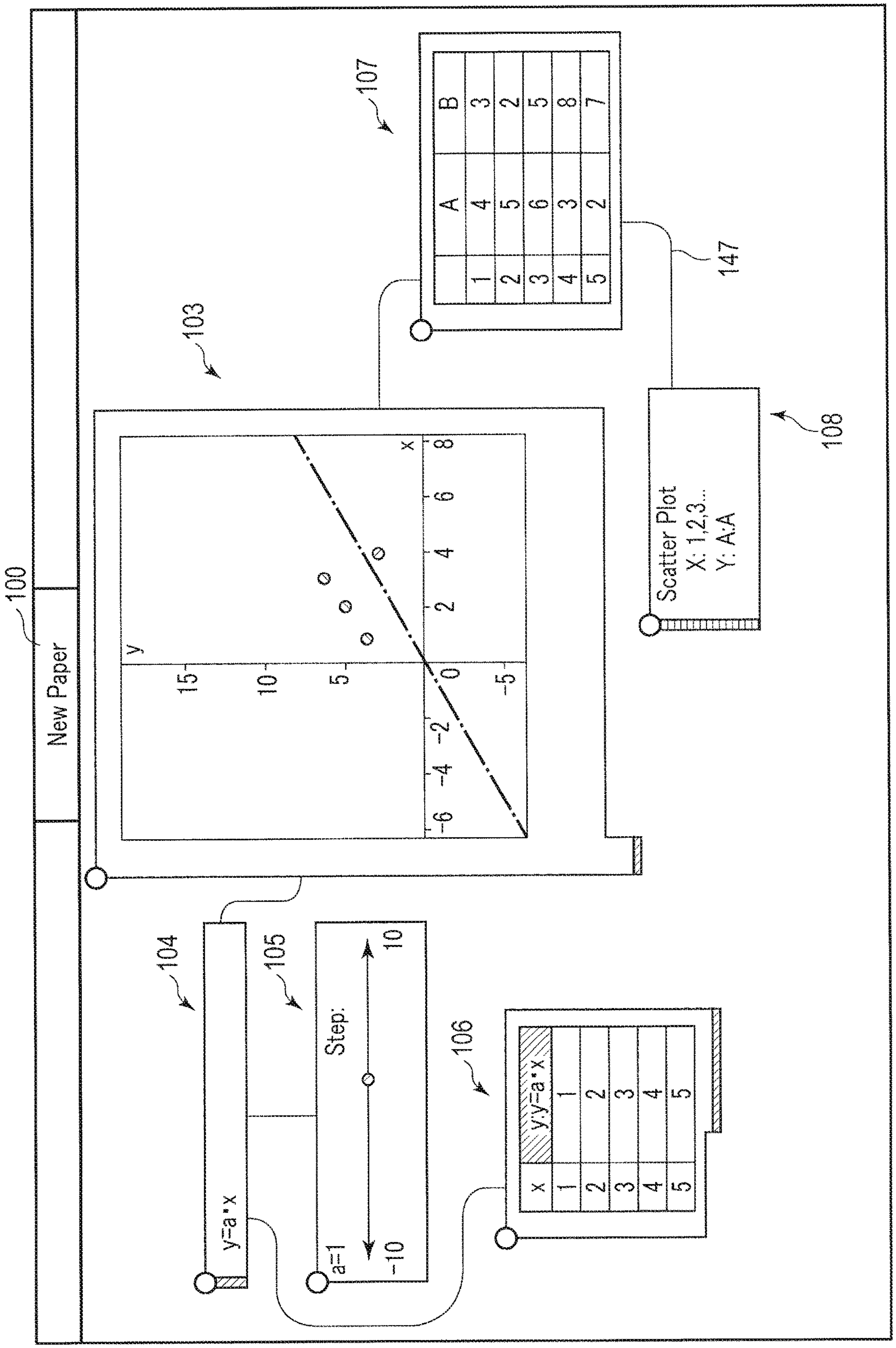
FIG. 21F is a diagram illustrating one example of display in creation of the various tags.

The scatter plot which relates to the numerical values on the column A which are input into the numerical table (statistics) tag 107 is displayed in the graph tag 103 and the statistical calculation tag 108 which is tied to the numerical table (statistics) tag 107 with the string 147 is displayed in the graph tag 103 so as not to overlap the numerical table (statistics) tag 107 by using the received result of execution of the arithmetic operation (FIG. 21F). Thereby, it becomes possible to display the statistical calculation tag 108 on the position which is determined in accordance with the user's operation within the paper 100. In this situation, the terminal 20 executes the graph tag process in step S19 and the statistical calculation tag process in step S21 in FIG. 3. In addition, transition from the display in FIG. 21E to the display in FIG. 21F corresponds to No. 3 and No. 20 in the table which is illustrated in FIG. 19.

The respective tags 103 to 108 are created along a series of flows which are illustrated in FIG. 21A to FIG. 21F in the above-mentioned way. Incidentally, although, in the present embodiment, tag creation is started from creation of the numerical formula tag 104, it is possible to finally create the display which is the same as the display in FIG. 21F even when starting from creation of the graph tag 103 or the numerical table (statistics) tag 107. In this regard, it is just as described with reference to FIG. 18.

According to the present embodiment, it is possible to display pluralities of function graphs and statistical graphs in one graph tag 103 and therefore this system 1 is very convenient. In addition, it is possible to arrange the various tags in a free layout and therefore convenience is improved. Further, since it is possible to attain the same display regardless of which tag is created first in the graph tag 103, the numerical formula tag 104 and the numerical table (statistics) tag 107, high usability is attained.

Figure 22A:
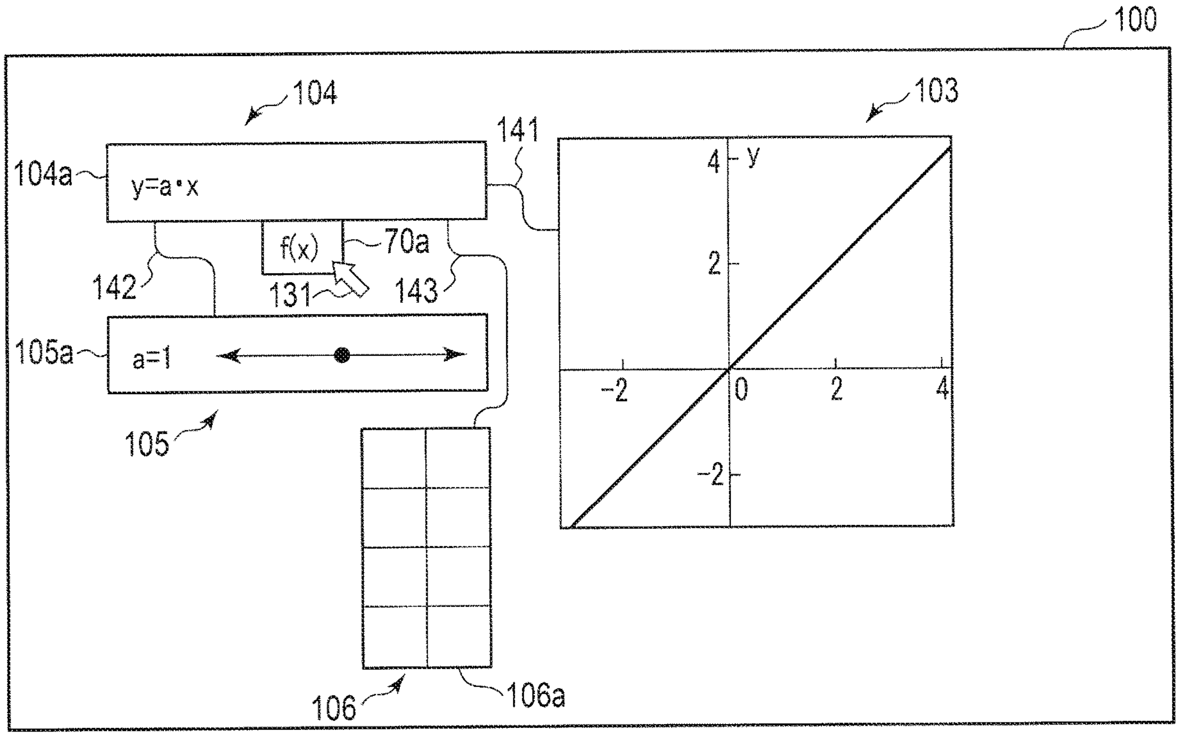
FIG. 22A is a diagram illustrating one example of creation and display of tags.

FIG. 22A to FIG. 22F are diagrams illustrating examples of creation and display of the various tags which are started from a state where the graph tag 103, the numerical formula tag 104, the slider tag 105 and the numerical table (numerical formula) tag 106 are displayed. In the following, a series of flow of creating the second numerical formula tag 104*b* from the first numerical formula tag 104*a*, displaying the graph of the numerical formula which is input into the second numerical formula tag 104*b* in the graph tag 103 and creating the slider tag 105, and then creating a column to be additionally displayed in the numerical table (numerical formula) tag 106 from the second numerical formula tag 104*b* is illustrated. Incidentally, screen display examples which are illustrated in FIG. 22A and succeeding drawings schematically express the screen display illustrated in FIG. 2.

In FIG. 22A, the graph tag 103, the numerical formula tag 104 (the first numerical formula tag 104*a*), the slider tag 105 (the first slider tag 105*a*) and the numerical table (numerical formula) tag 106 are displayed on the paper 100. The graph (the first graph) of the numerical formula $y=a\cdot x$ which is input into the numerical formula tag 104 is displayed in the graph tag 103. The slider which is adapted to change the literal coefficient "a" which is included in the numerical formula concerned is displayed in the slider tag 105. The first numerical table 106*a* which includes the values of "x" and "y" which relate to the numerical formula concerned is displayed in the numerical table (numerical formula) tag 106. Incidentally, although the numerical values in the numerical tables are omitted in FIG. 22A to FIG. 22F, it is supposed that numerical values that the user inputs are put in the numerical tables. The graph tag 103, the slider tag 105 and the numerical table (numerical formula) tag 106 are tied to the numerical formula tag 104 with the strings 141, 142 and 143 respectively.

Figure 22B:
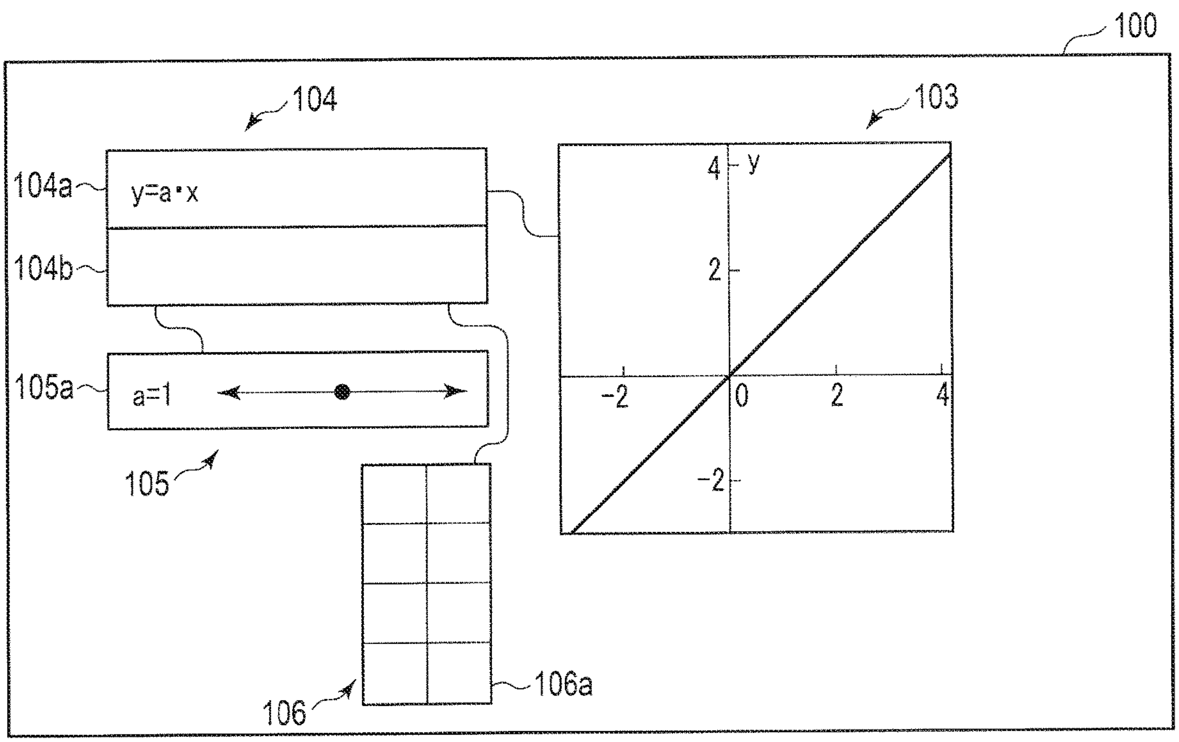
FIG. 22B is a diagram illustrating one example of creation and display of the tags.

When the user selects the first numerical formula tag 104*a*, an arithmetic operation icon 70*a* appears on the lower side of the first numerical formula tag 104*a* as illustrated in FIG. 22A. The user positions the pointer 131 over the arithmetic operation icon 70*a* and selects the icon 70*a*. Thereby, the free second numerical formula tag 104*b* is displayed in a state of being connected to the lower side of the first numerical formula tag 104*a* as illustrated in FIG. 22B. In this situation, the terminal 20 executes the numerical formula tag creation process in step S13 in FIG. 3. In addition, transition from the display in FIG. 22A to the display in FIG. 22B corresponds to No. 11 in the table which is illustrated in FIG. 19.

Figure 22C:
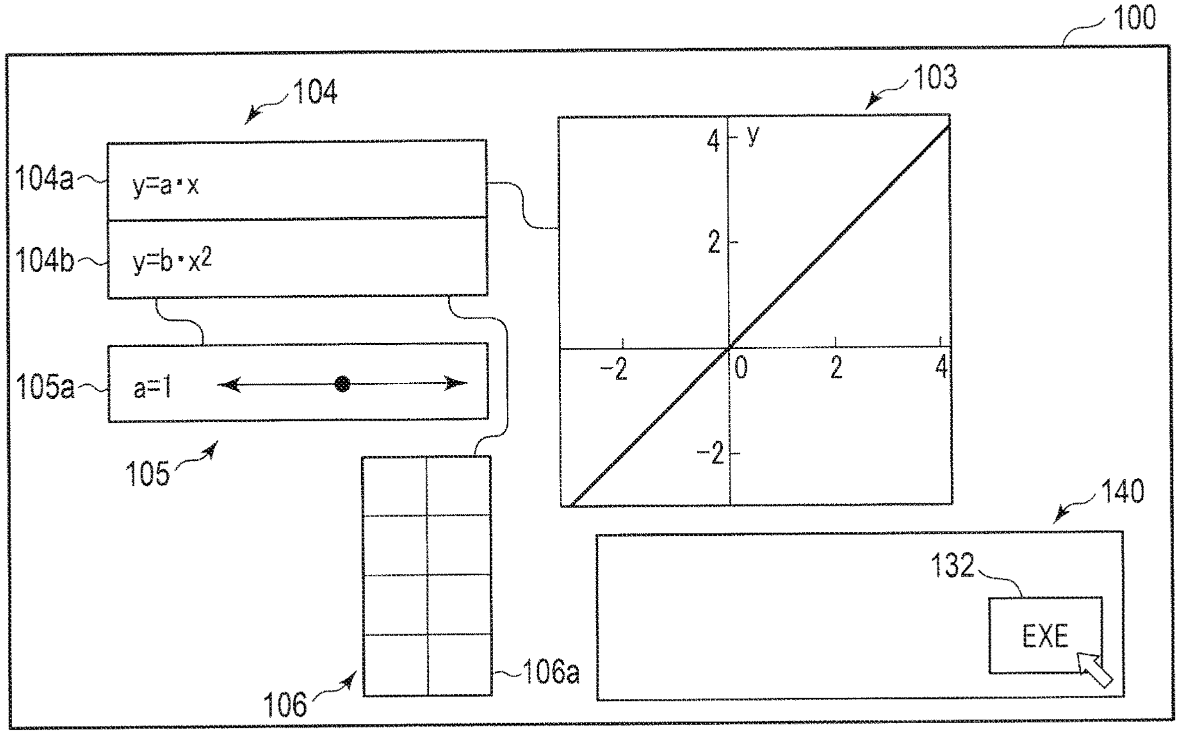
FIG. 22C is a diagram illustrating one example of creation and display of the tags.

As illustrated in FIG. 22C, the user selects the second numerical formula tag 104*b* and inputs the numerical formula $y=b\cdot x^2$ into the second numerical formula tag 104*b* by using the input board 140. "b" is a literal coefficient. In this situation, the terminal 20 executes the processes in step S16 and step S17 in FIG. 3. The user selects the EXE key 132 of the input board 140.

Figure 22D:
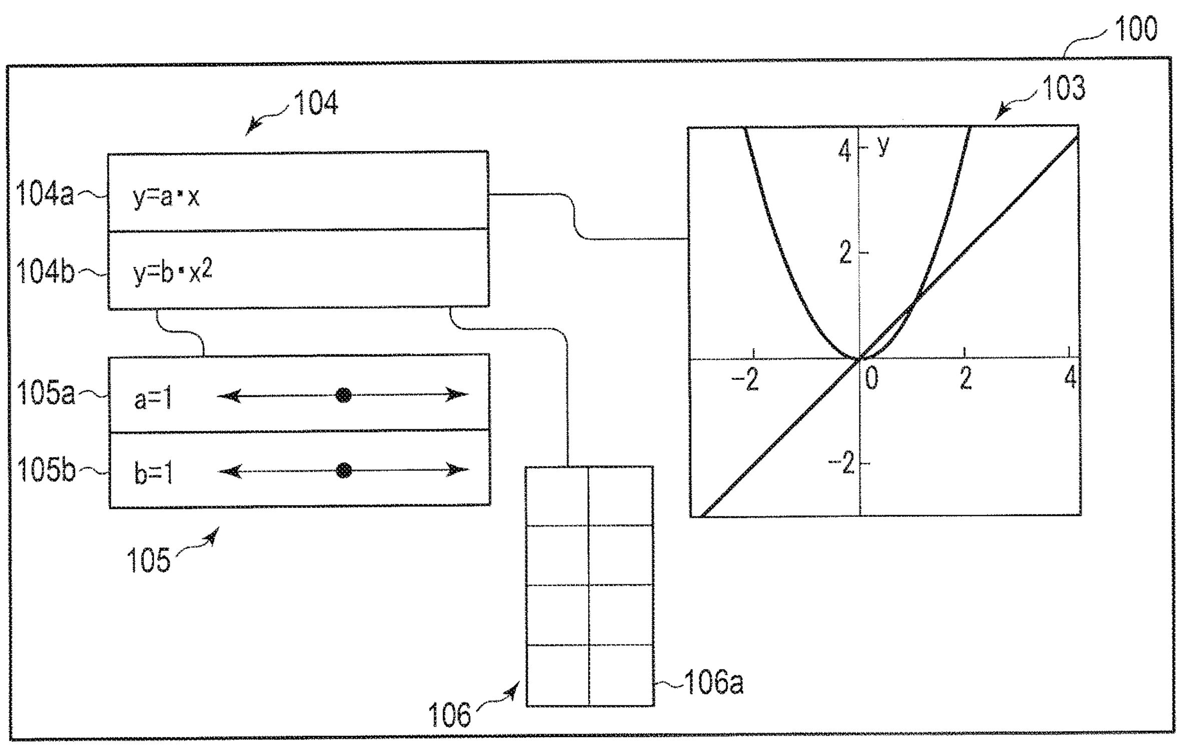
FIG. 22D is a diagram illustrating one example of creation and display of the tags.

Thereby, the arithmetic operation process in step S18 in FIG. 3 is executed. Then, as illustrated in FIG. 22D, the graph (the second graph) of the numerical formula $y=b\cdot x^2$ is drawn in the graph tag 103 and the second slider tag 105*b* which relates to the literal coefficient "b" which is included in the numerical formula which is input into the second numerical formula tag 104*b* is displayed in a state of being connected to the lower side of the first slider tag 105*a*. In this situation, the terminal 20 executes the graph tag process in step S19 and the slider tag process in step S20 in FIG. 3. In addition, transition from the display in FIG. 22C to the display in FIG. 22D corresponds to No. 1 and No. 13 in the table which is illustrated in FIG. 19.

Figure 22E:
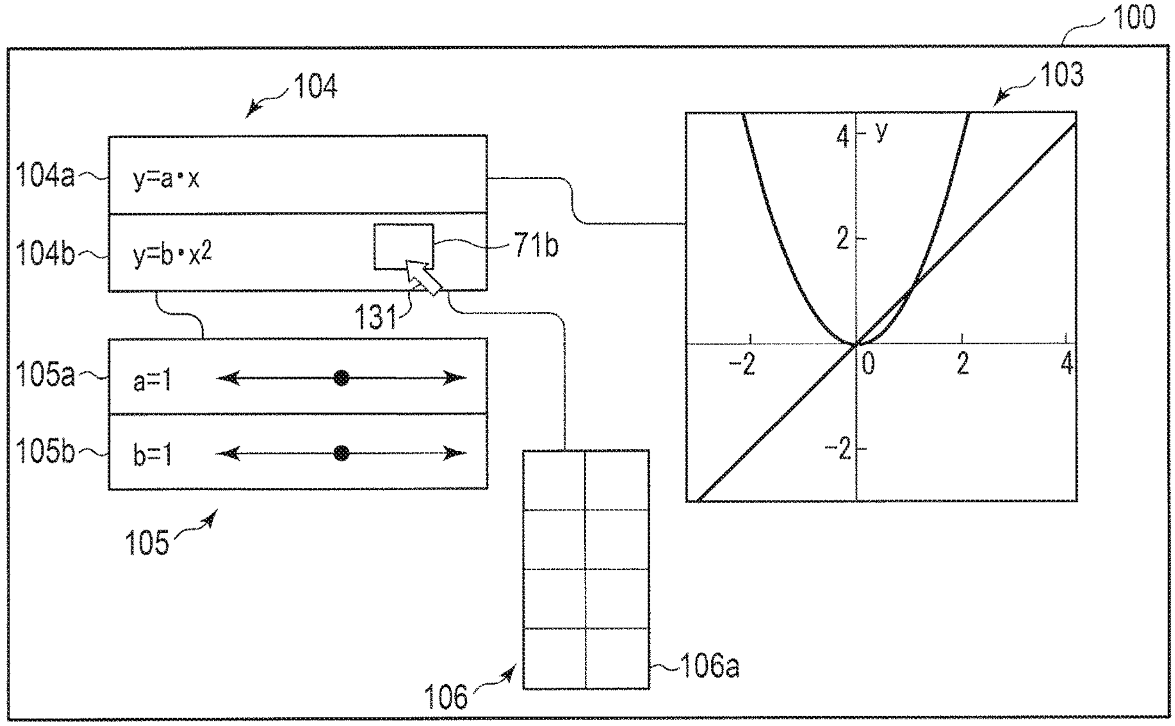
FIG. 22E is a diagram illustrating one example of creation and display of the tags
Figure 22F:
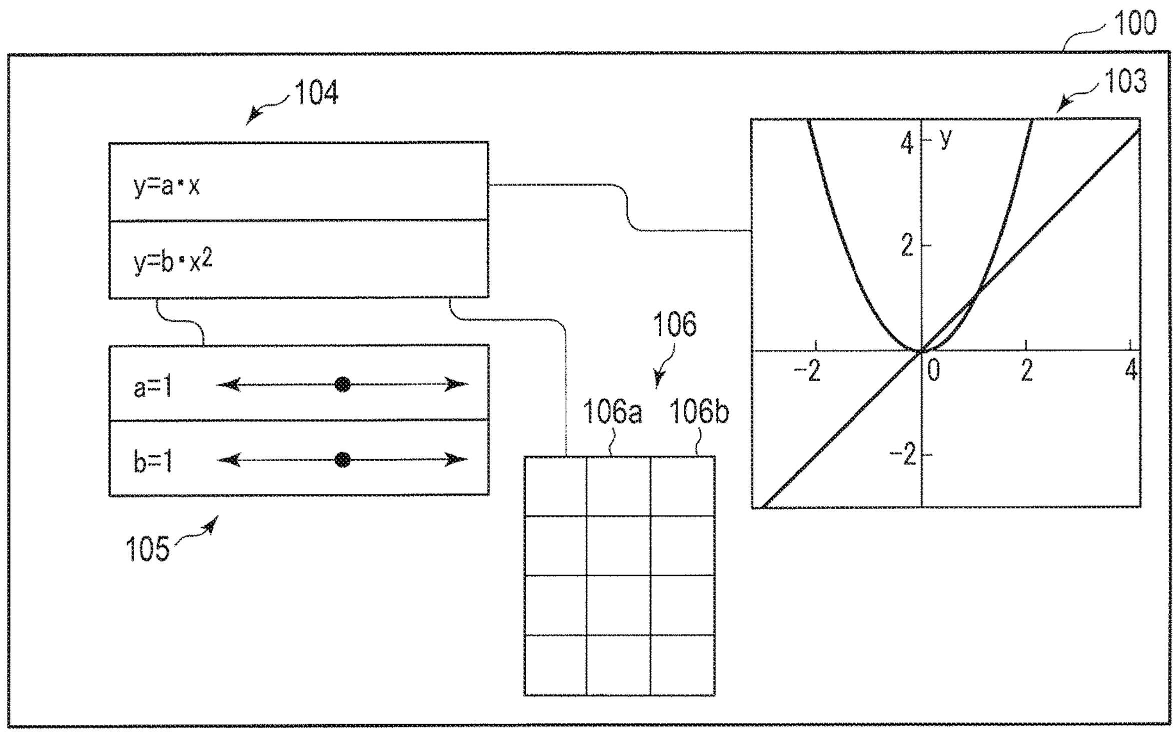
FIG. 22F is a diagram illustrating one example of creation and display of the tags.

As illustrated in FIG. 22E, a numerical table (numerical formula) icon 71*b* is displayed in the second numerical formula tag 104*b*. The numerical table (numerical formula) icon 71*b* may be displayed in the second numerical formula tag 104*b* in accordance with selection of the second numerical formula tag 104*b* by the user. The user positions the pointer 131 over the numerical table (numerical formula) icon 71*b* and selects the numerical table (numerical formula) icon 71*b*. Thereby, as illustrated in FIG. 22F, the numerical table (numerical formula) tag 106 that a second numerical table 106*b* is added to the first numerical table 106*a* is displayed. In this situation, the terminal 20 executes the numerical table (numerical formula) tag process in step S22. Transition from the display in FIG. 22E to the display in FIG. 22F corresponds to No. 15 in the table which is illustrated in FIG. 19.

According to the above-mentioned embodiment which is illustrated in FIG. 22A to FIG. 22F, the graph which is created on the basis of input data into the second numerical formula tag 104*b* which is connected to the first numerical formula tag 104*a* which is correlated to one graph tag 103 is displayed in the same graph tag 103 which is correlated to the second numerical formula tag 104*b* via the first numerical formula tag 104*a* and the second slider tag 105*b* is displayed in a state of being connected to the first slider tag 105*a* which is correlated to the second numerical formula tag 104*b* via the first numerical formula tag 104*a*. Accordingly, when newly creating and displaying the various tags, it becomes easy to see a correlation between/among the various tags which are displayed on the paper 100 before and after execution of operations for tag creation and display and thereby the convenience is improved.

A separating operation to be executed on the numerical formula tag 104 (the numerical formula tag unit) and display in execution of the separating operation will be described with reference to FIG. 23A to FIG. 23C.

Figure 23A:
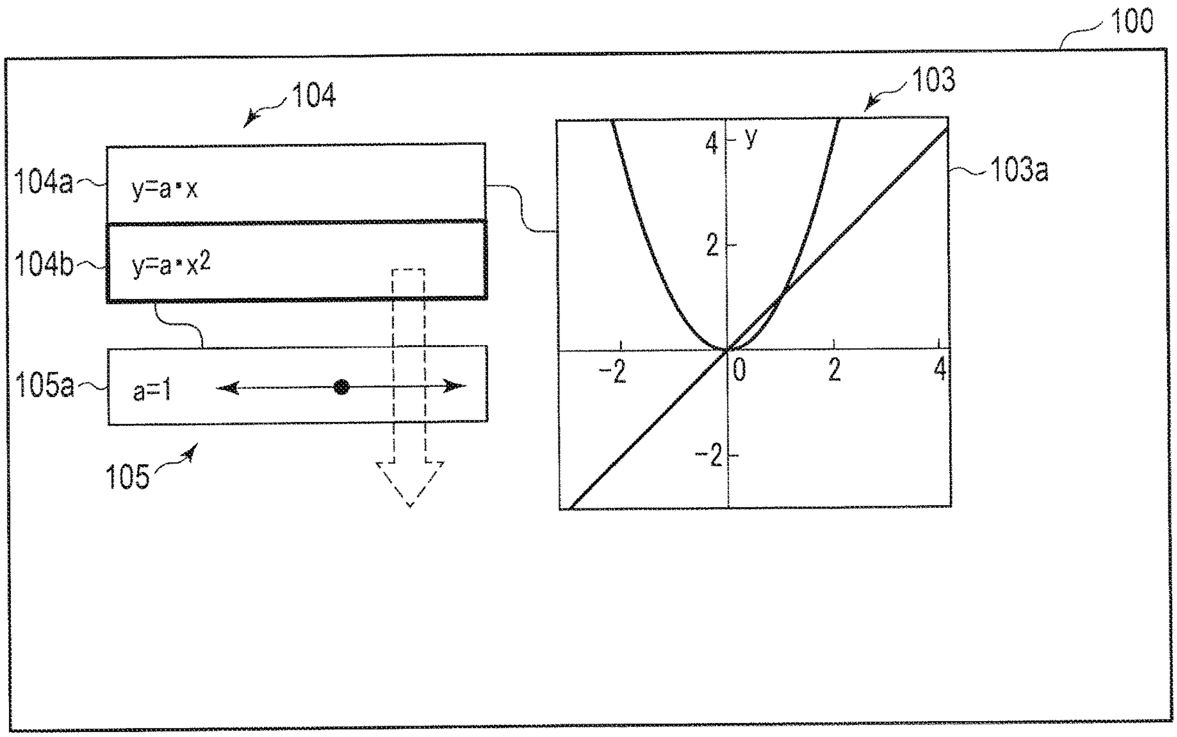
FIG. 23A is a diagram illustrating one example of display in execution of an operation of mutually separating numerical formula tags.

In FIG. 23A, the graph tag 103 (the first graph tag 103*a*), the numerical formula tag 104 (one numerical formula tag unit which is configured by the first numerical formula tag 104*a* and the second numerical formula tag 104*b*) and the slider tag 105 (the first slider tag 105*a*) are displayed on the paper 100. The graph (the first graph) of the numerical formula $y=a\cdot x$ which is input into the first numerical formula tag 104*a* and the graph (the second graph) of the numerical formula $y=a\cdot x^2$ which is input into the second numerical formula tag 104*b* are displayed in the graph tag 103. Sliders which are adapted to change the literal coefficient “a” which is included in the two numerical formulae are displayed in the slider tag 105. Since the same literal coefficient “a” is included in the two numerical formulae, the slider tag 105 (the first slider tag 105*a*) is shared between the first numerical formula tag 104*a* and the second numerical formula tag 104*b*. The slider tag 105 is shared between the first and second numerical formula tags 104*a* and 104*b* in accordance with, for example, No. 12 in the table which is illustrated in FIG. 19. The graph tag 103, the numerical formula tag 104 and the slider tag 105 are tags which are mutually tied, that is, belong to the same group.

The user selects the second numerical formula tag 104*b* in the first numerical formula tag 104*a* and the second numerical formula tag 104*b* which are aligned with each other and moves the second numerical formula tag 104*b* as illustrated in FIG. 23A. In the case, the terminal 20 executes the tag separation process in step S26 in FIG. 3.

Figure 23B:
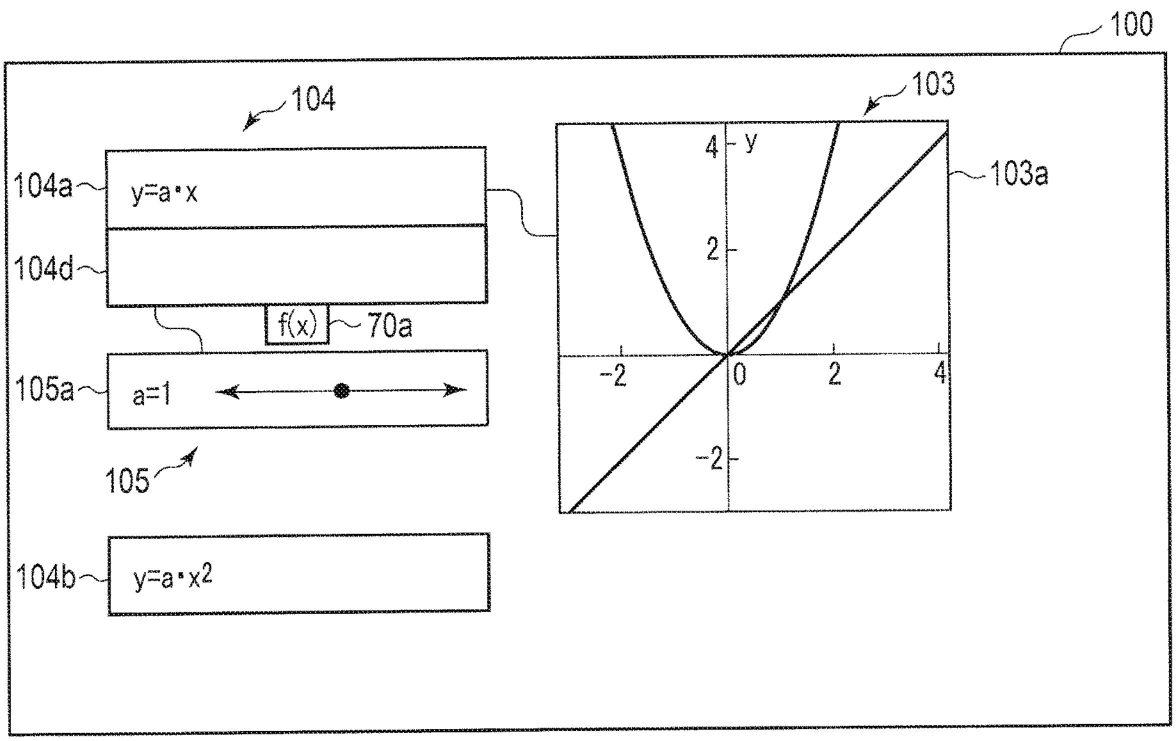
FIG. 23B is a diagram illustrating one example of display in execution of the operation of mutually separating the numerical formula tags.

FIG. 23B is a diagram illustrating one example of display observed in the middle of separation of the first numerical formula tag 104*a* and the second numerical formula tag 104*b* which are aligned with each other. In FIG. 23B, the second numerical formula tag 104*b* is moved by the drag operation. However, an outer frame 104*d* of the second numerical formula tag 104*b* is left behind and displayed on its original position where the second numerical formula tag 104*b* is displayed in a state of being aligned with the first numerical formula tag 104*a*.

Figure 23C:
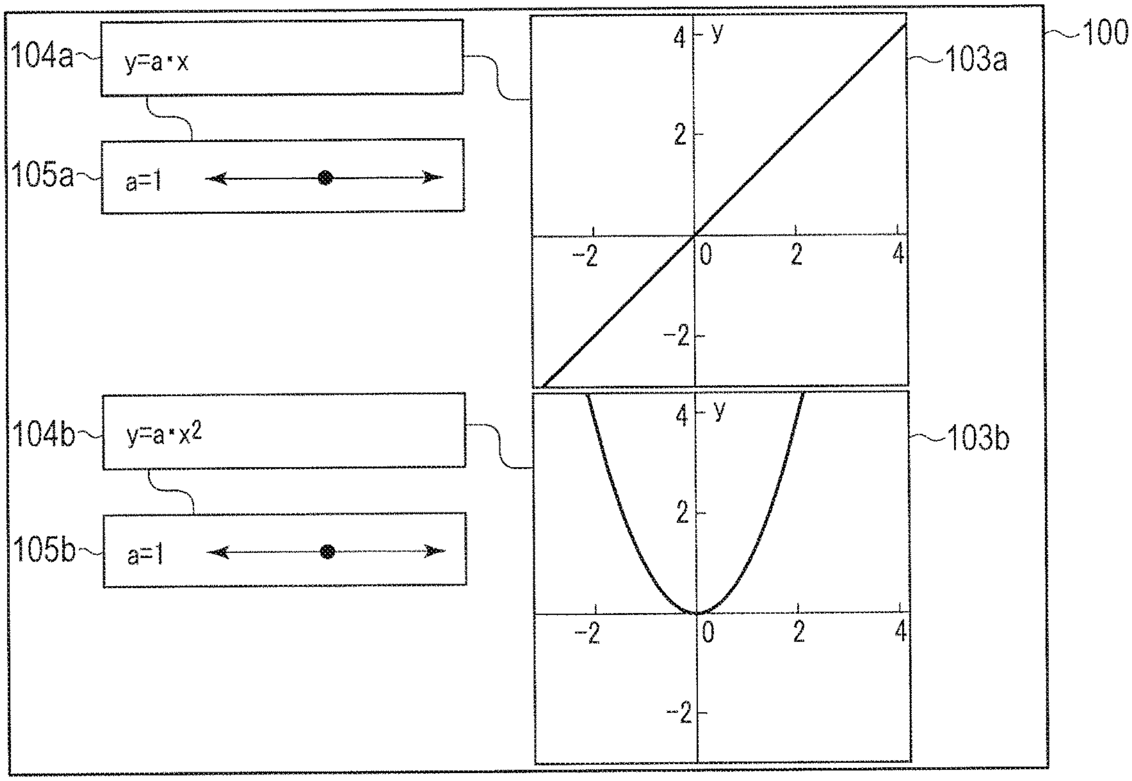
FIG. 23C is a diagram illustrating one example of display in execution of the operation of mutually separating the numerical formula tags.

When execution of the drag-and-drop operation is completed, the second numerical formula tag 104*b* is separated from the first numerical formula tag 104*a* as illustrated in FIG. 23C. In association with tag separation, the second slider tag 105*b* which is obtained by copying the first slider tag 105*a* is created. In association with tag creation, also the graph tag 103 is separated into a first graph tag 103*a* in which the first graph is displayed and a second graph tag 103*b* in which the second graph is displayed. Also, a tag which is tied to the separation object tag and belongs to the same group as the separation object tag is separated into two tags in association with separation of the separation object tag in this way.

In the tag separation process which is executed here, CPU 21 operates to display only the first graph in the first graph tag 103*a* and to display the second graph tag 103*b* in which the second graph is drawn on the basis of information (a result of execution of the arithmetic operation which is received from the server 10) on the second graph which is stored in the storage 24. The CPU 21 operates to create a copy of the first slider tag 105*a* on the basis of the slider information which is stored in the storage 24 and to display the copy as the second slider tag 105*b*. The CPU 21 operates to tie the first numerical formula tag 104*a* to the first slider tag 105*a* and the first graph tag 103*a* and to tie the second numerical formula tag 104*b* to the second slider tag 105*b* and the second graph tag 103*b*.

According to the above-mentioned embodiment which is illustrated in FIG. 23A to FIG. 23C, when mutually separating the first numerical formula tag 104*a* and the second numerical formula tag 104*b* which are included in one numerical formula tag 104 which is correlated to one graph tag 103, the graph tag 103*b* and the slider tag 105*b* are newly created and are displayed in a state of being tied to the second numerical formula tag 104*b* which is obtained after separation. Thereby, also when newly creating and displaying the various tags in association with mutual separation of the various tags, it becomes easy to see the correlation between/among the various tags which are displayed on the paper 100 before and after execution of the operation for tag separation and thereby the convenience is improved.

Incidentally, such an operation is not limited to the examples in FIG. 23A to FIG. 23C. This operation may be executed in such a case where it is desirable to display a plurality of graphs (for example, a linear function graph and a quadratic function graph) which are displayed in one graph tag and are mutually different in characteristics separately on a plurality of coordinate systems.

According to the present embodiment, it is possible to hide at least one of the plurality of graphs which are displayed in one graph tag 103 behind the graph tag 103 and to display the hidden graph in another graph tag 103. Accordingly, in a case where it is desirable to display at least one graph separately from the remaining graphs, the convenience and operability are improved.

A coupling operation which is executed by moving the numerical formula tags and display in execution of the coupling operation will be described with reference to FIG. 24A to FIG. 24C.

Figure 24A:
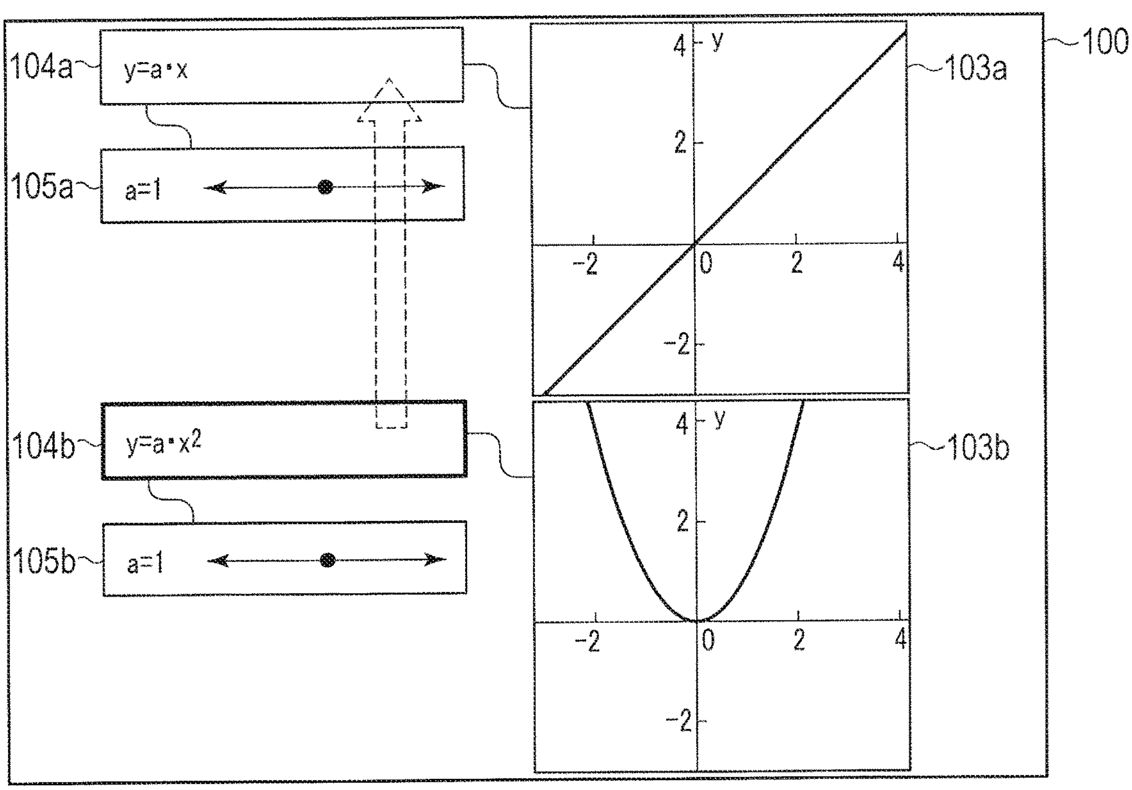
FIG. 24A is a diagram illustrating one example of display in execution of an operation of coupling together numerical formula tags.

FIG. 24A is a diagram illustrating one example of the display which corresponds to the display in FIG. 23C. In the display, the user executes an operation (for example, the drag-and-drop operation) of selecting the second numerical formula tag 104*b* and then moving the second numerical formula tag 104*b*. In this case, the terminal 20 executes the tag coupling process in step S25 in FIG. 3.

Figure 24B:
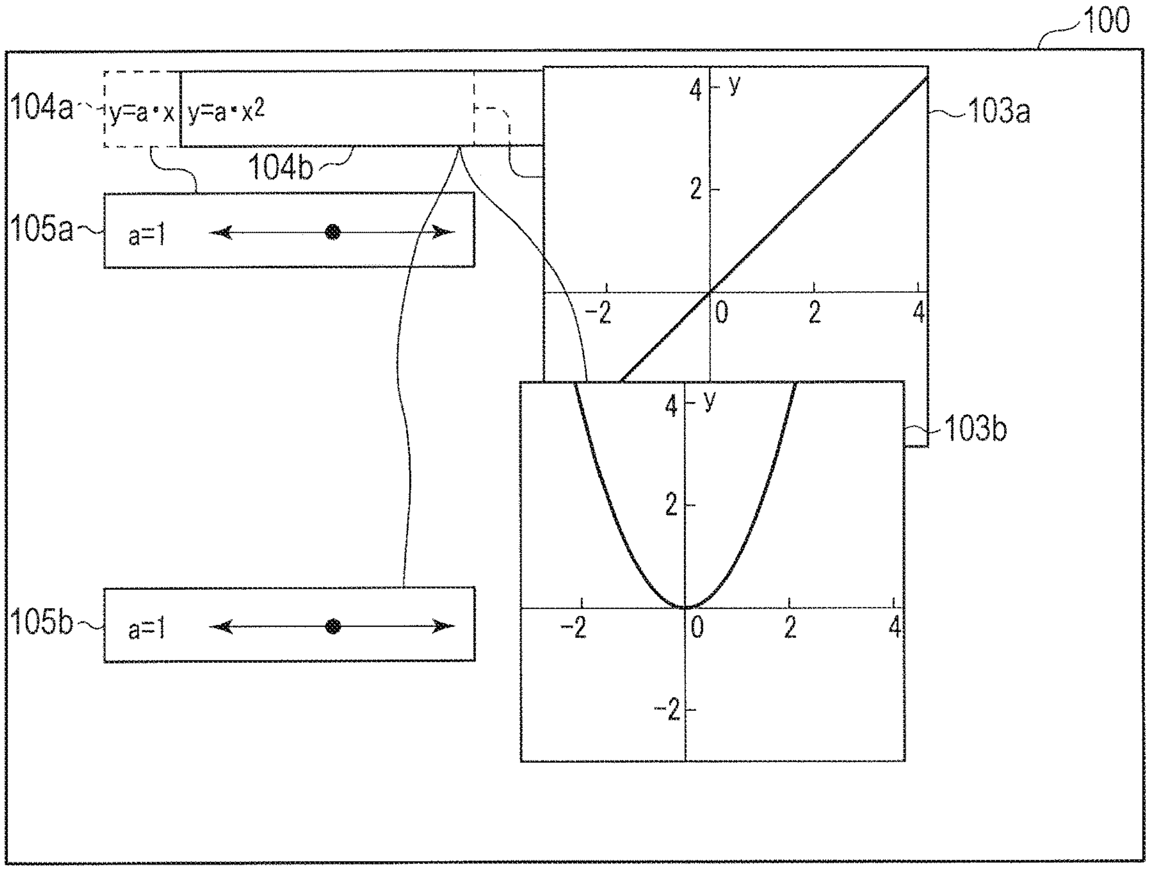
FIG. 24B is a diagram illustrating one example of display in execution of the operation of coupling together the numerical formula tags.

FIG. 24B is a diagram illustrating one example of display which is observed in the middle of coupling of the first numerical formula tag 104*a* and the second numerical formula tag 104*b* which are to be aligned with each other. When the second numerical formula tag 104*b* is moved to the side of the first numerical formula tag 104*a* which is a coupling (alignment) destination by the drag operation, the outer frame of the first numerical formula tag 104*a* is displayed by a broken line. When the drop operation is executed in a state where the frame is being displayed by the broken line, the coupling operation is completed.

Figure 24C:
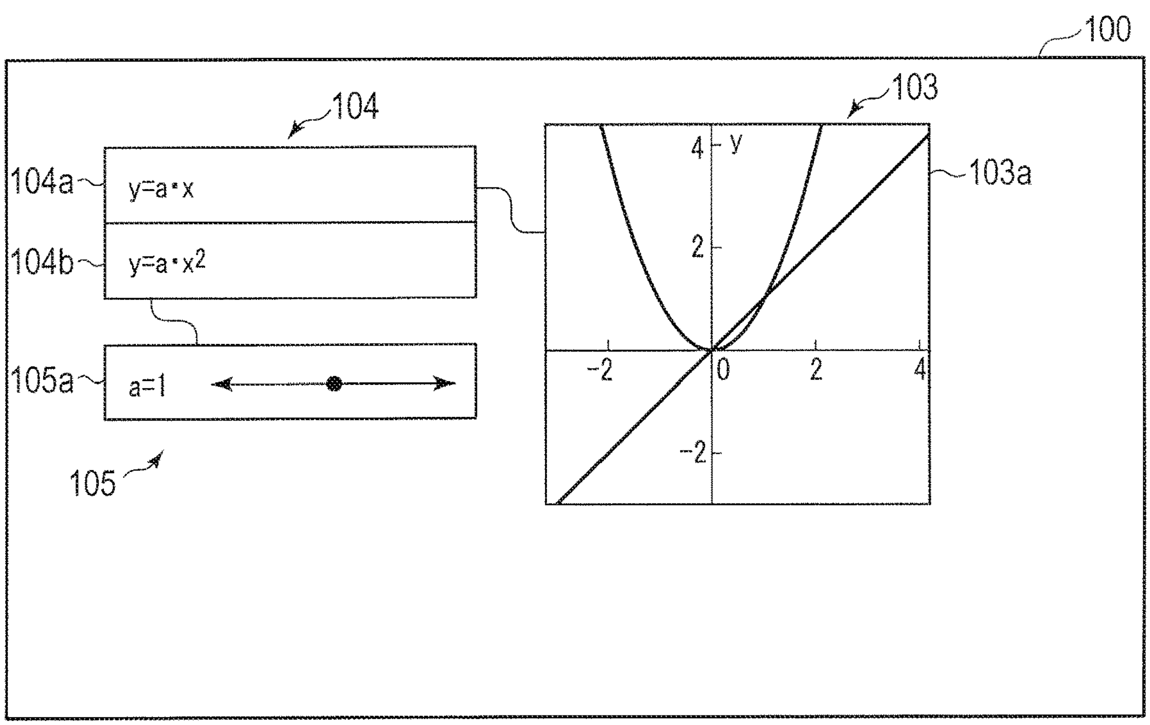
FIG. 24C is a diagram illustrating one example of display in execution of the operation of coupling together the numerical formula tags.

At completion of execution of the coupling operation, the second numerical formula tag 104*b* is displayed in a state of being connected to the lower side of the first numerical formula tag 104*a* as illustrated in FIG. 24C. The second slider tag 105*b* which includes the literal coefficient "a" which is the same as the literal coefficient "a" which is included in the first slider tag 105*a* is erased in association with connection of the first and second numerical formula tags 104*a* and 104*b*. That is, the second slider tag 105*b* is integrated with the first slider tag 105*a*. The second graph tag 103*b* in which the second graph is displayed is integrated with the first graph tag 103*a* into one graph tag 103 in association with integration of the first and second slider tags 105*a* and 105*b*. Also, the tags which belong to the same group and are tied to the coupling object tags are coupled together in association with coupling of the coupling object tags in this way.

In the tag coupling process which is executed here, the CPU 21 operates to display the first graph tag 103*a* in which the second graph is drawn together with the first graph on the basis of the information on the second graph which is stored in the storage 24. The CPU 21 operates to display only the first slider tag 105*a*.

According to the above-described embodiment which is illustrated in FIG. 24A to FIG. 24C, when coupling together the first numerical formula tag 104*a* and the second numerical formula tag 104*b* which are correlated to the first graph tag 103*a* and the second graph tag 103*b* respectively, the second graph tag 103*b* and the second slider tag 105*b* are hidden in a state of being tied to the coupled-state numerical formula tag 104. Thereby, also when hiding the various tags in association with mutual coupling of the various tags, it becomes easy to see the correlation between/among the various tags which are displayed on the paper 100 before and after execution of the operation for tag coupling and therefore the convenience is improved.

Incidentally, such an operation is not limited to this example. This operation may be executed in a case where it is desirable to display the plurality of graphs (for example, the linear function graph and the quadratic function graph) which are separately displayed in two graph tags and are mutually different in characteristics on the same coordinate system all in one piece.

According to the present embodiment, since it is possible to display the plurality of graphs which are separately displayed in the two graph tags 103*a* and 103*b* in one graph tag all in one piece by the simple operation, in a case where it is desirable to display the graphs which are separately displayed in mutually different areas in a coupled state, the convenience and the operability are improved.

The coupling operation which is executed by moving the graph tags and display in execution of the operation concerned will be described with reference to FIG. 25A to FIG. 25E.

Figure 25A:
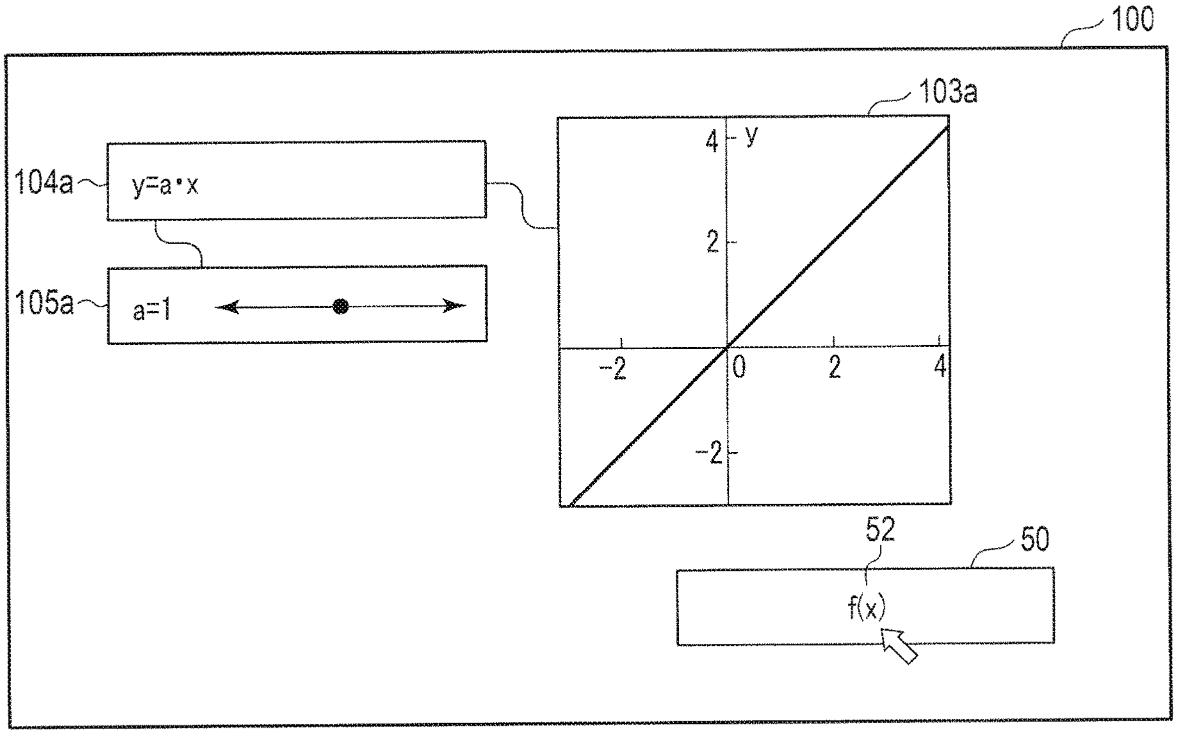
FIG. 25A is a diagram illustrating one example of display in execution of an operation of coupling together numerical formula tags.

In FIG. 25A, the first graph tag 103*a*, the first numerical formula tag 104*a* and the first slider tag 105*a* are displayed on the paper 100. The graph (the first graph) of the numerical formula y=a·x which is input into the first numerical formula tag 104*a* is drawn in the first graph tag 103*a*. The slider which is used to change the literal coefficient "a" which is included in the numerical formula concerned is displayed in the first slider tag 105*a*. The first graph tag 103*a* and the first slider tag 105*a* are tied to the first numerical formula tag 104*a*.

Figure 25B:
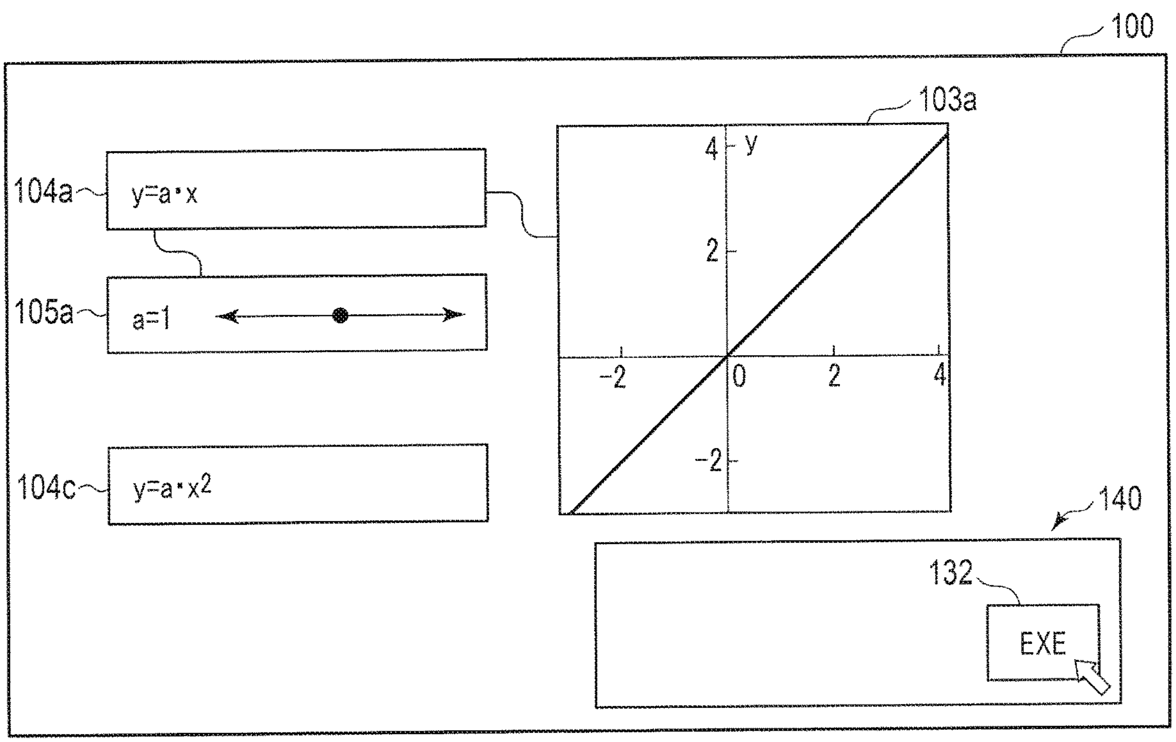
FIG. 25B is a diagram illustrating one example of display in execution of the operation of coupling together the numerical formula tags.
Figure 25C:
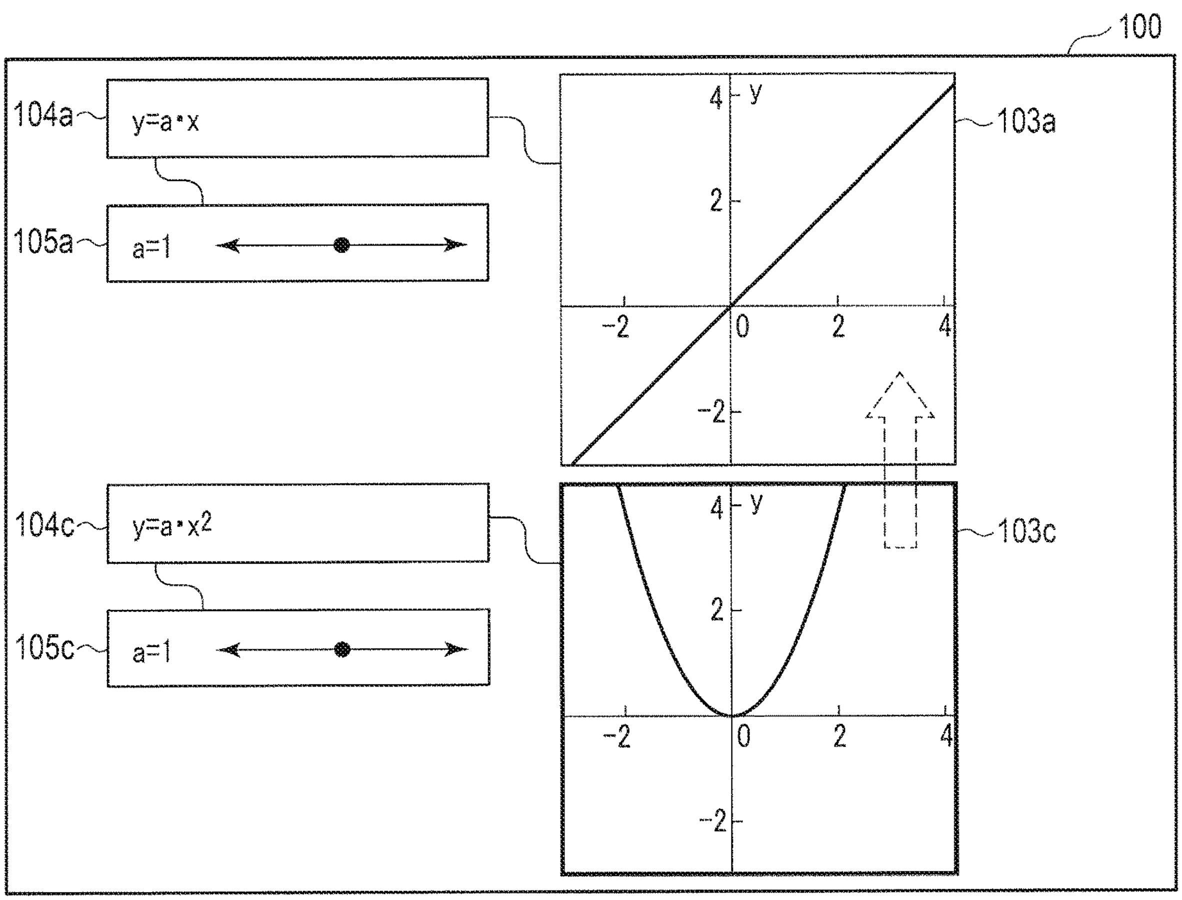
FIG. 25C is a diagram illustrating one example of display in execution of the operation of coupling together the numerical formula tags.

The user displays the menu icon bar 50 on the paper 100 and selects the numerical formula icon 52 from the menu icon bar 50. In this situation, the terminal 20 executes the numerical formula tag creation process in step S13 in FIG. 3. Thereby, a third numerical formula tag 104*c* is displayed as a new tag as illustrated in FIG. 25B. The third numerical formula tag 104*c* is the distinct and independent tag which is not correlated to the first numerical formula tag 104*a*. The third numerical formula tag 104*c* is displayed and also the input board 140 is displayed. The user selects the displayed third numerical formula tag 104*c* and inputs the numerical formula y=a $x^2$ by using the input board 140. In this situation, the terminal 20 executes the processes in step S16 and step S17 in FIG. 3. Then, the user selects the EXE key 132 of the input board 140. Thereby, a graph (a third graph) of the numerical formula concerned is drawn in the third graph tag 103*c* and a third slider tag 105*c* which relates to the literal coefficient "a" which is included in the numerical formula concerned is displayed as illustrated in FIG. 25C. In this situation, the terminal 20 executes the processes in step S19 and step S20 in FIG. 3. The third graph tag 103*c* and the third slider tag 105*c* are tied to the third numerical formula tag 104*c*.

The user selects the third graph tag 103*c* and moves the third graph tag 103*c* as illustrated in FIG. 25C. In this situation, the terminal 20 executes the tag coupling process in step S25 in FIG. 3.

Figure 25D:
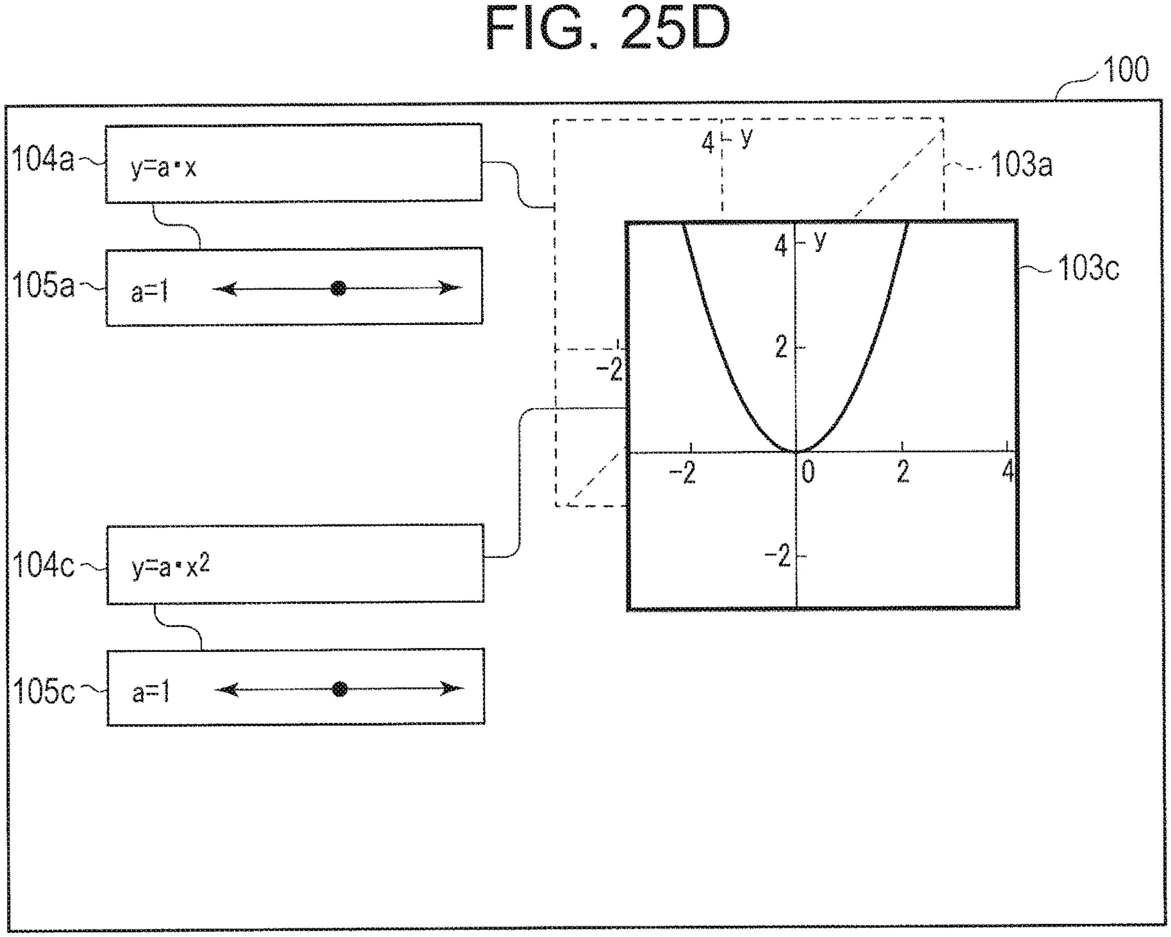
FIG. 25D is a diagram illustrating one example of display in execution of the operation of coupling together the numerical formula tags.
Figure 25E:
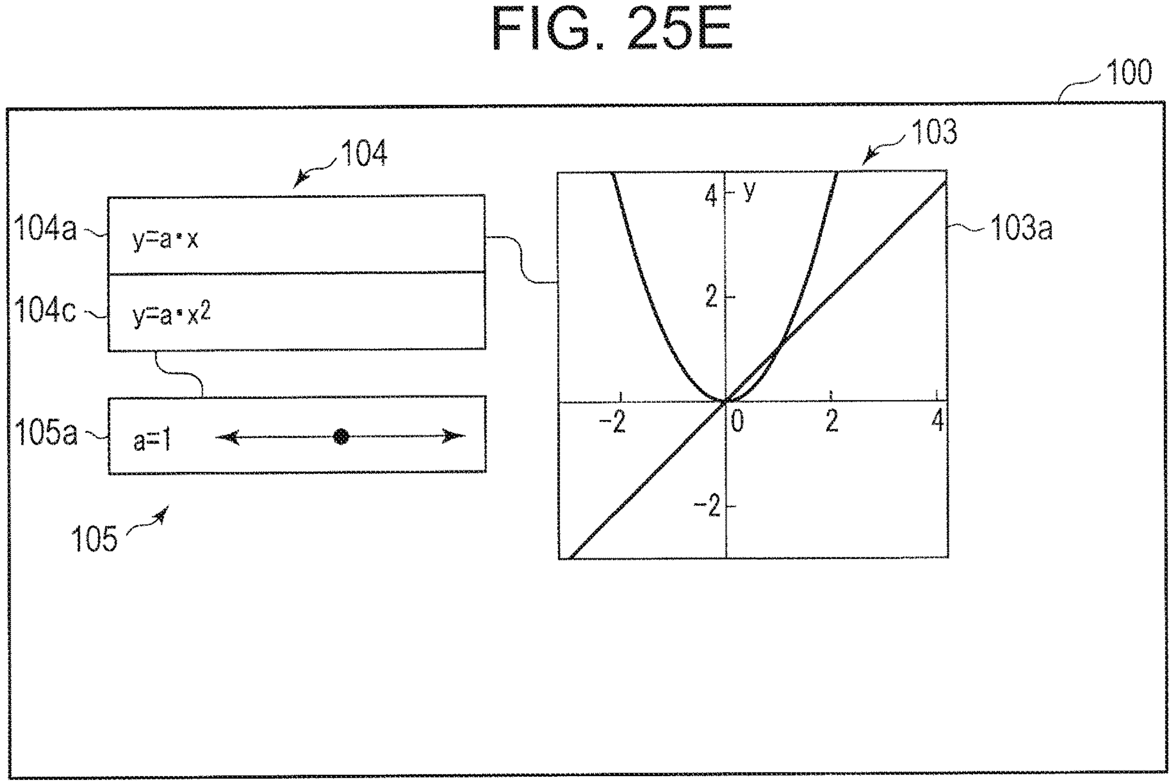
FIG. 25E is a diagram illustrating one example of display in execution of the operation of coupling together the numerical formula tags.

FIG. 25D is a diagram illustrating one example of display which is observed in the middle of mutual coupling of the first graph tag 103*a* and the second graph tag 103*b* to be integrated. The outer frame of the first graph tag 103*a* is displayed by the broken line by moving the pointer which is being dragged over the first graph tag 103*a* which is the coupling (integration) destination. When the drop operation is executed in this broken-line-displayed state, the coupling operation is completed.

At completion of execution of the coupling operation, the third graph tag 103*c* in which the third graph is displayed is integrated with the first graph tag 103*a* into one graph tag 103 and the third slider tag 105*c* which relates to the literal coefficient "a" is integrated with the first slider tag 105*a* and thereby the slider tag 105 is displayed as illustrated in FIG.

25E. That is, the slider tag 105 is shared between the first numerical formula tag 104*a* and the third numerical formula tag 104*c*.

In the present embodiment, the tags which belong to the group which is the same as the group of the operational object tag are respectively coupled with their corresponding tags in association with coupling of the operational object tag in this way. Since the mutually tied tags in the same group are respectively coupled with their corresponding tags by a single operation, excellent operability is attained.

According to the above-mentioned embodiment illustrated in FIG. 25A to FIG. 25E, when coupling together the first graph tag 103*a* and the second graph tag 103*b* which are correlated to the first numerical formula tag 104*a* and the second numerical formula tag 104*b* respectively, the first numerical formula tag 104*a* and the second numerical formula tag 104*b* are coupled together into the numerical formula tag 104, the graph tag 103*b* and the slider tag 105*b* are hidden, and the coupled-state numerical formula tag 104 is displayed in a state of being tied to the graph tag 103*a* and the slider tag 105*a* which are maintained in a displayed state. Thereby, even in a case of hiding the various tags in association with mutual coupling of the various tags, it becomes easy to see the correlation between/among the respective tags which are displayed on the paper 100 before and after execution of the operation for tag coupling and therefore the convenience is improved.

Incidentally, such an operation is not limited to this example. This operation may be executed in a case where it is desirable to display the plurality of graphs (for example, the linear function graph and the quadratic function graph) which are separately displayed in two graph tags and are mutually different in characteristics on the same coordinate system all in one piece.

According to the present embodiment, since it is possible to display the plurality of graphs which are separately displayed in the two graph tags 103*a* and 103*b* in one graph tag all in one piece by the simple operation, in a case where it is desirable to display the graphs which are separately displayed in mutually different areas in a coupled state, the convenience and the operability are improved.

One example of operations and display in creation of the coordinate value tag 109 and the arithmetic operation (α+β) tag 110 will be described with reference to FIG. 26A to FIG. 26F.

Figure 26A:
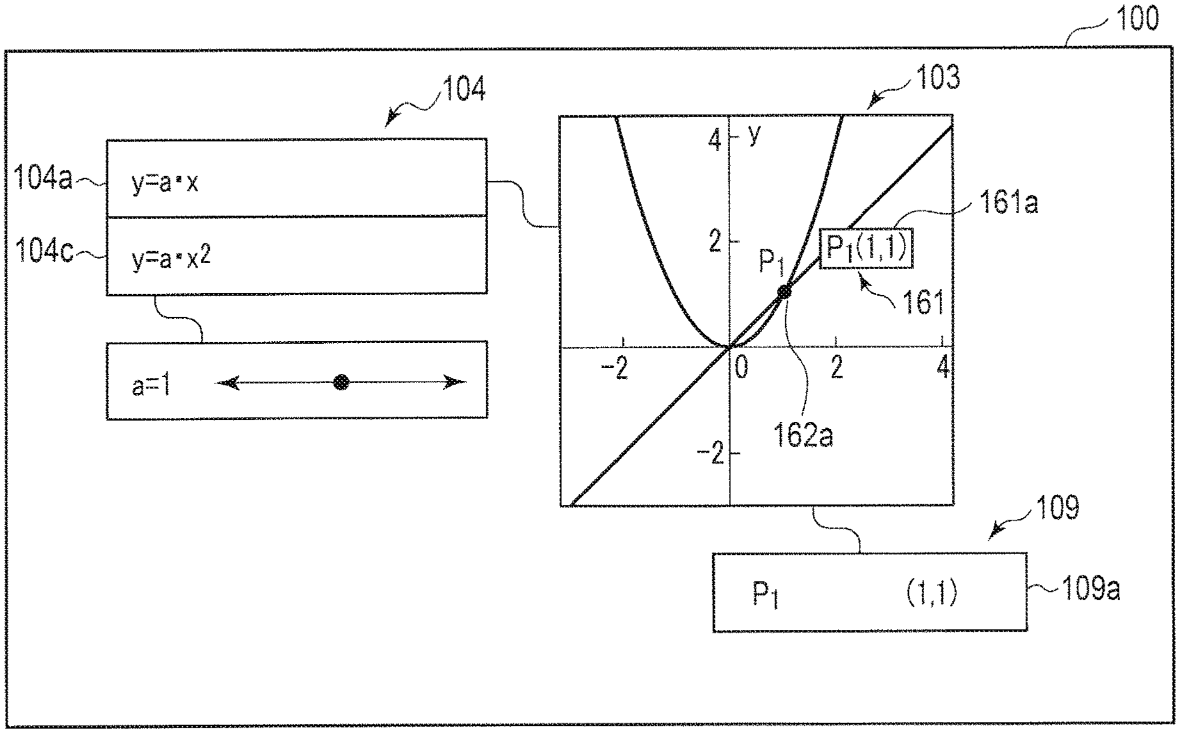
FIG. 26A is a diagram illustrating one example of display in creation of coordinate value tags and arithmetic operation tags.

In FIG. 26A, the graph tag 103, the numerical formula tag 104 (the numerical formula tag unit which is configured by the first numerical formula tag 104*a* and the third numerical formula tag 104*c*) and the slider tag 105*a* are displayed on the paper 100. The first graph of the numerical formula $y=a\cdot x$ which is input into the first numerical formula tag 104*a* and the second graph of the numerical formula $y=a\cdot x^2$ which is input into the second numerical formula tag 104*b* are displayed in the graph tag 103. When the user selects the graph tag 103 and positions the pointer over the graph which is drawn in the graph tag 103, coordinate value display appears. For example, when the user positions the pointer over an intersection point 162*a* (1, 1) which is one of intersection points of the first graph and the second graph and selects the intersection point 162*a* in a case where a=1, the code P1 is displayed near the intersection point 162*a* in correspondence with the selected point 162*a* on the graph and thereby the coordinate value display is definitely decided, a coordinate value label 161*a* which displays the point P1 (1, 1) is displayed and further the coordinate value tag 109 (109*a*) of the display which is the same as that of the label 161*a* is created. The point P1 (1, 1) is displayed in the created first coordinate value tag 109*a*. In this situation, the terminal 20 executes the coordinate value tag creation process in step S24 in FIG. 3. In addition, creation of the display in FIG. 26A corresponds to No. 6 in the table which is illustrated in FIG. 19.

Figure 26B:
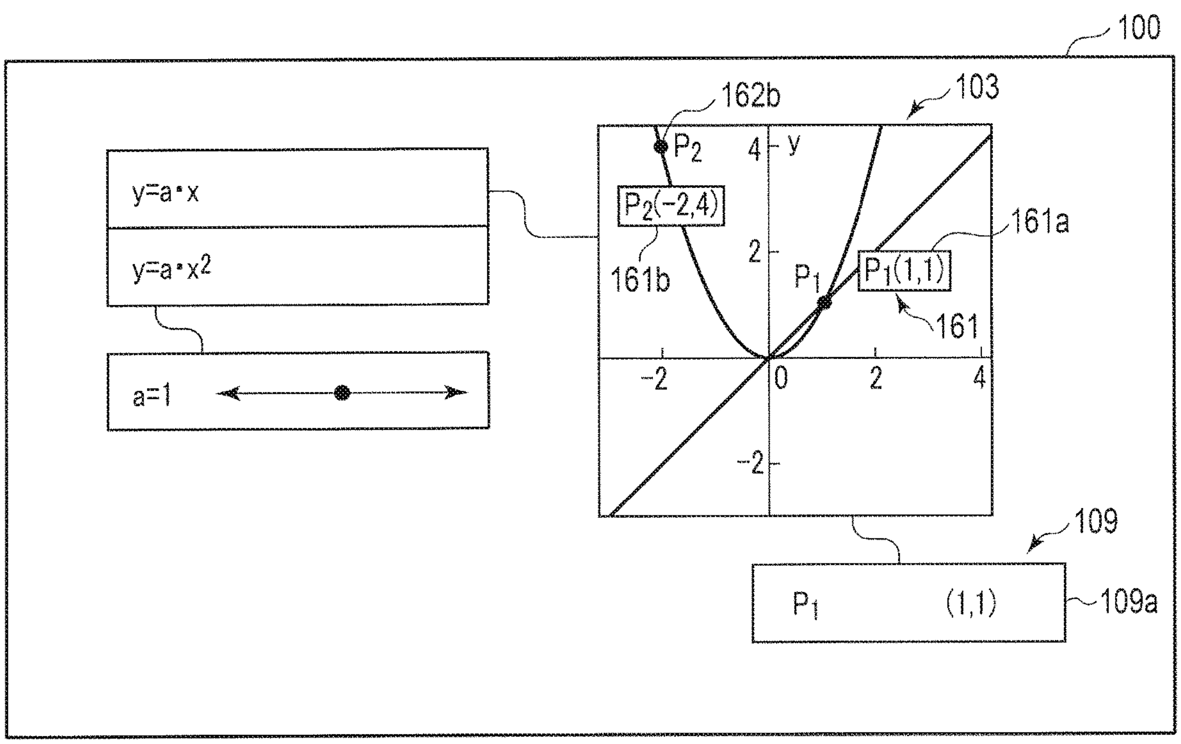
FIG. 26B is a diagram illustrating one example of display in creation of the coordinate value tags and the arithmetic operation tags.
Figure 26C:
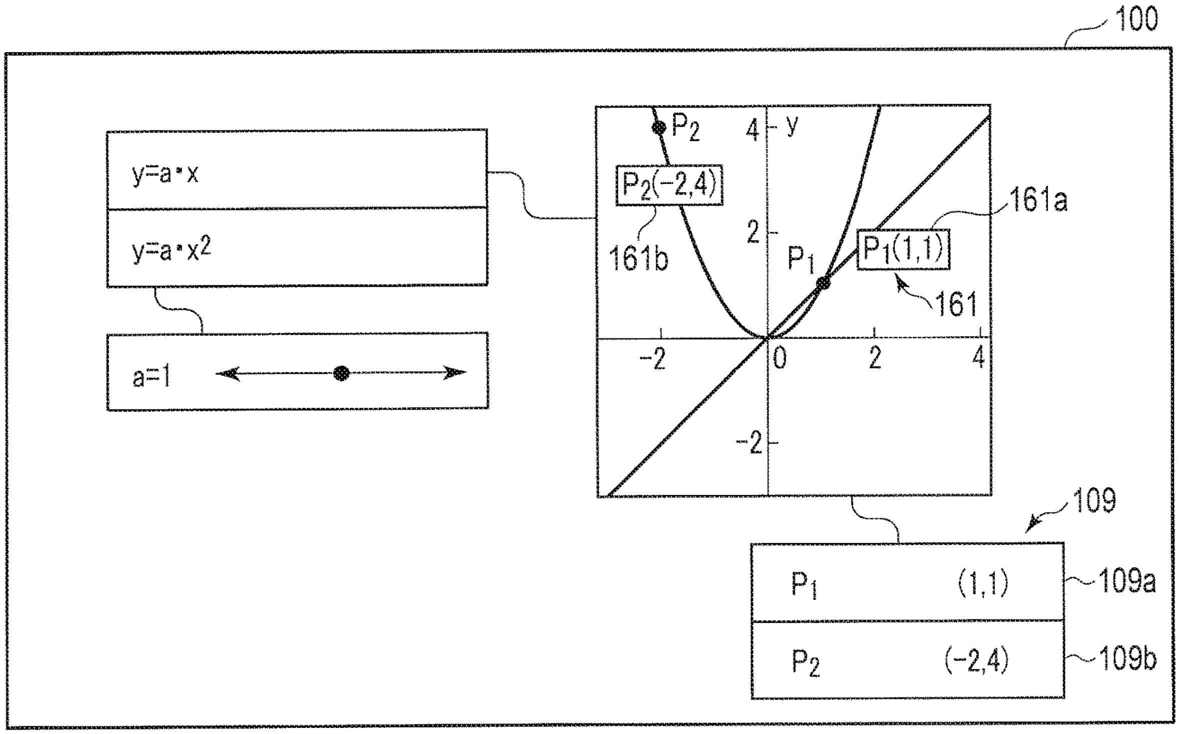
FIG. 26C is a diagram illustrating one example of display in creation of the coordinate value tags and the arithmetic operation tags.

In a case where the user selects the graph tag 103 and positions the pointer over the graph which is displayed in the graph tag 103, the coordinate value display appears again. For example, as illustrated in FIG. 26B, when the pointer is positioned over a point 162*b* (−2, 4) on the second graph and the point 162*b* is selected in a case where a=1, the code P2 is displayed near the point 162*b* in correspondence with the selected point 162*b* on the graph and thereby a coordinate value label 161*b* is definitely decided and the coordinate value label 161*b* which displays the point P2 (−2, 4) is displayed. Further, the coordinate value tag 109 (109*b*) of the display which is the same as that of the label 161*b* is created. The created second coordinate value tag 109*b* is displayed in a state of being connected to the lower side of the first coordinate value tag 109*a*. In this situation, the terminal 20 executes the coordinate value tag creation process in step S24 in FIG. 3. In addition, transition from the display in FIG. 26B to the display in FIG. 26C corresponds to No. 5 in the table which is illustrated in FIG. 19.

Figure 26D:
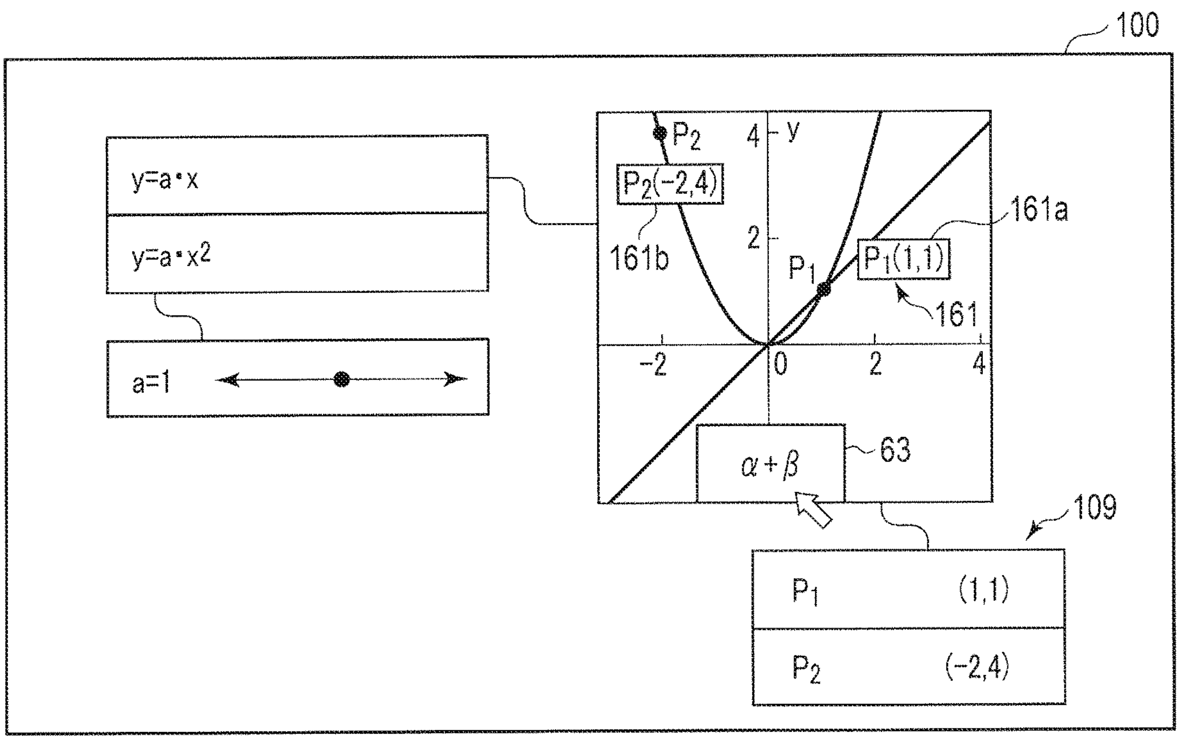
FIG. 26D is a diagram illustrating one example of display in creation of the coordinate value tags and the arithmetic operation tags.
Figure 26E:
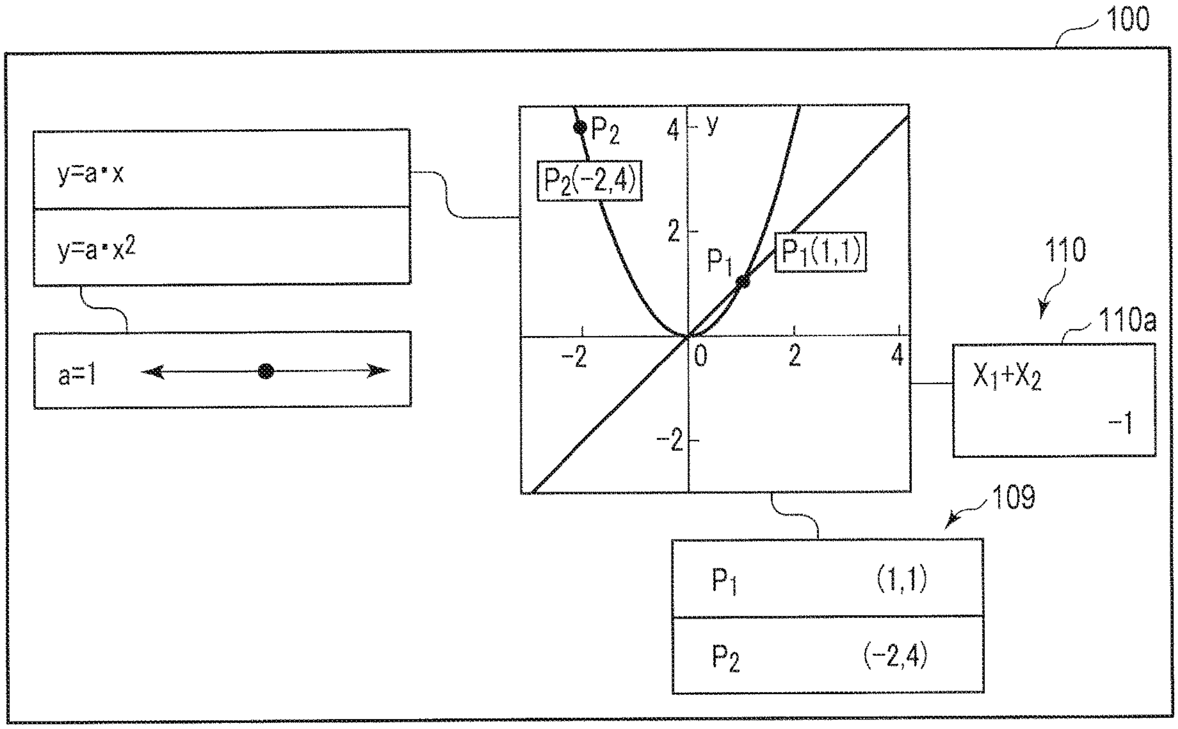
FIG. 26E is a diagram illustrating one example of display in creation of the coordinate value tags and the arithmetic operation tags.

When the user selects the graph tag 103, the arithmetic operation icon 63 is displayed in the graph tag 103 as illustrated in FIG. 26D. The user positions the pointer over the arithmetic operation icon 63 and selects the icon 63. Thereby, the arithmetic operation (α+β) tag 110 which includes the free arithmetic operation (α+β) tag 110*a* is displayed. In this situation, the terminal 20 executes the arithmetic operation (α+β) tag creation process in step S15 in FIG. 3. In addition, transition from the display in FIG. 26D to the display in FIG. 26E corresponds to No. 8 in the table which is illustrated in FIG. 19.

When the user selects the free arithmetic operation (α+β) tag 110*a*, the cursor is displayed in an input area of the arithmetic operation (α+β) tag 110*a* and the input board (not illustrated) is displayed. The user inputs, for example, x1+x2 by using the input board 140. Here, the x coordinate of the point P1 which is indicated in the coordinate value tag 109 is allocated to “x1” and the x coordinate of the point P2 which is indicated in the coordinate value tag 109 is allocated to “x2”. When the user selects an execution key which is included in the input board (not illustrated) or depresses an Enter key of the input device 25 of the terminal 20, the arithmetic operation concerned is executed. That is, the arithmetic operation process in step S18 in FIG. 3 is executed. Here, x1+x2=1+(−2)=−1 is displayed as a result of execution of the arithmetic operation in the arithmetic operation (α+β) tag 110. In this situation, the terminal 20 executes the arithmetic operation (α+β) process in step S23 in FIG. 3.

Figure 26F:
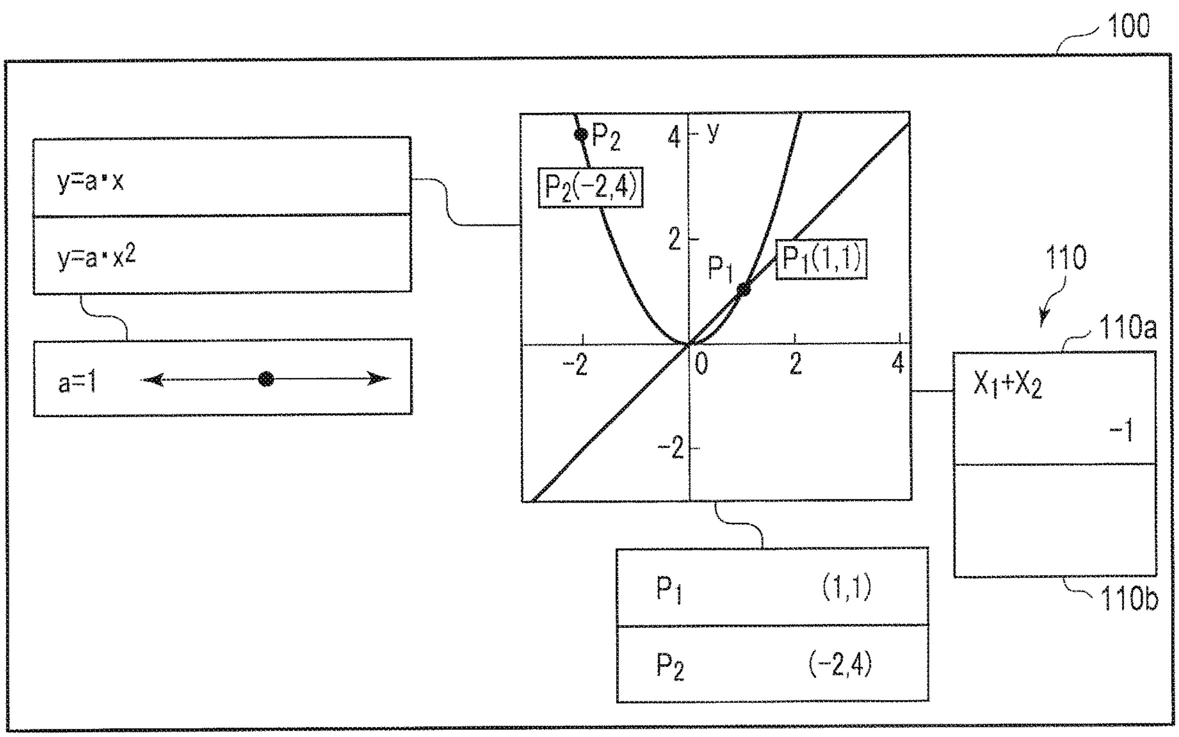
FIG. 26F is a diagram illustrating one example of display in creation of the coordinate value tags and the arithmetic operation tags.

When the user again selects the arithmetic operation icon 63 on the graph tag 103, the arithmetic operation (α+β) tag 110 is displayed. The second arithmetic operation (α+β) tag 110*b* is displayed in a state of being connected to the lower side of the first arithmetic operation (α+β) tag 110*a* (FIG. 26F). In this situation, the terminal 20 executes the arithmetic operation (α+β) tag creation process in step S15 in FIG. 3. Transition from the display in FIG. 26E to the display in FIG. 26F corresponds to No. 7 in the table which is indicated in FIG. 19.

The coordinate value tag 109 and the arithmetic operation (α+β) tag 110 are tags which are created in a state of being tied to the graph tag 103 in this way. The coordinate value tag 109 (109*a*, 109*b*) and the arithmetic operation (α+β) tag 110 (110*a*, 110*b*) which are tied to the same graph tag 103 are displayed in a state where the two tags are connected together and thereby are displayed in a well-listed state.

According to the above-mentioned embodiment illustrated in FIG. 26A to FIG. 26F, when newly creating and displaying the coordinate value tag 109*b* and the arithmetic operation (α+β) tag 110*b* in a state of being correlated to one graph tag 103, the coordinate value tag 109*b* and the arithmetic operation (α+β) tag 110*b* are displayed in a state of being respectively connected to the coordinate value tag 109*a* and the arithmetic operation (α+β) tag 110*a* which are correlated to the graph tag 103. Therefore, when newly creating and displaying the various tags, it becomes easy to see the correlation between/among the various tags which are displayed on the paper 100 before and after execution of the operation for tag creation and therefore the convenience is improved.

Display of the coordinate value tag 109 and the arithmetic operation (α+β) tag 110 in execution of the tag coupling operation will be described with reference to FIG. 27A and FIG. 27B.

Figure 27A:
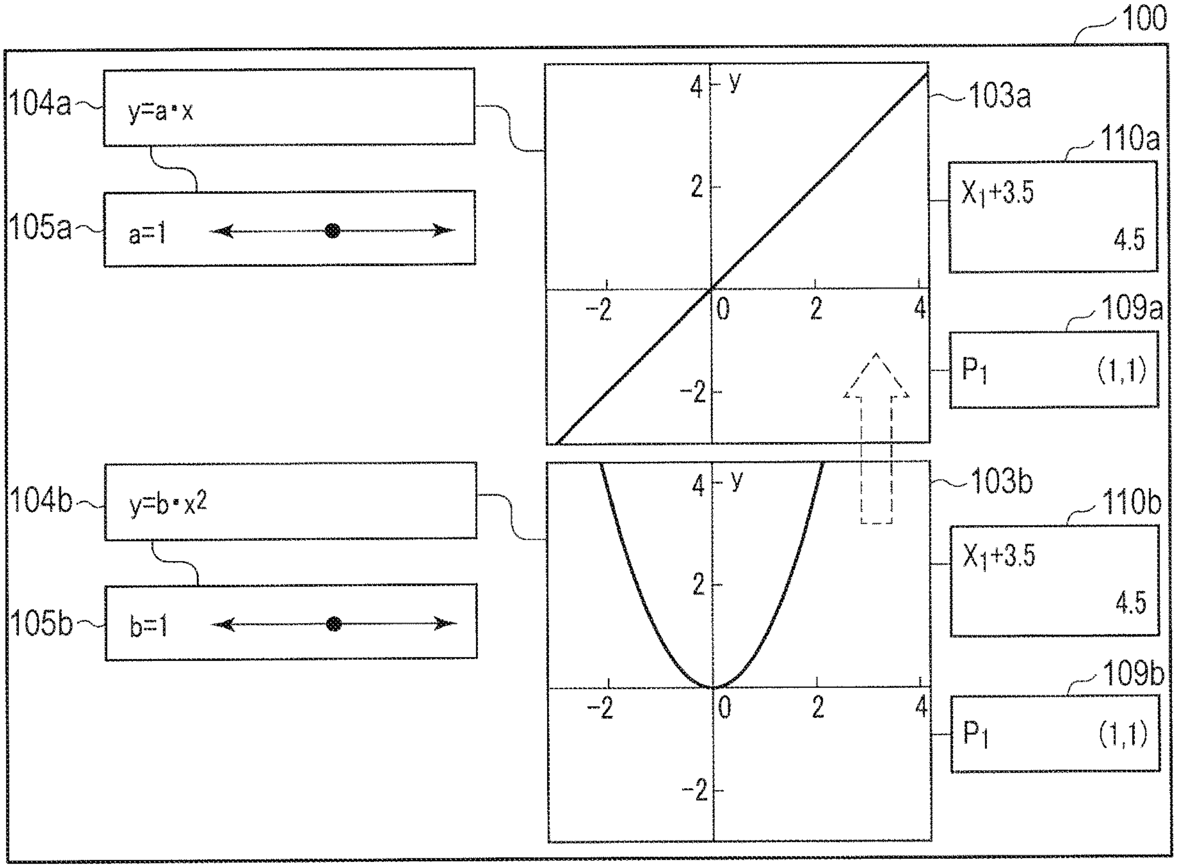
FIG. 27A is a diagram illustrating one example of display of coordinate value tags and arithmetic operation tags in execution of a tag coupling operation.

In FIG. 27A, the first graph tag 103*a*, the first numerical formula tag 104*a*, the first slider tag 105*a*, the first coordinate value tag 109*a* and the first arithmetic operation (α+β) tag 110*a* are displayed on the paper 100. The first graph tag 103*a* and the first slider tag 105*a* are tied to the first numerical formula tag 104*a*. The first coordinate value tag 109*a* and the first arithmetic operation (α+β) tag 110*a* are tied to the first graph tag 103*a*. In addition, the second graph tag 103*b*, the second numerical formula tag 104*b*, the second slider tag 105*b*, the second coordinate value tag 109*b* and the second arithmetic operation (α+β) tag 110*b* are displayed on the paper 100. The second graph tag 103*b* and the second slider tag 105*b* are tied to the second numerical formula tag 104*b*. The second coordinate value tag 109*b* and the second arithmetic operation (α+β) tag 110*b* are tied to the second graph tag 103*b*.

The user selects the second graph tag 103*b* and moves the second graph tag 103*b*. In this situation, the terminal 20 executes the tag coupling process in step S25 in FIG. 3. Thereby, although the graph tags 103*a* and 103*b*, the numerical formula tags 104*a* and 104*b* and the slider tags 105*a* and 105*b* are coupled together respectively in a state of being tied together, the coordinate value tag 109 and the arithmetic operation (α+β) tag 110 are erased, as illustrated in FIG. 27B.

Figure 27B:
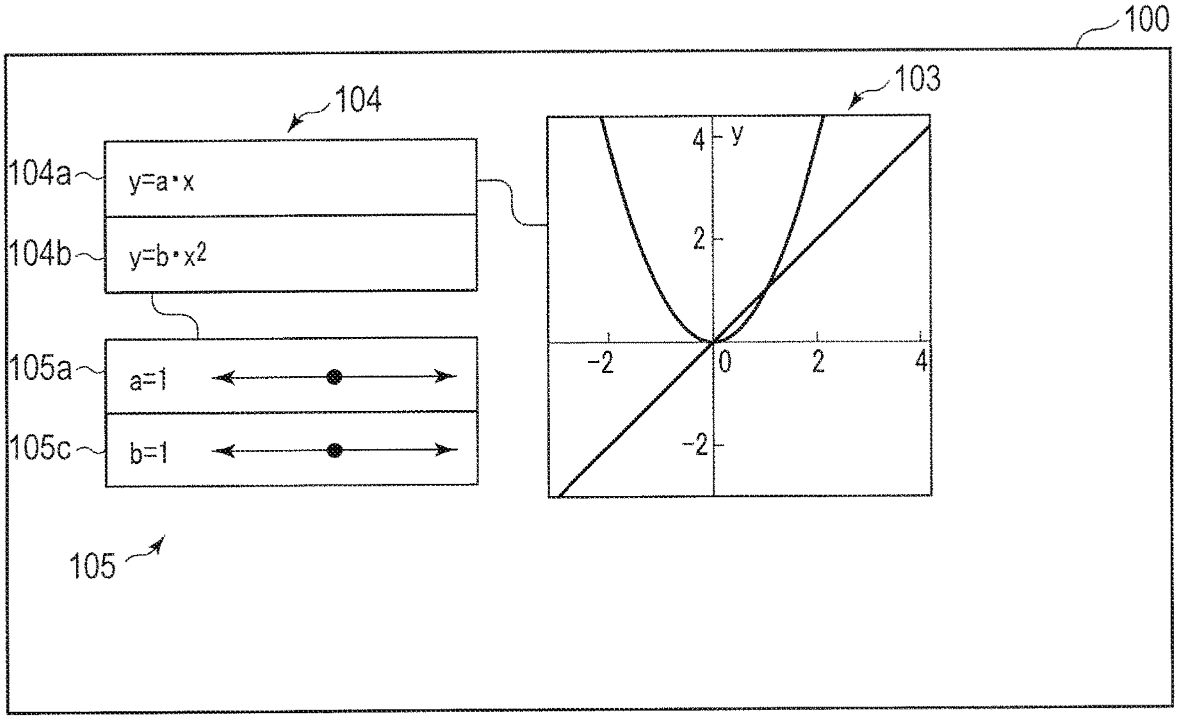
FIG. 27B is a diagram illustrating one example of display of the coordinate value tags and the arithmetic operation tags in execution of the tag coupling operation.

According to the above-described embodiment which is illustrated in FIG. 27A and FIG. 27B, when coupling together the first graph tag 103*a* and the second graph tag 103*b*, the coordinate value tags 109*a* and 109*b* and the arithmetic operation (α+β) tags 110*a* and 110*b* which are correlated to the respective graph tags 103*a* and 103*b* are hidden. Thereby, it becomes easy to see the correlation between/among the various tags which are displayed on the paper 100 by hiding some kinds of tags in association with mutual coupling of the various tags and thereby the convenience is improved.

Display of the coordinate value tag 109 and the arithmetic operation (α+β) tag 110 in execution of the tag separating operation will be described with reference to FIG. 28A to FIG. 28C.

Figure 28A:
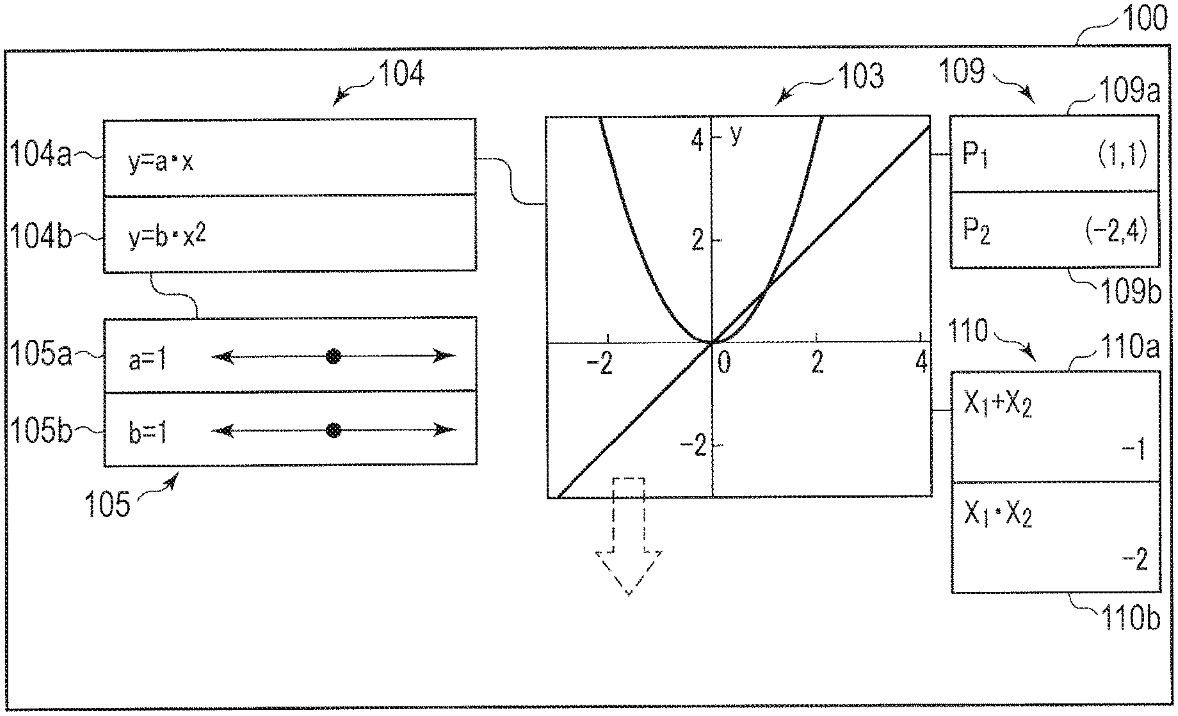
FIG. 28A is a diagram illustrating one example of display of coordinate value tags and arithmetic operation tags in execution of a tag separating operation.

In FIG. 28A, the graph tag 103, the numerical formula tag 104 which includes the first numerical formula tag 104*a* and the second numerical formula tag 104*b*, the slider tag 105 which includes the first slider tag 105*a* and the second slider tag 105*b*, the coordinate value tag 109 which includes the first coordinate value tag 109*a* and the second coordinate value tag 109*b*, and the arithmetic operation (α+β) tag 110 which includes the first arithmetic operation (α+β) tag 110*a* and the second arithmetic operation (α+β) tag 110*b* are displayed on the paper 100. The graph tag 103 and the slider tag 105 are tied to the numerical formula tag 104. The coordinate value tag 109 and the arithmetic operation (α+β) tag 110 are tied to the graph tag 103.

The user executes an operation (for example, the drag-and-drop operation) of selecting the second tab (not illustrated) of the graph tag 103 and moving the graph tag 103. In this situation, the terminal 20 executes the tag separation process in step S26 in FIG. 3.

Figure 28B:
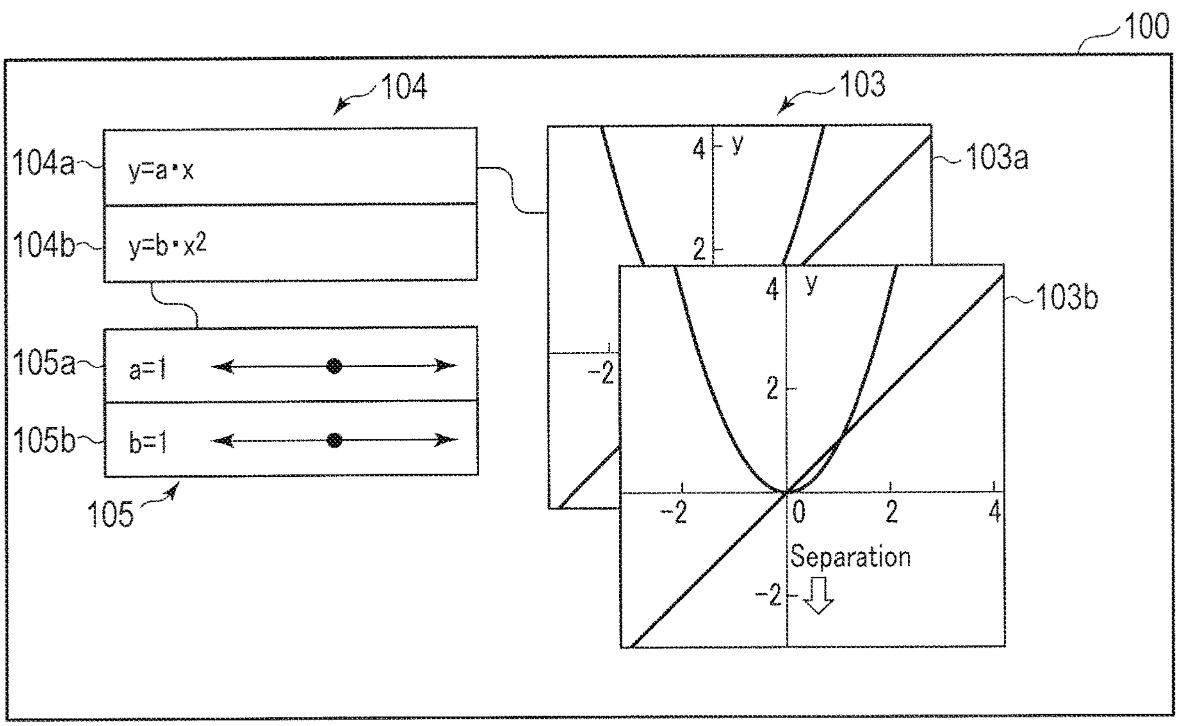
FIG. 28B is a diagram illustrating one example of display of the coordinate value tags and the arithmetic operation tags in execution of the tag separating operation.

FIG. 28B is a diagram illustrating one example of display which is observed in the middle of separation of the integrated graph tag 103. The letter "Separation" is displayed in a graph area of the second graph tag 103*b* which is displayed in association with execution of the separating operation. Thereby, it is seen that separation is being executed at a glance. Incidentally, the second graph tag 103*b* and the letter "Separation" which are illustrated in FIG. 28B may be displayed thinly.

Figure 28C:
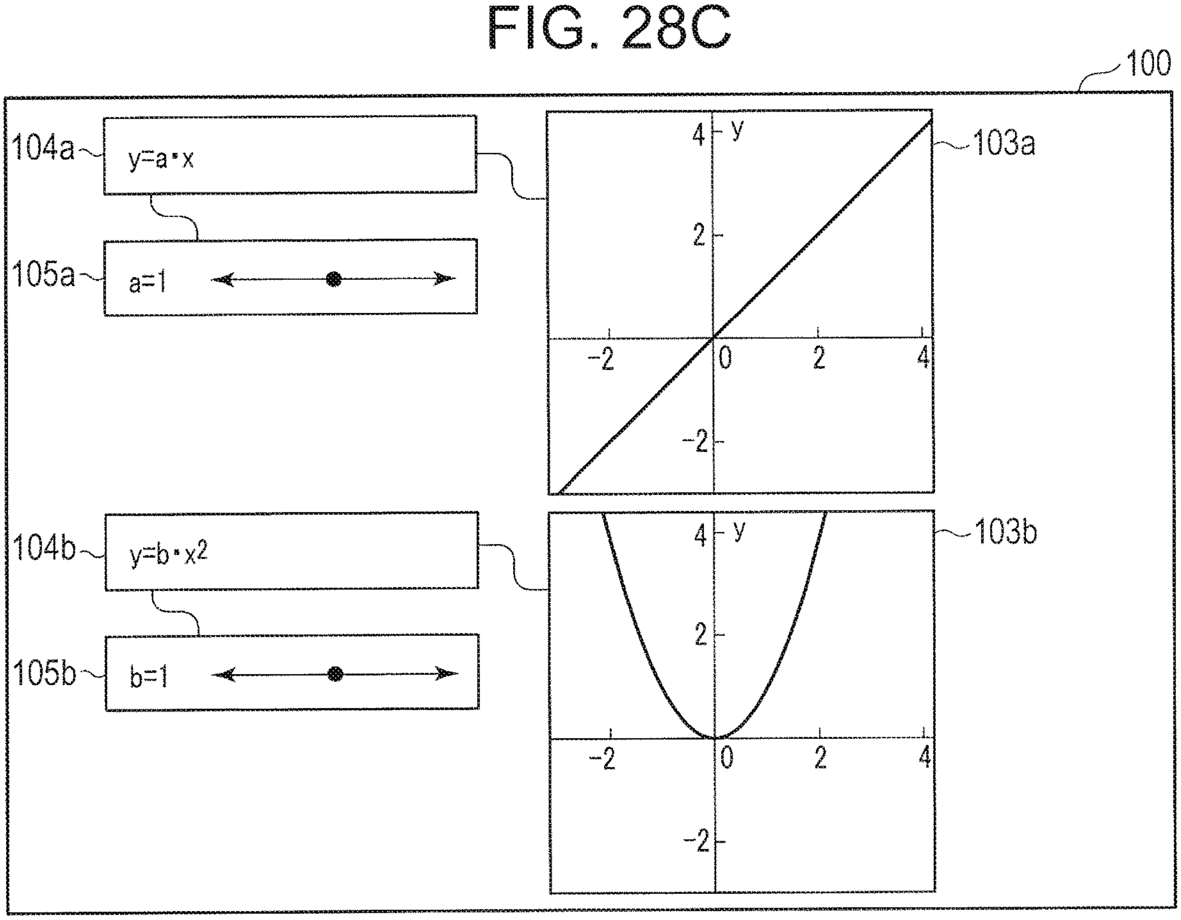
FIG. 28C is a diagram illustrating one example of display of the coordinate value tags and the arithmetic operation tags in execution of the tag separating operation.

At the completion of execution of the drag-and-drop operation, the graph tag 103 is separated into the first graph tag 103*a* and the second graph tag 103*b*, the numerical formula tag 104 (the numerical formula tag unit) is separated into the first numerical formula tag 104*a* and the second numerical formula tag 104*b* and the slider tag 105 (the slider tag unit) is separated into the first slider tag 105*a* and the second slider tag 105*b* as illustrated in FIG. 28C. On the other hand, the coordinate value tag 109 and the arithmetic operation (α+β) tag 110 are erased.

The coordinate value tag 109 and the arithmetic operation (α+β) tag 110 which are tied to the graph tag 103 are erased in both of coupling and separation of the tags in this way.

According to the above-mentioned embodiment which is illustrated in FIG. 28A to FIG. 28C, when mutually separating the two graphs which are displayed in one graph tag 103, the graph tag 103*b* and the slider tag 105*b* are newly created and displayed in a state of being tied to the second numerical formula tag 104*b* which is obtained after separation and the first and second coordinate value tags 109*a* and 109*b* and the first and second arithmetic operation (α+β) tags 110*a* and 110*b* which are correlated to one graph tag 103 are hidden. Thereby, it becomes easy to see the correlation between/among the various tags which are displayed on the paper 100 by hiding some kinds of tags in association with mutual separation of each of the various tags and therefore the convenience is improved.

Figure 29:
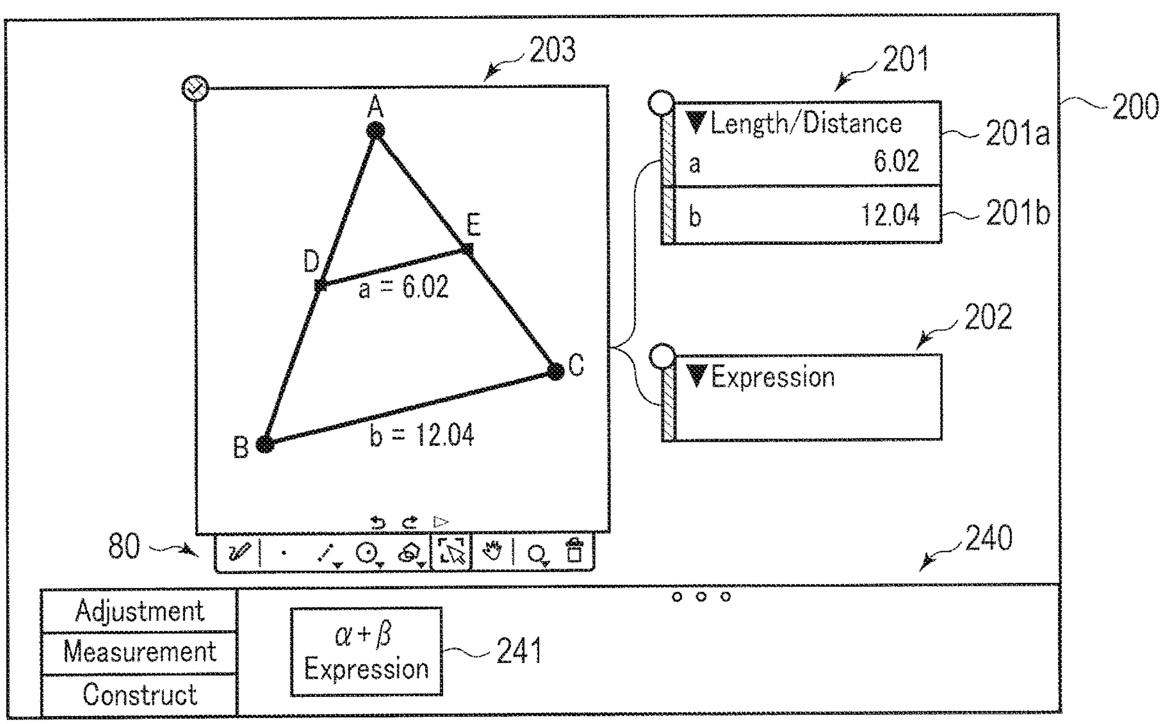
FIG. 29 is a diagram illustrating one example of display of a geometric tag.

FIG. 29 is a diagram illustrating one example of screen display which includes a geometric tag 203. In FIG. 29, the geometric tag 203 is displayed on paper 200 which is displayed on the display device 26. In the following, the geometric tag 203 will be described with reference to operations and display in creation of the geometric tag 203 which is illustrated in FIG. 19.

The geometric tag 203 is a tag which is created by selecting the geometric icon 55 of the menu icon bar 50. It is possible to input and display geometric figures such as strait lines, circles and so forth that the user draws in the geometric tag 203. In FIG. 29, a measured value tag 201 and an arithmetic operation tag 202 which are tied to the geometric tag 203 are displayed. Inputting, selection and so forth of an instruction to create the tags 201 and 202 and an instruction for execution of arithmetic operations concerned are possible by using an input board 240 and various icons 80 which are displayed in association with display of the geometric tag 203.

After drawing the geometric figure in the geometric tag 203, creation of the measured value tag 201 and the arithmetic operation tag 202 becomes possible. In a case of creating the measured value tag 201, the user selects, for example, two points on the figure. Thereby, the terminal 20 accepts the instruction to create the measured value tag 201. In a case where the measured value tag 201 which is correlated to the geometric tag 203 is present, one new measured value tag 201 is displayed in a state of being connected to the lower side of the existing measured value tag 201 (No. 21 in the table which is illustrated in FIG. 19). This operation corresponds to creation of a second measured value tag 201*b* which is located on the lower side of a first measured value tag 201*a* which is illustrated in, for example, FIG. 29. In other cases, one new measured value tag 201 which is correlated to the geometric tag 203 concerned is displayed (No. 22 in the table which is illustrated in FIG. 19). This operation corresponds to new creation of the first measured value tag 201*a* which is illustrated in, for example, FIG. 29.

In a case of creating the arithmetic operation tag 202, the user selects an arithmetic operation icon 241. Thereby, the terminal 20 accepts an instruction to create the arithmetic operation tag 202. In a case where the arithmetic operation tag 202 which is correlated to the geometric tag 203 is present, one new arithmetic operation tag 202 is displayed in a state of being connected to the lower side of the existing arithmetic operation tag 202 (No. 23 in the table which is illustrated in FIG. 19). In other cases, one new arithmetic operation tag 202 which is correlated to the geometric tag 203 concerned is displayed (No. 24 in the table which is illustrated in FIG. 19). This operation corresponds to creation of the arithmetic operation tag 202 which is illustrated in, for example, FIG. 29.

The terminal 20 determines display of the measured value tag 201 and the arithmetic operation tag 202 which are newly displayed in accordance with presence/absence of the measured value tag 201 and the arithmetic operation tag 202 which are tied to the geometric tag 203 in this way. In particular, the measured value tag 201 and the arithmetic operation tag 202 exhibit behaviors which are similar to those of the above-mentioned coordinate value tag 109 and arithmetic operation ($\alpha+\beta$) tag 110 in regard to creation thereof.

Figure 30:
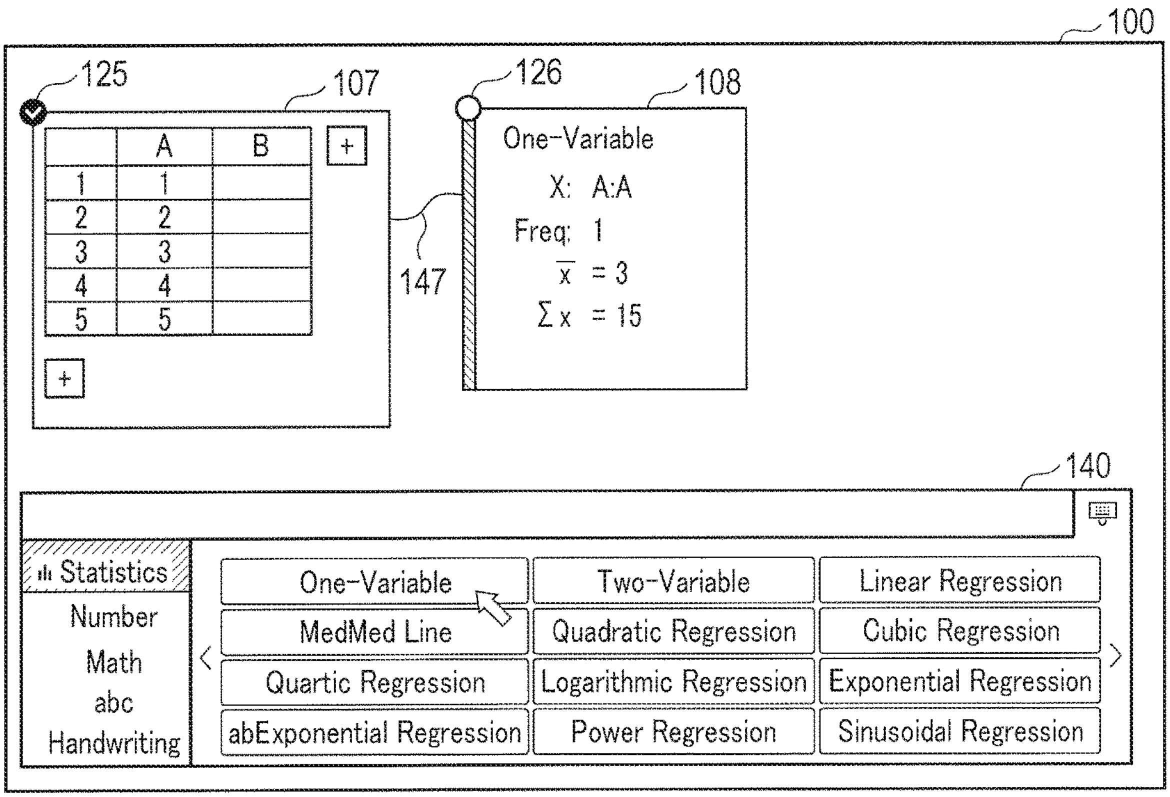
FIG. 30 is a diagram illustrating one example of display which includes a statistical calculation result.

One example that the statistical graph which relates to the result of the statistical calculation which is arithmetically operated in the server 10 is displayed in the graph tag 103 has been described so far. However, the result of execution of the statistical calculation may be displayed only in the statistical calculation tag 108 depending on the type of the statistical calculation to be arithmetically operated. FIG. 30 illustrates one example of such display.

FIG. 30 illustrates one example of screen display which is observed in a case where "One-Variable" is selected from the input board 140 for the numerical value which is input into the column A of the numerical table 111 of the numerical table (statistics) tag 107. Various kinds of information (for example, information on the numerical value on the column A in the numerical table 111, information on types of statistical calculations and so forth) are transmitted from the terminal 20 to the server 10 in accordance with selection of "One-Variable" and the statistical calculation concerned is executed in the server 10. The terminal 20 receives the result of execution of the statistical calculation which is returned from the server 10. That is, the arithmetic operation process in step S18 in FIG. 3 is executed.

The statistical calculation tag 108 is created by using the received result of execution of statistical calculation and is displayed so as not to overlap the numerical table (statistics) tag 107. Thereby, it becomes possible to display the statistical calculation tag 108 on a position which is determined in accordance with the user's operation within the paper 100. In this situation, the terminal 20 executes the statistical calculation tag process in step S21 in FIG. 3. The numerical table (statistics) tag 107 is tied to the statistical calculation tag 108 with the string 147. The statistical calculation tag 108 may be created from the numerical table (statistics) tag 107 in accordance with, for example, No. 20 in the table which is illustrated in FIG. 19.

Figure 31:
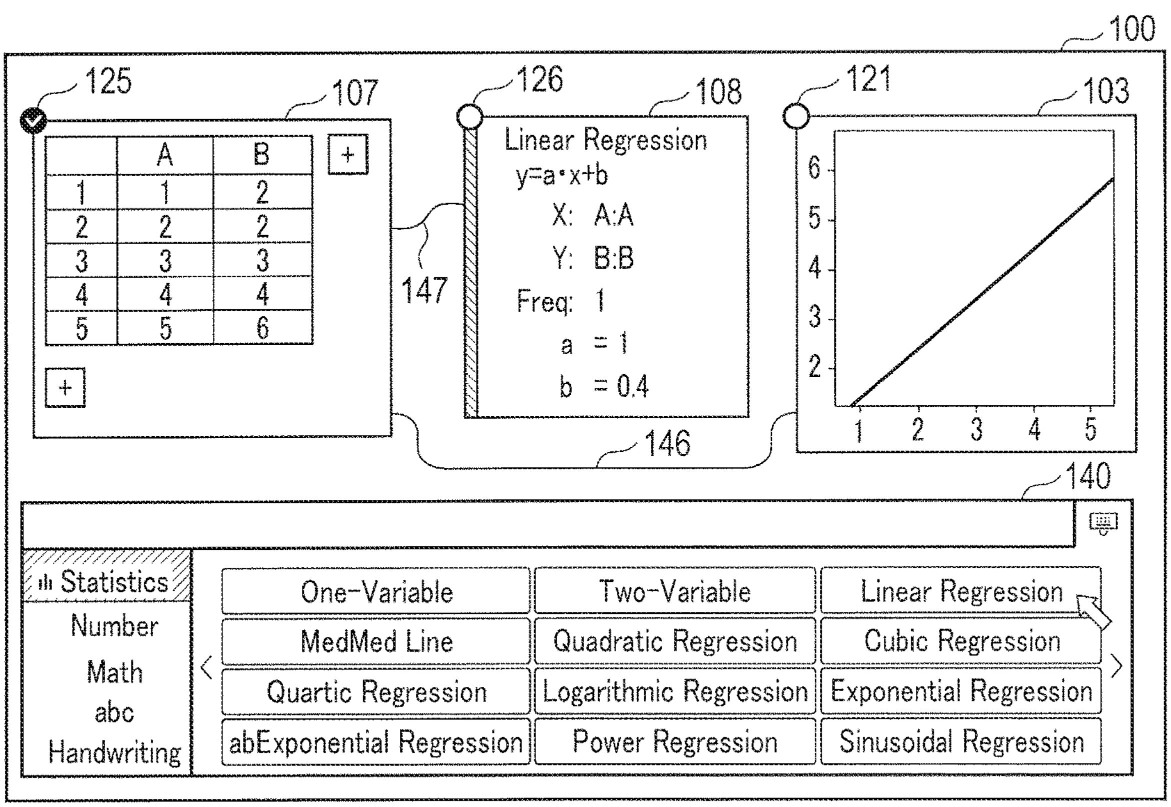
FIG. 31 is a diagram illustrating one example of display which includes a statistical calculation result.

FIG. 31 illustrates one example of screen display which is observed in a case where "Linear Regression" is selected from the input board 140 for numerical values which are input into the column A and the column B of the numerical table 111 in the numerical table (statistics) tag 107. The arithmetic operation process in step S18 in FIG. 3 is executed in accordance with the selection of "Linear Regression". Further, the graph tag 103 which displays a statistical graph which indicates a result of execution of the arithmetic operation of "Linear Regression" and the statistical calculation tag 108 which indicates a result of execution of the statistical calculation (literal information) are created by the graph tag process in step S19 and the statistical calculation tag process in step S21 and are displayed so as not to overlap the numerical table (statistics) tag 107. Thereby, it becomes possible to display the graph tag 103 and the statistical calculation tag 108 on positions which are determined in accordance with the user's operation within the paper 100. The numerical table (statistics) tag 107 is tied to the graph tag 103 and the statistical calculation tag 108 with the strings 146 and 147 respectively. The graph tag 103 and the statistical calculation tag 108 may be created from the numerical table (statistics) tag 107 in accordance with, for example, No. 4 and No. 20 in the table which is illustrated in FIG. 19.

In the server 10, for example, in a case where the statistical calculation type is "One-Variable" or "Two-Variable", the statistical calculation tag process in step S21 in FIG. 3 is executed. However, the graph tag process in step S19 is not executed. In addition, in a case where the statistical calculation type is the one other than the above-mentioned two types of calculations, that is, for example, the statistical calculation type is the one which relates to statistical regression calculations such as "Linear Regression", "Quadratic Regression" and so forth or "Scatter Plot", "Box & Whisker Plot", "Histogram", "Pie Chart" and so forth, the statistical calculation tag process in step S21 and the graph tag process in step S19 in FIG. 3 are executed. Whether the graph tag process in step S19 in FIG. 3 is executed is determined depending on the type of the statistical calculation used in this way.

Figure 32A:
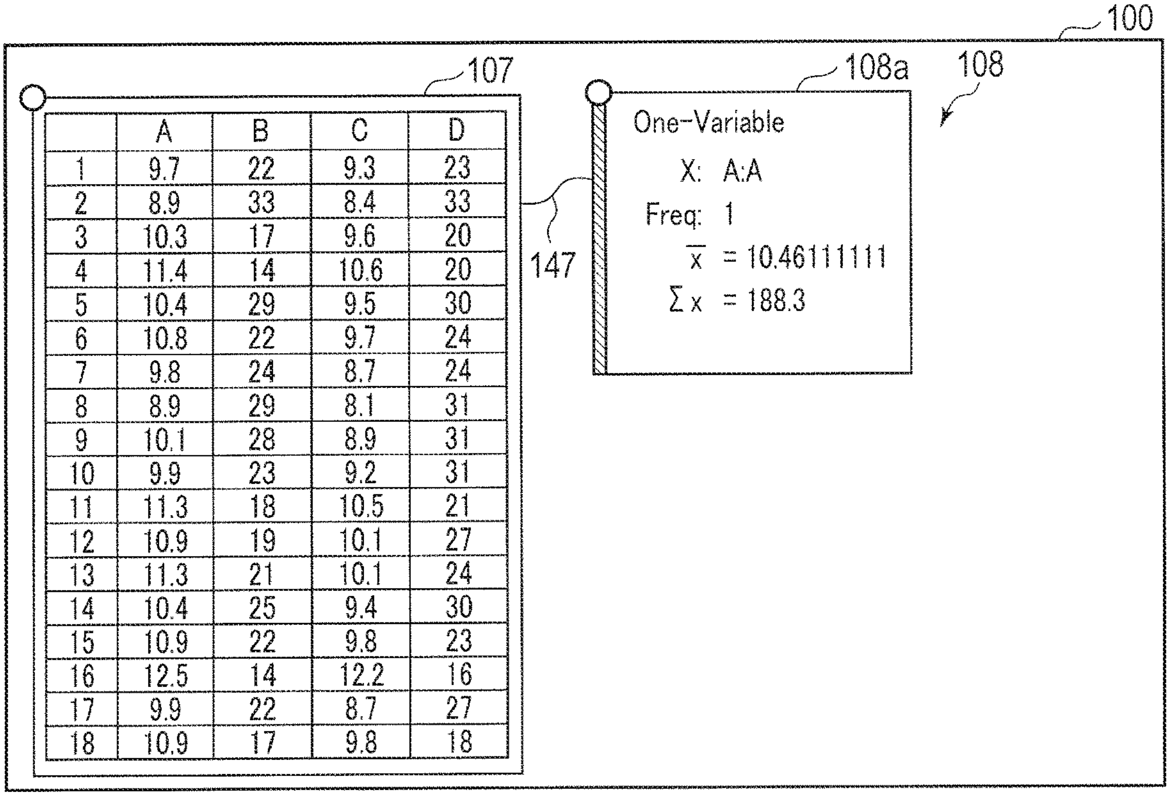
FIG. 32A is a diagram illustrating one example of display which relates to statistical calculations.

FIG. 32A is a diagram illustrating one example of screen display which is configured by the numerical table (statistics) tag 107 and the statistical calculation tag 108. In FIG. 32A, in the numerical table 111 of the numerical table (statistics) tag 107, average temperatures in March in Fukuoka are input into a column A, flowering dates (the first of March is set as a base date) of cherry blossoms in Fukuoka are input into a column B, average temperatures in March in Tokyo are input into a column C and flowering dates (the first of March is set as the base date) of cherry blossoms in Tokyo are input into a column D (all of them are data which were measured from 1987 to 2004). A result of the statistical calculation of "One-Variable" for the values which are input into the column A of the numerical table 111 of the numerical table (statistics) tag 107 is displayed in the statistical calculation tag 108. The statistical calculation tag 108 may be created from the numerical table (statistics) tag 107 in accordance with, for example, No. 20 in the table which is illustrated in FIG. 19.

Figure 32B:
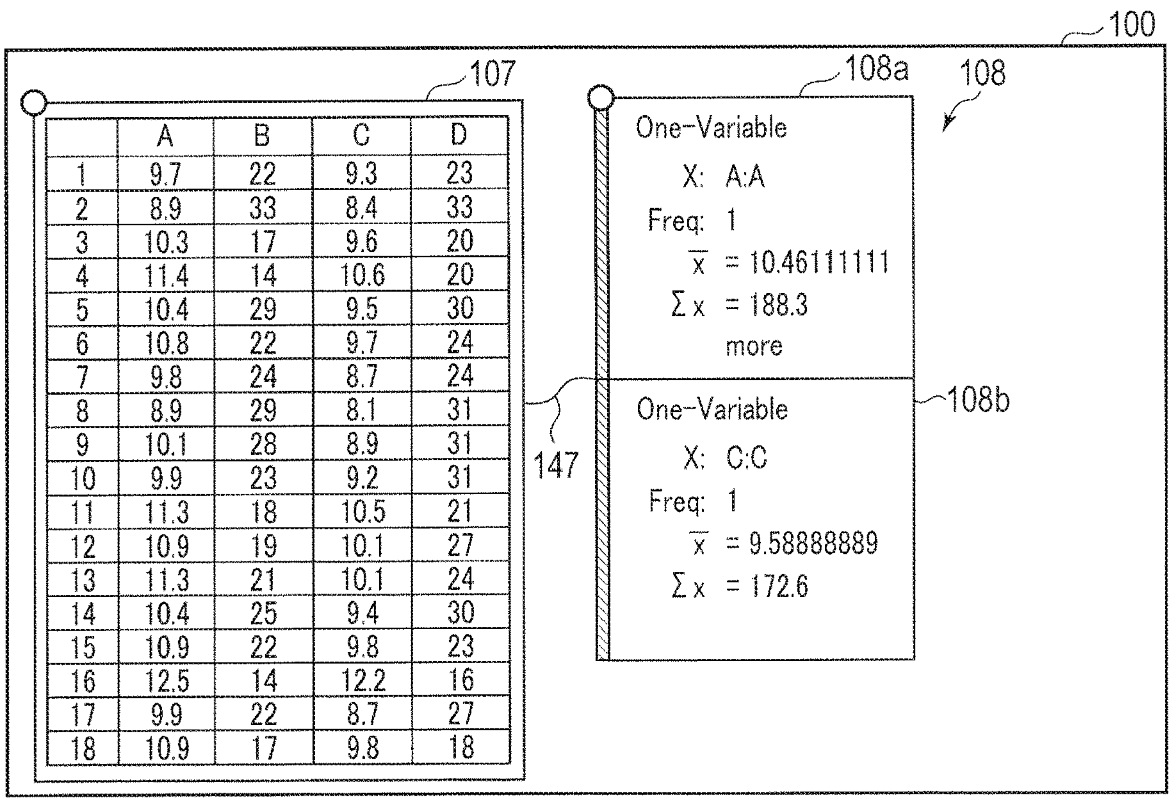
FIG. 32B is a diagram illustrating one example of display which relates to statistical calculations.

In FIG. 32B, a result of the statistical calculation of "One-Variable" for the values which are input into the column C of the numerical table 111 of the numerical table (statistics) tag 107 is displayed in the second statistical calculation tag 108*b*. The second statistical calculation tag 108*b* is displayed in a state of being connected to the lower side of the first statistical calculation tag 108*a*. Transition from the display in FIG. 32A to the display in FIG. 32B corresponds to No. 19 in the table which is illustrated in FIG. 19.

The statistical calculation tag 108 (108*a*, 108*b*) which is tied to the numerical table (statistics) tag 107 is displayed all in one piece in this way and therefore data is displayed in the well-listed state.

Figure 33A:
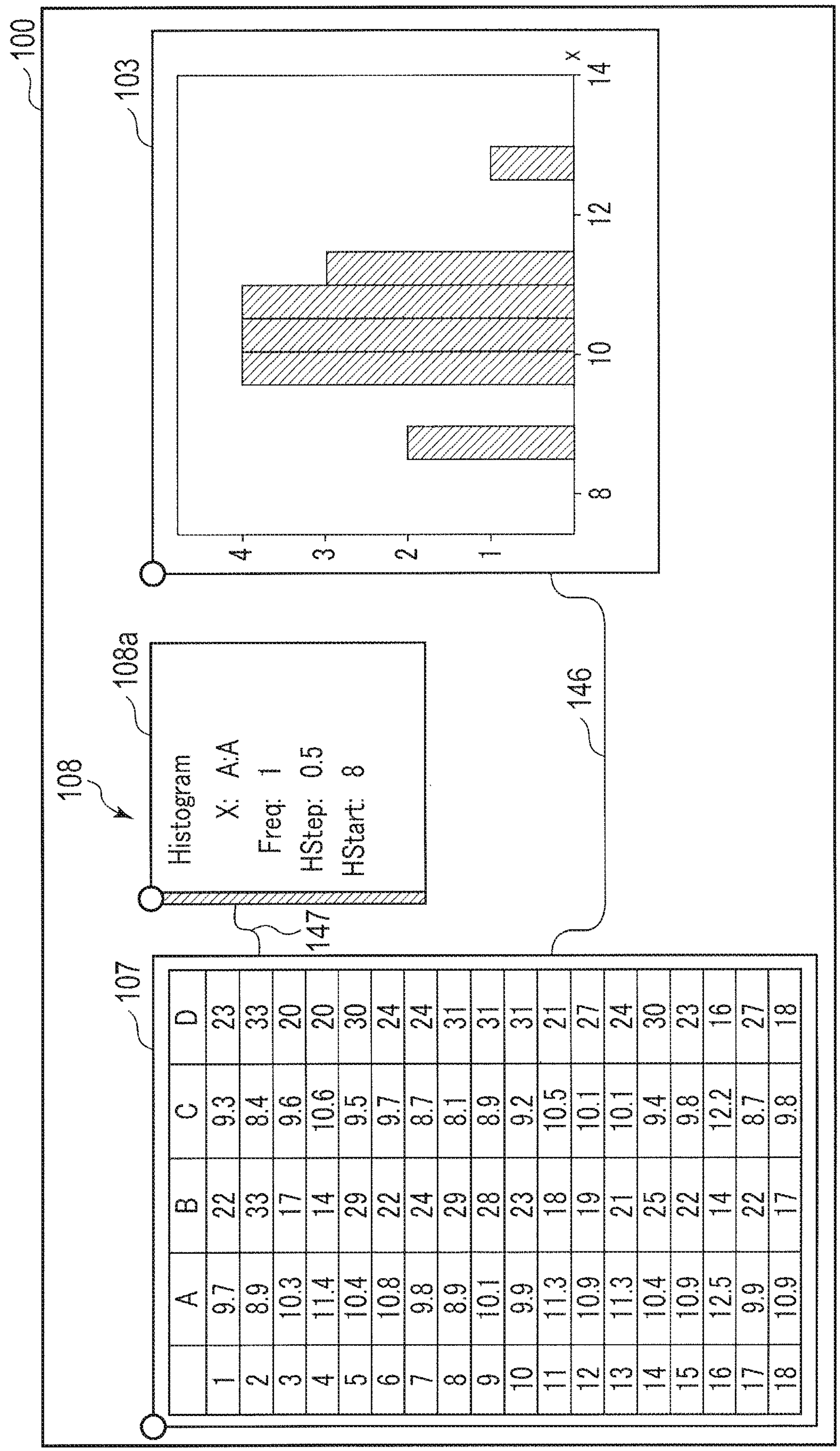
FIG. 33A is a diagram illustrating one example of display which relates to statistical calculations.

FIG. 33A illustrates one example of screen display which is observed when the Histogram statistical calculation is executed on the values in the column A of the numerical table 111 in the numerical table (statistics) tag 107 which is the same as that in FIG. 32A. The first statistical calculation tag 108*a* and the graph tag 103 which are tied to the numerical table (statistics) tag 107 are displayed. A first Histogram statistical graph (a first statistical graph) is displayed in the graph tag 103.

Figure 33B:
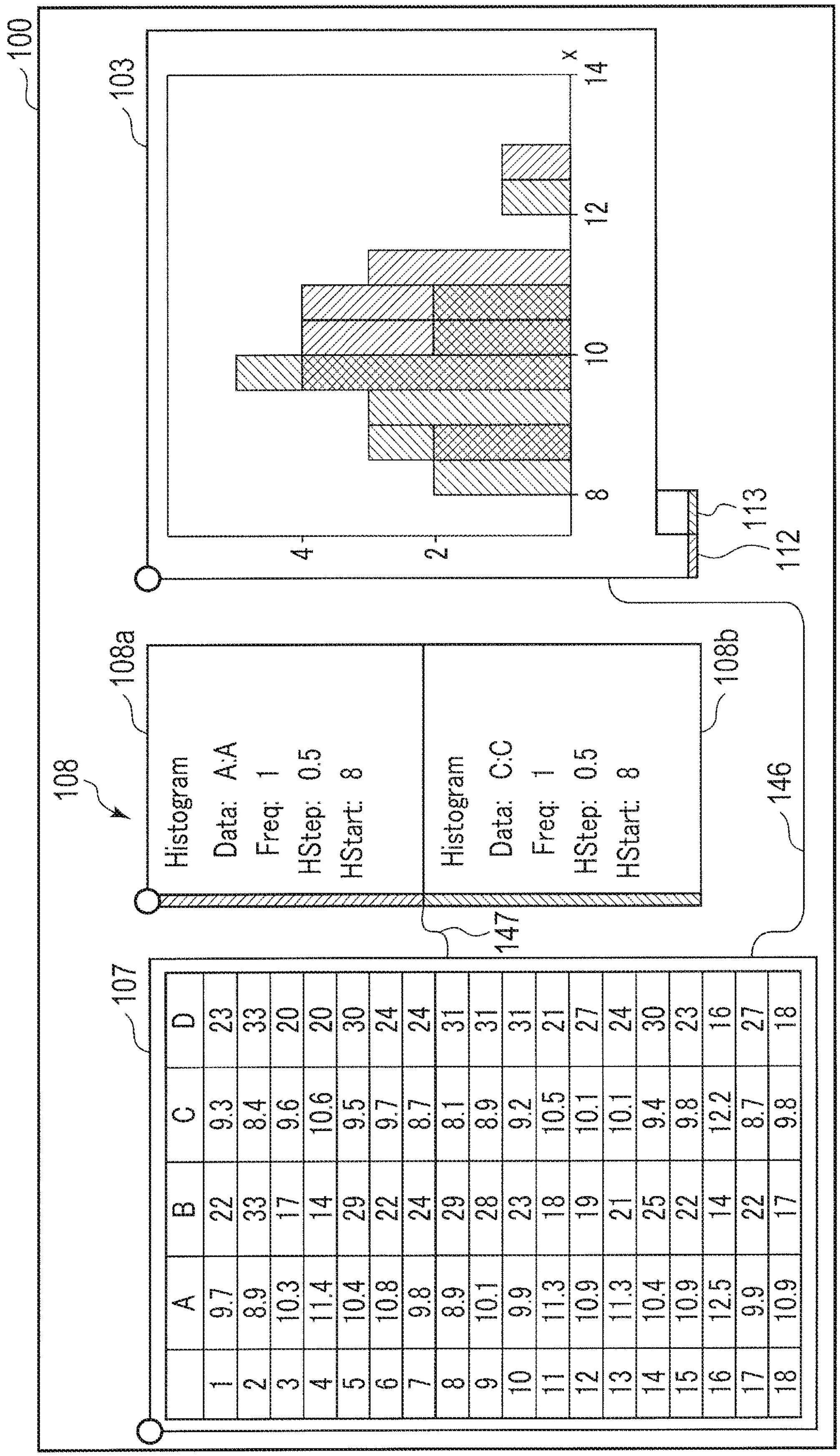
FIG. 33B is a diagram illustrating one example of display which relates to statistical calculations.

Further, FIG. 33B illustrates one example of screen display which is observed when the Histogram statistical calculation is executed on the values in the column C of the numerical table (statistics) tag 107. The second statistical calculation tag 108*b* is displayed in a state of being connected to the lower side of the first statistical calculation tag 108*a*. A second Histogram statistical graph (a second statistical graph) is displayed in the graph tag 103 together with the first Histogram statistical graph. In this case, the tab 112 which corresponds to the first Histogram statistical graph is displayed in the graph tag 103 together with the tab 113 which corresponds to the second Histogram statistical graph. It becomes easier to compare the two graphs with each other by overlappingly drawing the statistical graphs in one graph tag 103 in this way. In addition, the color of a tab 153*a* of the statistical calculation tag 108*a* is the same as the respective colors of the corresponding tab 112 and the corresponding graph which are displayed in the graph tag 103, and the color of a tab 153*b* of the statistical calculation tag 108*b* is the same as the respective colors of the corresponding tab 113 and the corresponding graph which are displayed in the graph tag 103. Therefore, that each graph which is displayed in the graph tag 103 corresponds to which data in the numerical table (statistics) tag 107 is seen at a glance by looking at a statistical calculation range (display of "Data: A:A" or "Data:C:C") which is displayed in each of the statistical calculation tags 108*a* and 108*b* together with the numerical table (statistics) tag 107.

Figure 33C:
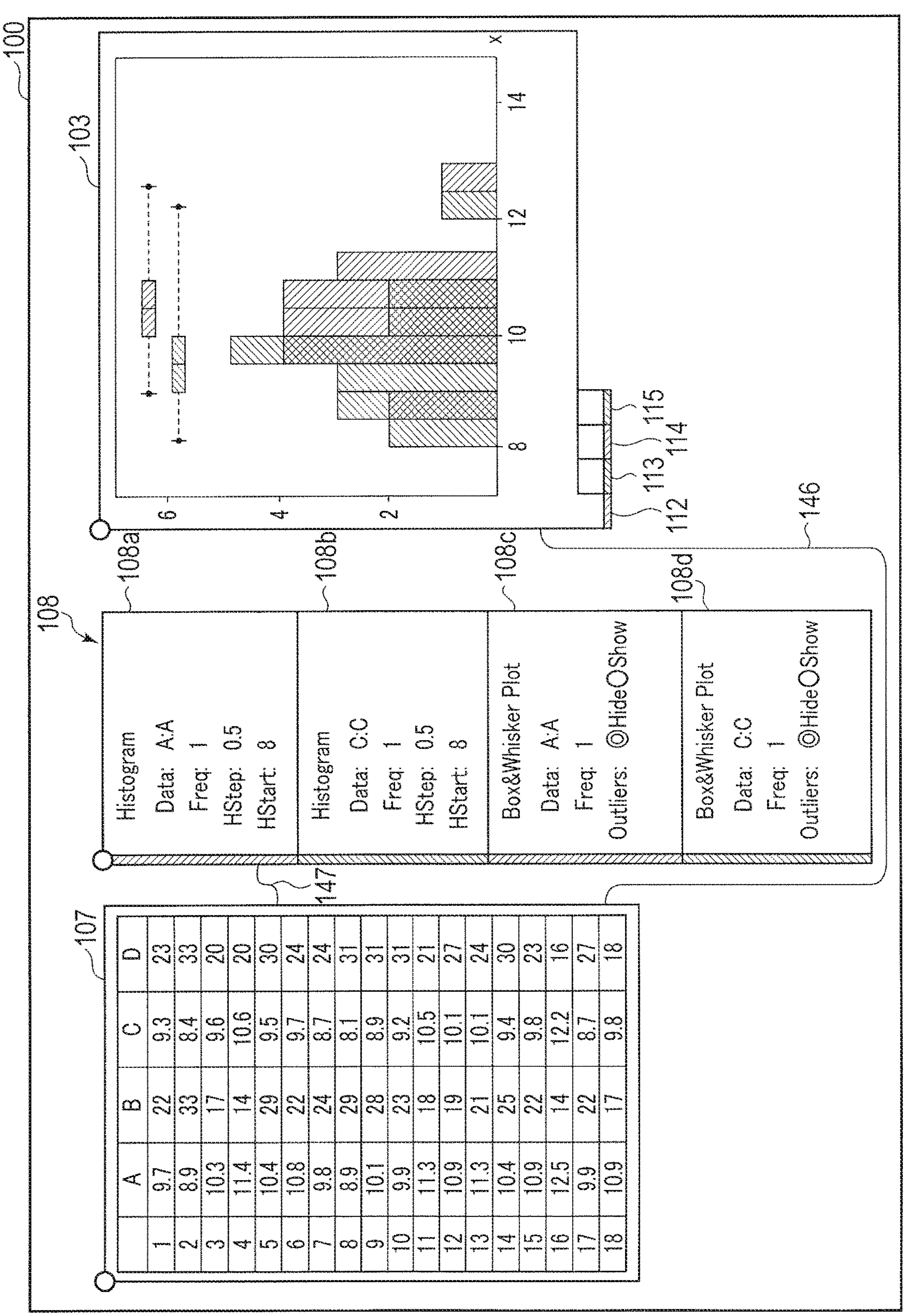
FIG. 33C is a diagram illustrating one example of display which relates to statistical calculations.

FIG. 33C illustrates one example of screen display which is observed in a case where the Box & Whisker Plot statistical calculation is executed on the values in the column A and the column C of the numerical table 111 in the numerical table (statistics) tag 107. A third statistical calculation tag 108*c* is displayed in a state of being connected to the lower side of the second statistical calculation tag 108*b*. Further, a fourth statistical calculation tag 108*d* is displayed in a state of being connected to the lower side of the third statistical calculation tag 108*c*. A first Box & Whisker Plot statistical graph (a third statistical graph) and a second Box & Whisker Plot statistical graph (a fourth statistical graph) are displayed in one graph tag 103 together with the first Histogram statistical graph and the second Histogram statistical graph. In this case, also the tab 114 which corresponds to the first Box & Whisker Plot statistical graph and the tab 115 which corresponds to the second Box & Whisker Plot statistical graph are displayed in the graph tag 103 as well, in addition to the tabs 112 and 113. Since the respective colors of the tab 153*a* of the statistical calculation tag 108*a* and a tab 153*c* of the statistical calculation tag 108*c* are the same as the respective colors of the corresponding tab 112 and the tab 114 which are displayed in the graph tag 103 and the respective colors of the corresponding graphs, and the respective colors of the tab 153*b* of the statistical calculation tag 108*b* and a tab 153*d* of a statistical calculation tag 108*d* are the same as the respective colors of the corresponding tab 113 and the tab 115 which are displayed in the graph tag 103 and the respective colors of the respective corresponding graphs. Therefore, it becomes possible to see that the plurality of graphs which are displayed in the graph tag 103 correspond to respective pieces of data in the numerical table (statistics) tag 107 at a glance, in addition to the above-mentioned effects.

In the following, tag separation and coupling pertaining to the result of execution of the statistical calculation will be described.

As illustrated in FIG. 34A, the user selects and moves the second tab 113 (for example, the drag-and-drop operation). Thereby, as illustrated in FIG. 34B, data (data in the second statistical graph) which is tied to the second tab 113 is displayed in the second graph tag 103*b*. In association with this data display, the corresponding second statistical calculation tag 108*b* is separated from the statistical calculation tag 108 and further a second numerical table (statistics) tag 107*b* which is generated from a copy of the column A of the numerical table 111 of the numerical table (statistics) tag 107 is displayed. The numerical table (statistics) tag 107 is displayed as it is as the first numerical table (statistics) tag 107*a*.

In a state illustrated in FIG. 34B, the user selects the fourth tab 115 and moves the tab 115 in such a manner that the tab 115 overlaps the second graph tag 103*b* (for example, the drag-and-drop operation). Thereby, data (data of the fourth statistical graph) which is tied to the fourth tab 115 is additionally displayed in the second graph tag 103*b* as illustrated in FIG. 34C. In association with this data display, the corresponding statistical calculation tag 108*b* is separated from the statistical calculation tag 108, and a copy of the column A of the numerical table 111 in the first numerical table (statistics) tag 107*a* is generated and is additionally displayed in the second numerical table (statistics) tag 107*b* as the column B.

According to the above-described embodiment which is illustrated in FIG. 34A and FIG. 34B, the second numerical table (statistics) tag 107*b* and the second statistical calculation tag 108*b* are displayed so as not to overlap the second graph tag 103*b* in association with the separating operation. Thereby, it becomes possible to display each tag which is newly created by separation on a position which is determined in accordance with the user's operation within the paper 100.

In addition, when the fourth statistical graph which is displayed in the first graph tag 103*a* is coupled to the second graph tag 103*b* which is correlated to the second numerical table (statistics) tag 107*b* and the second statistical calculation tag 108*b*, the fourth statistical calculation tag 108*d* which is coupled to the first statistical calculation tag 108*a* is coupled to the second statistical calculation tag 108*b* and a numerical value column which is displayed in the first numerical table (statistics) tag 107*a* and becomes the basis for creation of the fourth statistical graph is displayed in the second numerical table (statistics) tag 107*b* in a state of being connected to the column in the tag 107*b*. Thereby, also in a case where the various tags are hidden in association with mutual coupling of the various tags, it becomes easy to see the correlation between/among the various tags which are displayed on the paper 100 before and after execution of the operation for tag hiding and the convenience is improved.

Incidentally, such an operation is not limited to this example. This operation may be executed in a case where it is desirable to display different kinds of statistical graphs (for example, the Histogram statistical graph and the Box & Whisker Plot statistical graph) which are separately displayed in two graph tags and integration or mutual comparison of which is requested on the same coordinate system all in one piece. In addition, this operation may be executed in such a case that it is desirable to separately display different kinds of statistical graphs which are displayed in one graph tag and whose integrated display is not needed on the plurality of coordinate systems.

Figure 35A:
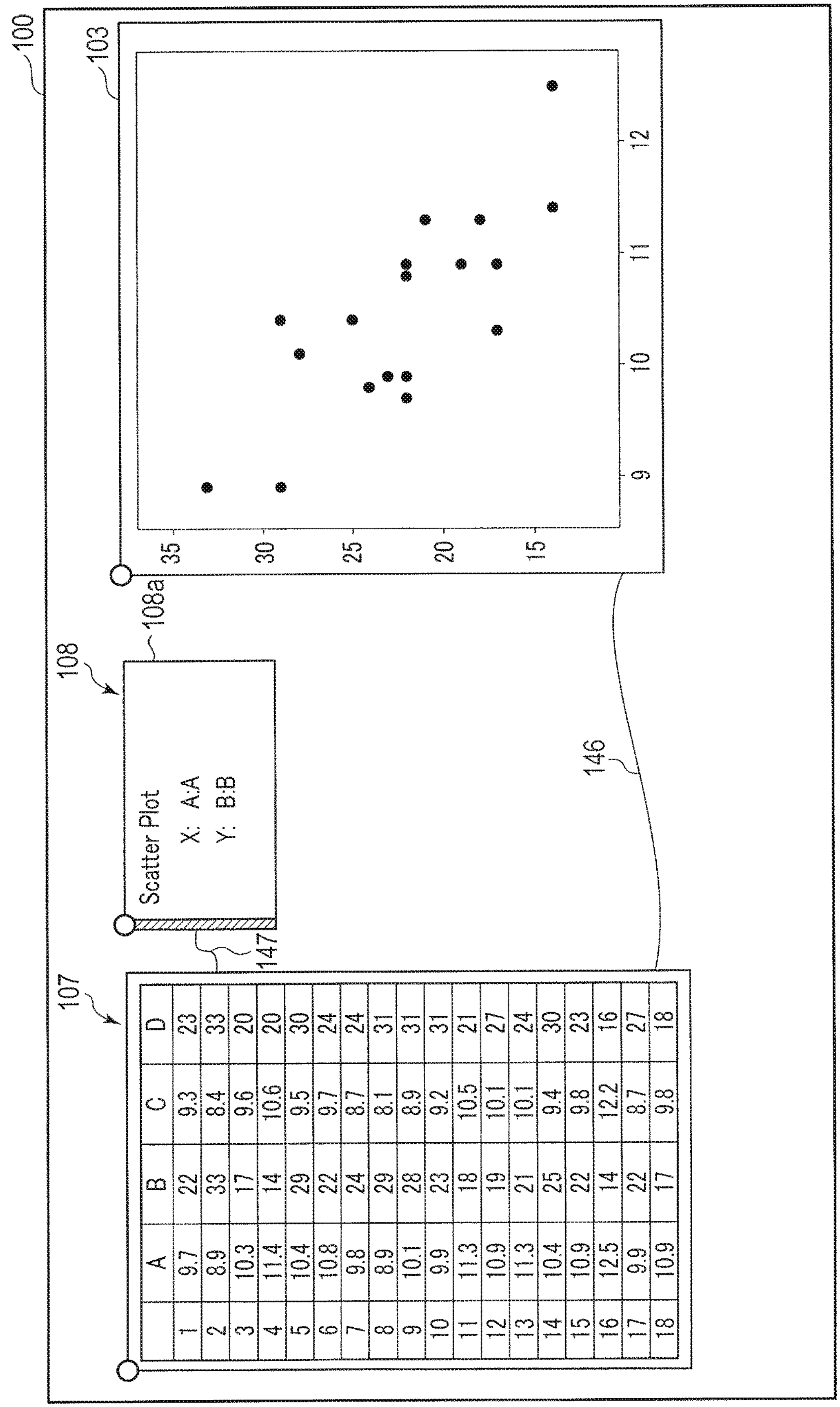
FIG. 35A is a diagram illustrating one example of display which relates to statistical calculations.
Figure 35B:
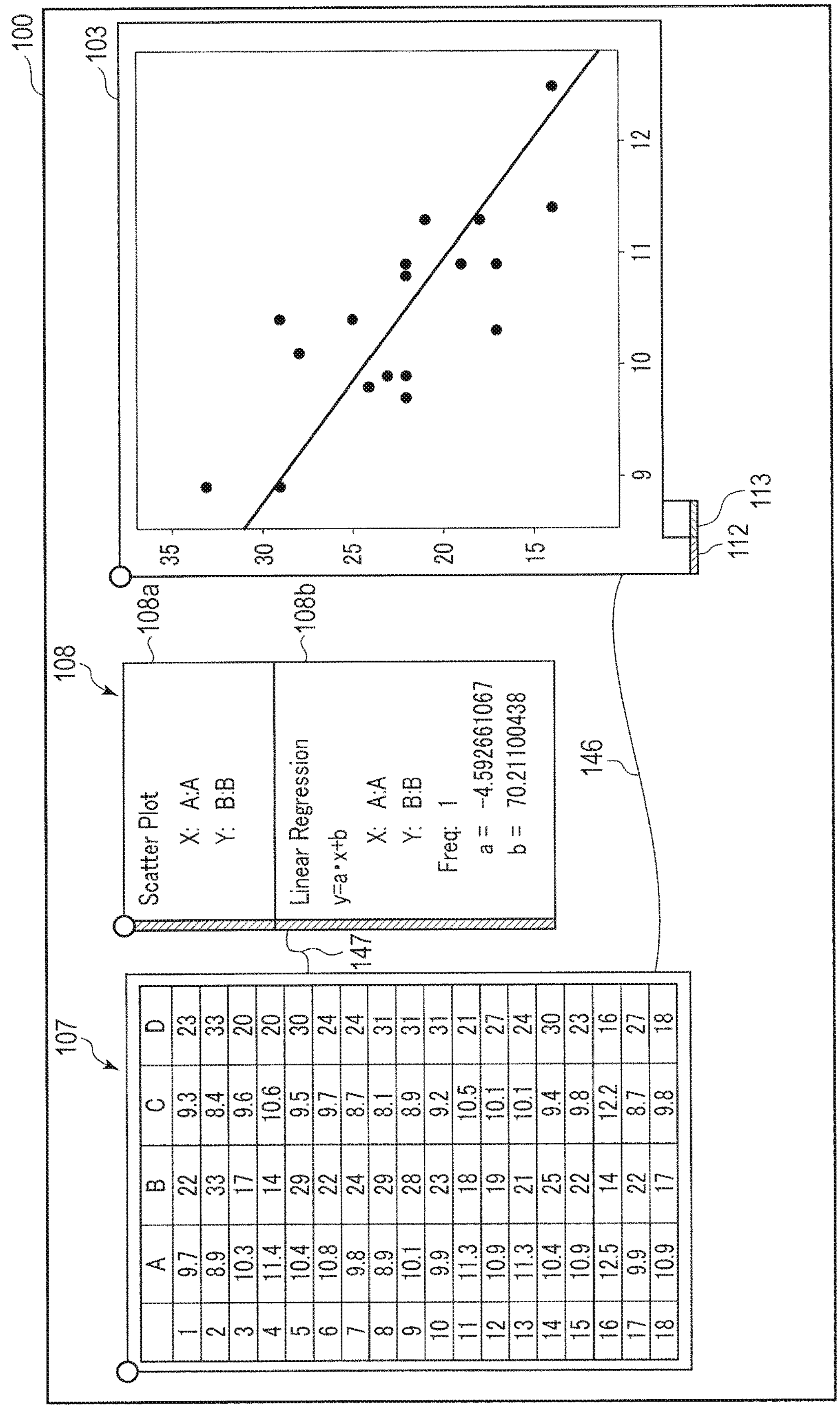
FIG. 35B is a diagram illustrating one example of display which relates to statistical calculations.
Figure 35C:
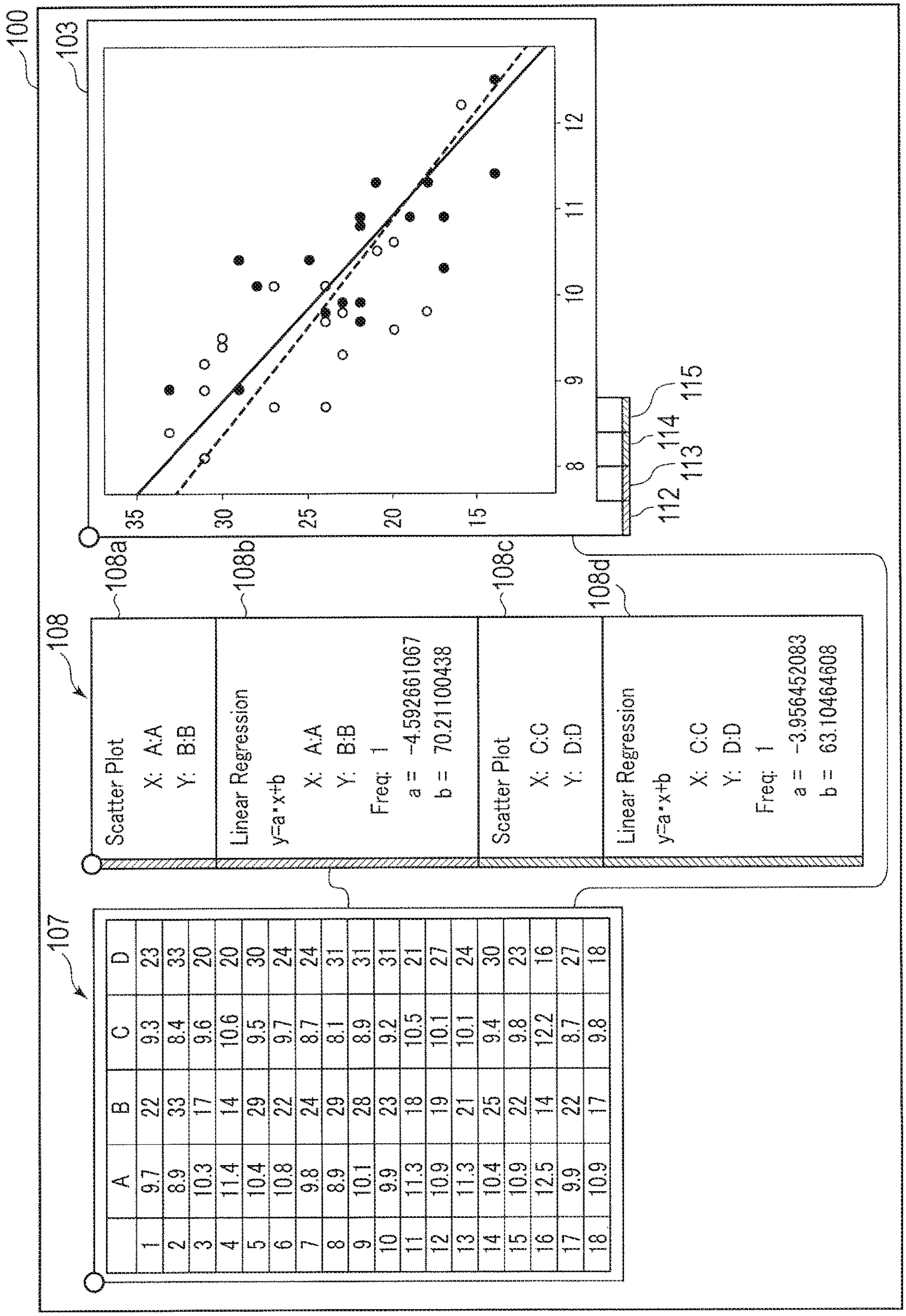
FIG. 35C is a diagram illustrating one example of display which relates to statistical calculations.

FIG. 35A to FIG. 35C illustrate one example (FIG. 35A) of screen display which is observed after execution of the Scatter Plot statistical calculation on the average temperatures and the flowering dates of cherry blossoms in March in Fukuoka, in addition, one example (FIG. 35B) of screen display which is observed after execution of the Linear Regression statistical calculation also on the average temperatures and the flowering dates of cherry blossoms in March in Fukuoka and, in addition, one example (FIG. 35C) of screen display which is observed after execution of the Scatter Plot statistical calculation and the Linear Regression statistical calculation on the average temperatures and the flowering dates of cherry blossoms in March in Tokyo. The statistical calculation tags 108*a*, 108*b*, 108*c* and 108*d* are created in a state of being connected to the lower side of each statistical calculation tag one by one in accordance with No. 19 in the table in FIG. 19. In addition, the statistical graphs are added to the graph tag 103 in accordance with No. 3 in the table in FIG. 19.

In addition, as illustrated in FIG. 35A, when only one graph is displayed in the graph tag 103, the tab of the graph tag 103 may not be displayed. Only when two or more graphs are displayed in the graph tag 103 as illustrated in FIG. 35B and FIG. 35C, the tabs 112, 113, 114 and 115 of the graph tag 103 may be displayed. Thereby, it becomes possible to see whether the number of graphs which are being displayed in that graph tag 103 is one simply by confirming presence/absence of the tab of the graph tag 103. In addition, the number of graphs which are being displayed in that graph tag 103 is found simply by confirming the number of tabs of the graph tag 103.

In the present embodiment, it is possible to arrange the data, the statistical calculation results and the statistical graphs which are displayed in the respective tags which are floating objects on one screen. Thereby, it becomes possible to compare the different kinds of statistical graphs with one another and to learn various analysis methods for the same data. In addition, it becomes possible to couple the different kinds of statistical graphs into one graph tag and to separate one graph tag into individual graph tags. Thereby, it becomes possible to provide display which is easy to use.

In particular, according to the present embodiment, it is possible to arrange and couple together the statistical graphs and the results of execution of the statistical calculations by a simple operation such as the drag-and-drop operation and so forth.

According to the present embodiment, since separation and coupling of graph-drawing areas are possible and free arrangement of the formulae and the graphs is possible for the user, it is possible to support understanding of features of each graph and to support understanding of a relation between/among graphs. In particular, it is possible to support students so that the students understand the functional graphs, the statistical graphs and the results of execution of the statistical calculations by utilizing such a system as mentioned above in teaching mathematics and so forth where ICT (Information and Communication Technology) is promoted.

Incidentally, the invention of the present application is not limited to the above-mentioned embodiment and may be modified in a variety of ways within a range not deviating from the gist of the present invention in an implementation phase. In addition, respective embodiments may be implemented by appropriately combining embodiments with one another to the greatest possible extent and in this case an effect which is brought about by combination is obtained. Further, inventions in various phases are included in the above-mentioned embodiments and it is possible to extract various inventions depending on appropriate combination of the plurality of constitutional elements which are disclosed. For example, in a case where it is possible to solve problems which are described in the column of Problems to be Solved and it is possible to obtain the effects which are described in the column of Effects of Invention even when some constitutional elements are deleted from all the constitutional elements which are indicated in the embodiment, it is possible to extract the configuration that the above-mentioned constitutional elements are deleted as the invention.

What is claimed is:

1. A display control apparatus comprising:

a processor; and a storage storing instructions that, when executed by the processor, controls the processor to:

determine whether input of a first operation comprising selecting a first icon is accepted;

in response to determining the input of the first operation is accepted, select a first display position corresponding to a position in a screen of a display designated by a user's operation; and newly create a first tag according to the first icon selected in the first operation for display in the screen of the display at the first display position selected;

select a second operation from a plurality of possible operations based on the first tag newly created;

determine whether input of the second operation is accepted, the second operation comprising one of selecting a second icon, inputting a numerical formula, and inputting a numerical value; and in response to determining the input of the second operation is accepted, select a second display position;

newly create a second tag according to the one of the second icon selected, the numerical formula inputted, and the numerical value inputted in the second operation for display in the screen of the display at the second display position selected, wherein the second display position is automatically selected to not overlap other tags displayed in the screen; and newly create an indicator that visually correlates the second tag to be displayed at the second display position selected with the first tag to be displayed at the first display position selected.

2. The display control apparatus according to claim 1, wherein the storage stores instructions that, when executed by the processor, controls the processor to:

in response to determining input of the numerical value, as the input of the second operation, is accepted, determine whether the second tag has already been created for display at the second display position and whether the indicator that visually correlates the second tag with the first tag has already been created;

in response to determining that the second tag has already been created for display at the second display position and that the indicator has already been created, generate information based on the numerical value inputted in the second operation and display the information generated in the second tag; and in response to determining that the second tag has not been created, newly create the second tag according to the numerical value inputted in the second operation for display in the screen of the display at the second display position selected, and newly create the indicator that visually correlates the second tag to the first tag.

3. The display control apparatus according to claim 1, wherein the storage stores instructions that, when executed by the processor, controls the processor to:

in response to determining input of the numerical formula as the input of the second operation, is accepted, newly create a table displaying a numerical value pertaining to the numerical formula input in the second operation, as the second tag for display in the screen of the display at the second display position selected; and newly create the indicator that visually correlates the table that is newly created to be displayed at the second display position selected with the first tag to be displayed at the first display position selected; and in response to determining input of the numerical value, as the input of the second operation, is accepted, newly create a statistical calculation result tag having information on a statistical calculation of the numerical value input in the second operation to be displayed at the second display position selected; and newly create the indicator that visually correlates the statistical calculation result tag that is newly created to be displayed at the second display position selected with the first tag to be displayed at the first display position selected.

4. The display control apparatus according to claim 1, wherein the instructions stored in the storage further controls the processor to:

determine whether input of a third operation comprising selecting a third icon is accepted;

in response to determining the input of the third operation is accepted, select a third display position; and newly create a third tag according to the third icon selected in the third operation for display in the screen of the display at the third display position selected;

select a fourth operation from a plurality of possible operations based on the third tag newly created;

determine whether input of the fourth operation is accepted, the fourth operation comprising one of selecting a fourth icon, inputting a numerical formula, and inputting a numerical value; and in response to determining the input of the fourth operation is accepted, select a fourth display position;

newly create a fourth tag according to the one of the fourth icon selected, the numerical formula inputted, and the numerical value inputted in the fourth operation for display in the screen of the display at the fourth display position selected; and newly create an indicator that visually correlates the third tag to be displayed at the third display position selected with the fourth tag to be displayed at the fourth display position selected.

5. The display control apparatus according to claim 4, wherein the instructions stored in the storage further controls the processor to:

determine whether a coupling operation comprising coupling together the first tag and the third tag at the first display position or the coupling together the second tag and the fourth tag at the second display position is accepted;

in response to determining that the coupling operation is accepted, mutually couple the first tag and the third tag at the first display position;

mutually couple the second tag and the fourth tag at the second display position; and newly create an indicator that visually correlates the first tag and the third tag that are mutually coupled to be displayed at the first display position and the second tag and the fourth tag that are mutually coupled to be displayed at the second display position.

6. The display control apparatus according to claim 5, wherein the first tag displays a first graph corresponding to a first formula displayed in the second tag, wherein the third tag displays a second graph corresponding to a second formula displayed in the fourth tag, and wherein the instructions stored in the storage further controls the processor to, in mutually coupling the first tag and the third tag at the first display position, display only one of the first tag and the third tag, and display both the first graph and the second graph in the displayed only one of the first tag and the third tag.

7. The display control apparatus according to claim 6, wherein the instructions stored in the storage further controls the processor to:

determine whether a decoupling operation comprising decoupling the second tag and the fourth tag that were mutually coupled is accepted; and in response to determining that the decoupling operation is accepted, recreate the first tag and the third tag for display in the screen at different display positions;

recreate the indicator that visually correlates the first tag that has been recreated and the third tag that have been recreated;

recreate the second tag and the fourth tag for display in the screen at different display positions; and recreate the indicate that visually correlates the second tag and the third tag that have been recreated.

8. The display control apparatus according to claim 5, wherein the instructions stored in the storage further controls the processor to:

in response to determining that the coupling operation is accepted, mutually couple the second tag and the third tag at the second display position; and mutually couple the first tag and the third tag by integrating the content of one of the first tag and the third tag with the other of the first tag and the third tag.

9. The display control apparatus according to claim 1, wherein the storage stores instructions that, when executed by the processor, controls the processor to:

in newly creating the indicator, newly create a string that ties the second tag to be displayed at the second display position selected with the first tag to be displayed at the first display position selected.

10. A non-transitory recording medium having a program code recorded thereon that is executable to control a computer to at least:

determine whether input of a first operation comprising selecting a first icon is accepted;

in response to determining the input of the first operation is accepted, select a first display position corresponding to a position in a screen of a display designated by a user's operation; and newly create a first tag according to the first icon selected in the first operation for display in the screen of the display at the first display position selected;

select a second operation from a plurality of possible operations based on the first tag newly created;

determine whether input of the second operation is accepted, the second operation comprising one of selecting a second icon, inputting a numerical formula, and inputting a numerical value; and in response to determining the input of the second operation is accepted, select a second display position;

newly create a second tag according to the one of the second icon selected, the numerical formula inputted, and the numerical value inputted in the second operation for display in the screen of the display at the second display position selected, wherein the second display position is automatically selected to not overlap other tags displayed in the screen; and newly create an indicator that visually correlates the second tag to be displayed at the second display position selected with the first tag to be displayed at the first display position selected, display the newly created one second-kind display area on the specified one second position within the screen of the display so as to allow recognition of correlation of the one second-kind display area with the one first-kind display area.

11. A method executed by a computer of a display control apparatus, the method comprising:

determining whether input of a first operation comprising selecting a first icon is accepted;

in response to determining the input of the first operation is accepted, selecting a first display position corresponding to a position in a screen of a display designated by a user's operation; and newly creating a first tag according to the first icon selected in the first operation for display in the screen of the display at the first display position selected;

selecting a second operation from a plurality of possible operations based on the first tag newly created;

determining whether input of the second operation is accepted, the second operation comprising one of selecting a second icon, inputting a numerical formula, and inputting a numerical value; and in response to determining the input of the second operation is accepted, selecting a second display position;

newly creating a second tag according to the one of the second icon selected, the numerical formula inputted, and the numerical value inputted in the second operation for display in the screen of the display at the second display position selected, wherein the second display position is automatically selected to not overlap other tags displayed in the screen; and newly creating an indicator that visually correlates the second tag to be displayed at the second display position selected with the first tag to be displayed at the first display position selected.

* * * * *